United States Patent
Yamamoto et al.

(10) Patent No.: US 9,037,985 B2
(45) Date of Patent: May 19, 2015

(54) CONTENTS DISPLAY APPARATUS AND CONTROL METHOD THEREOF

(75) Inventors: Naoko Yamamoto, Yokohama (JP);
Hiroki Urashima, Kawasaki (JP);
Shigeki Mori, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1238 days.

(21) Appl. No.: 12/356,525

(22) Filed: Jan. 20, 2009

(65) Prior Publication Data
US 2009/0199117 A1     Aug. 6, 2009

(30) Foreign Application Priority Data

Feb. 6, 2008   (JP) .................................. 2008-026900

(51) Int. Cl.
*G06F 3/048* (2013.01)
*H04N 5/445* (2011.01)
*G06F 17/30* (2006.01)
*H04N 5/44* (2011.01)

(52) U.S. Cl.
CPC ...... *H04N 5/44543* (2013.01); *G06F 17/30053* (2013.01); *H04N 5/4403* (2013.01); *G06F 17/30056* (2013.01)

(58) Field of Classification Search
CPC .................. H04N 21/26258; G06F 17/30056; G06F 17/30053
USPC .......................................................... 715/764
See application file for complete search history.

(56) References Cited

U.S. PATENT DOCUMENTS

| | | | |
|---|---|---|---|
| 6,717,591 B1* | 4/2004 | Fiveash et al. ................ | 715/732 |
| 6,812,994 B2* | 11/2004 | Bubie et al. .................... | 352/40 |
| 7,202,893 B2* | 4/2007 | Schick et al. ................. | 348/239 |
| 7,440,682 B2 | 10/2008 | Habuta et al. ................. | 386/125 |
| 2002/0198963 A1* | 12/2002 | Wu et al. ........................ | 709/219 |
| 2003/0004856 A1* | 1/2003 | Brown et al. .................... | 705/37 |
| 2003/0090506 A1* | 5/2003 | Moore et al. ................. | 345/730 |
| 2003/0160734 A1* | 8/2003 | Rogers .......................... | 345/2.1 |
| 2004/0109137 A1* | 6/2004 | Bubie et al. .................... | 352/40 |
| 2004/0113928 A1* | 6/2004 | Kobayashi et al. ........... | 345/700 |

(Continued)

FOREIGN PATENT DOCUMENTS

| | | |
|---|---|---|
| JP | 2005-039359 | 2/2005 |
| JP | 2005-341510 | 12/2005 |

(Continued)

OTHER PUBLICATIONS

Milrad et al.,; A web-based video Retrieval System of Educational Films: Desing, Architecture and Implementation Aspects; © 2004; IEEE; 5 pages.*

*Primary Examiner* — Linh K Pham
(74) *Attorney, Agent, or Firm* — Fitzpatrick, Cella, Harper & Scinto

(57) ABSTRACT

A contents display apparatus, which stores display schedule information indicating display schedules of a plurality of contents so as to sequentially display the plurality of contents, and displays contents on a display according to the display schedule information, receives a user operation associated with the display while a content is displayed, determines, with reference to metadata of respective contents, a content which is related to the content displayed when the user operation is received, and changes the display schedule information by changing the display schedule of the content determined as a related content.

22 Claims, 45 Drawing Sheets

(56) References Cited

U.S. PATENT DOCUMENTS

| | | | |
|---|---|---|---|
| 2005/0060759 A1* | 3/2005 | Rowe et al. | 725/143 |
| 2005/0259949 A1* | 11/2005 | Habuta et al. | 386/46 |
| 2006/0098110 A1 | 5/2006 | Yoshino et al. | 348/333.01 |
| 2006/0192784 A1 | 8/2006 | Yamaji et al. | 345/473 |
| 2007/0239856 A1* | 10/2007 | Abadir | 709/219 |
| 2008/0092051 A1* | 4/2008 | Sidon et al. | 715/731 |

FOREIGN PATENT DOCUMENTS

| | | |
|---|---|---|
| JP | 2006-157324 | 6/2006 |
| JP | 2006-157884 | 6/2006 |
| JP | 2006-245646 | 9/2006 |

* cited by examiner

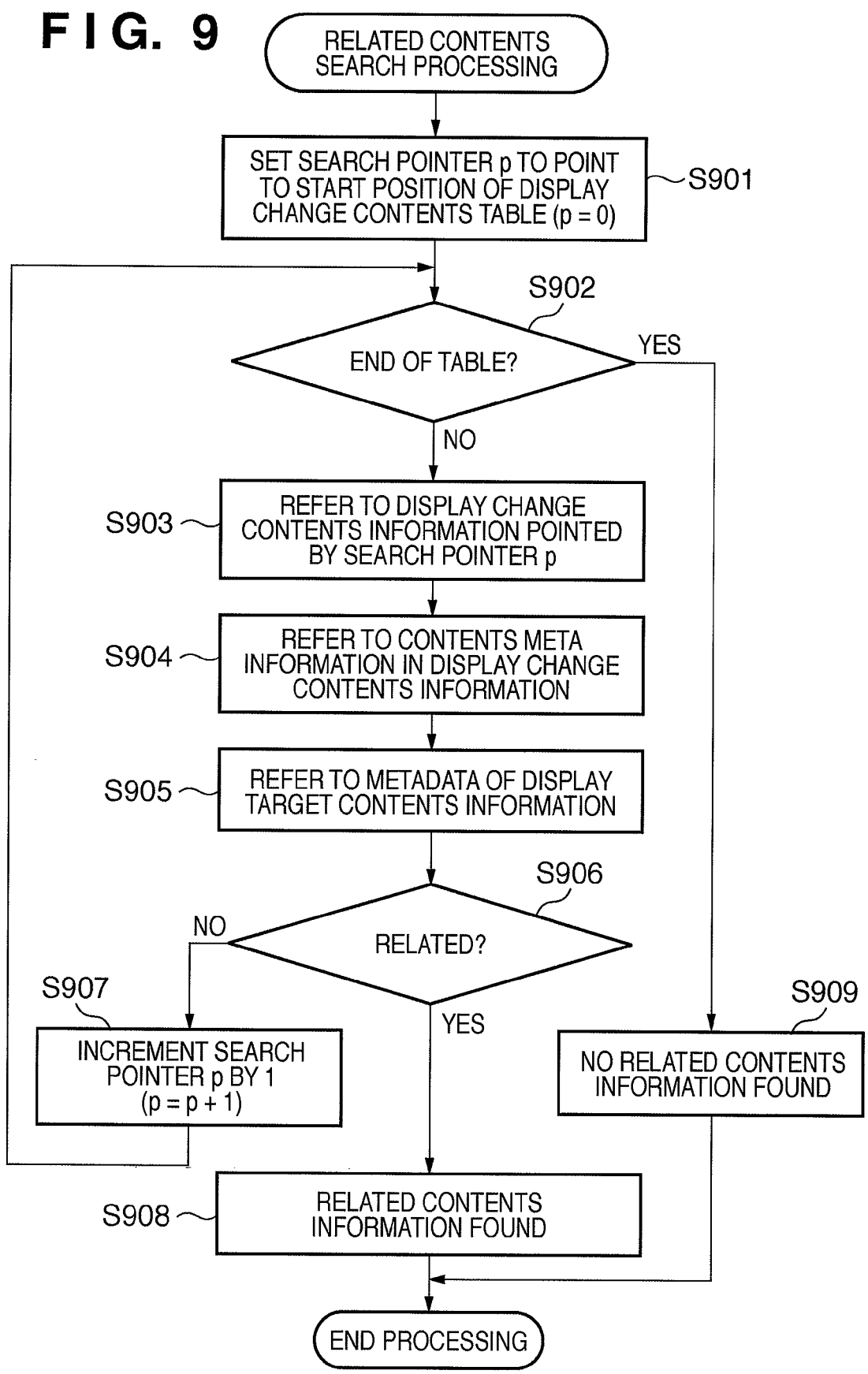

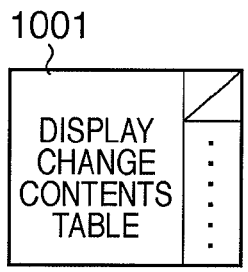
FIG. 10A
FIG. 10B
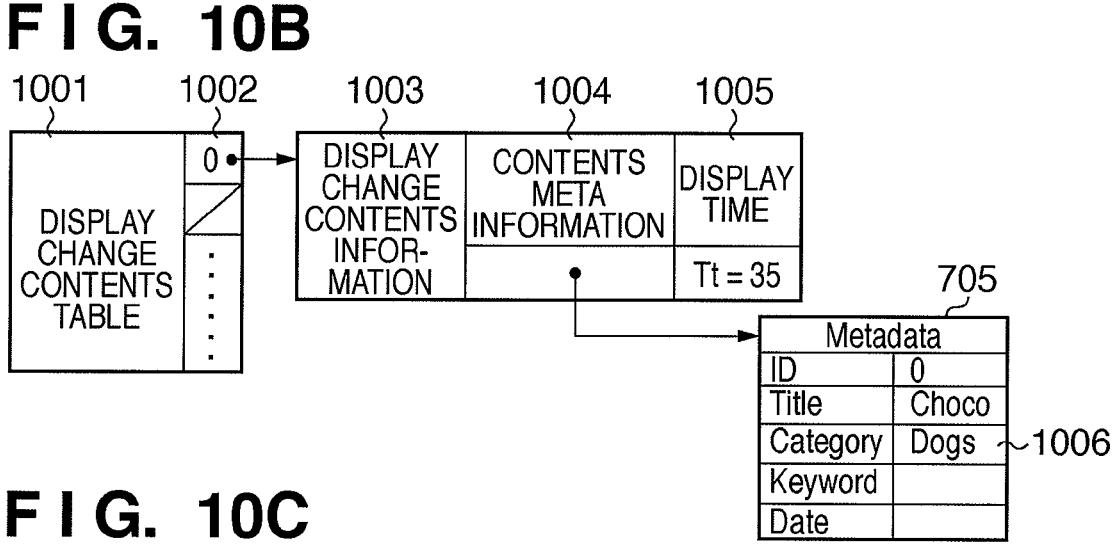
FIG. 10C
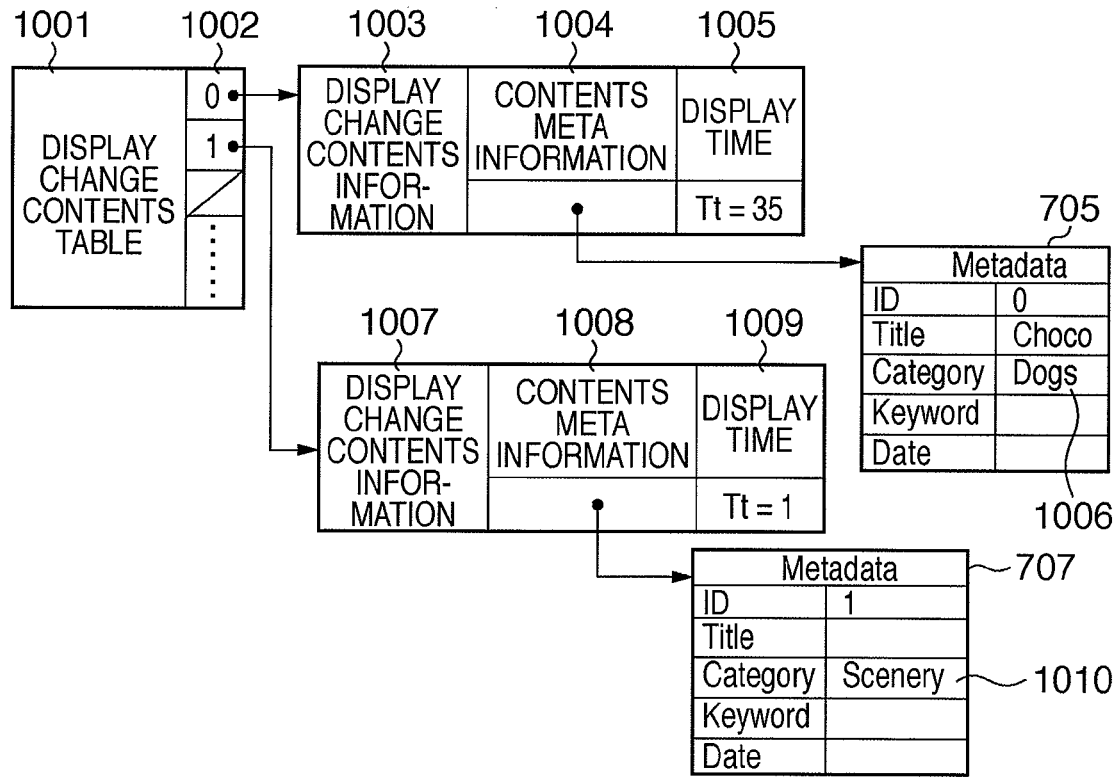

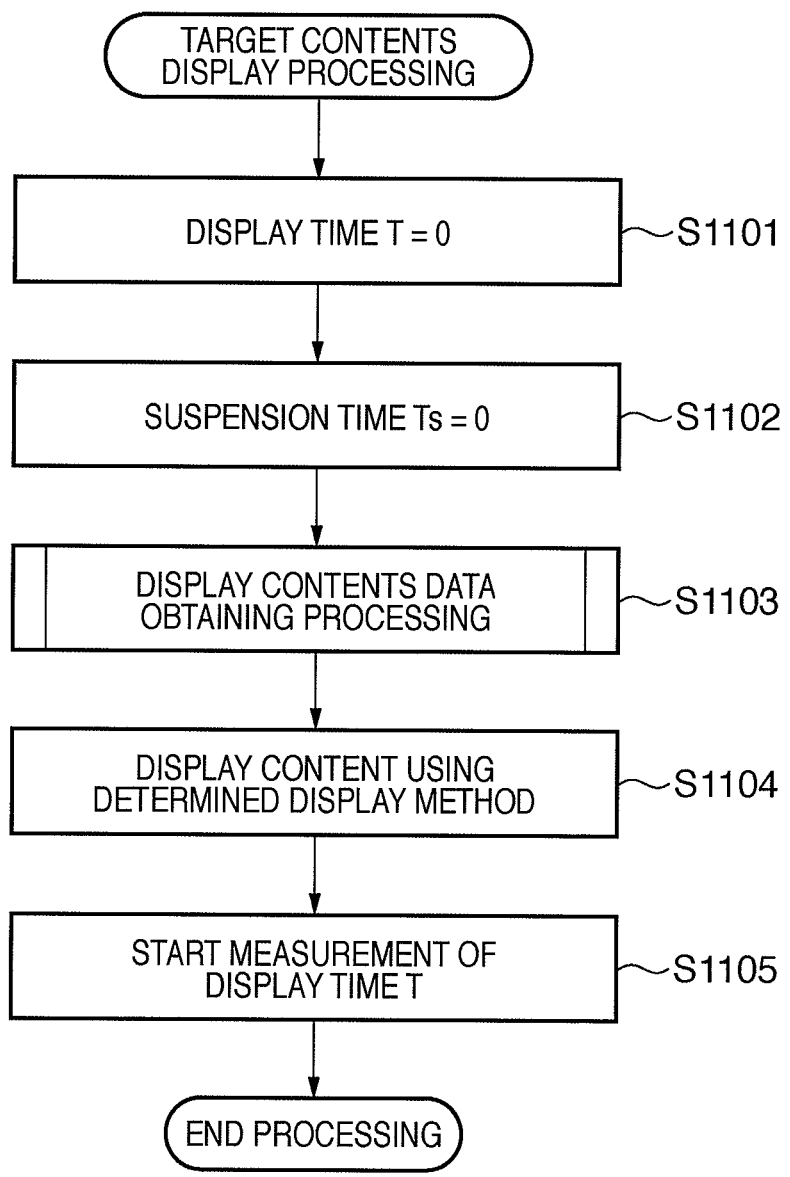

FIG. 20A

| DISPLAY TIME T | REGISTERED DISPLAY TIME Tt |
|---|---|
| T | T |

| DISPLAY TIME T | REGISTERED DISPLAY TIME Tt |
|---|---|
| Tlong < T | T |

| DISPLAY TIME T | REGISTERED DISPLAY TIME Tt |
|---|---|
| T < Tshort | 1 |
| Tlong < T | 1 |

| DISPLAY TIME T | TARGET CONTENT | REGISTERED DISPLAY TIME Tt |
|---|---|---|
| T | Category = Dogs | T |
| | Category = Scenery | 1 |

2008, 2009, 2010

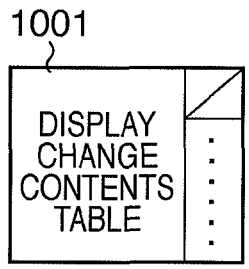
F I G. 27A
F I G. 27B
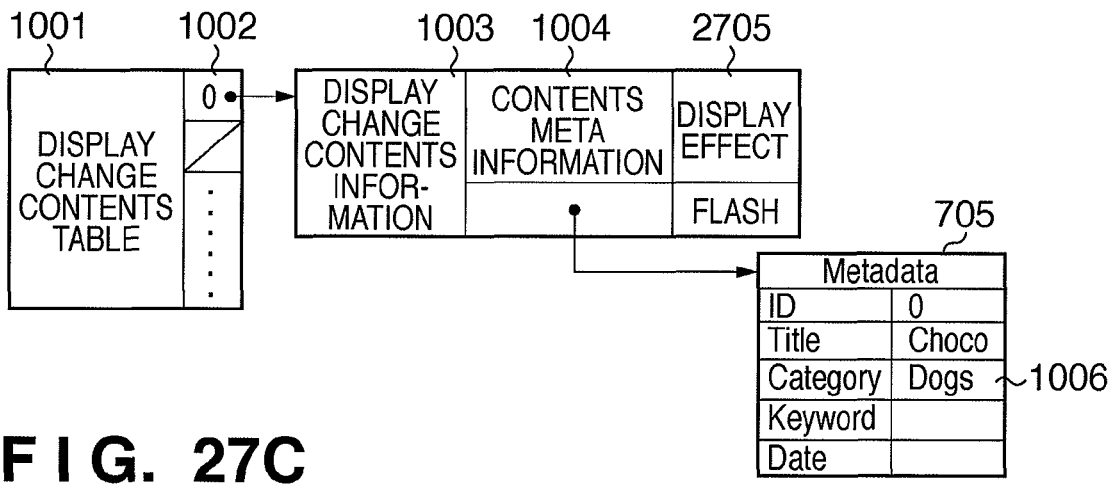
F I G. 27C
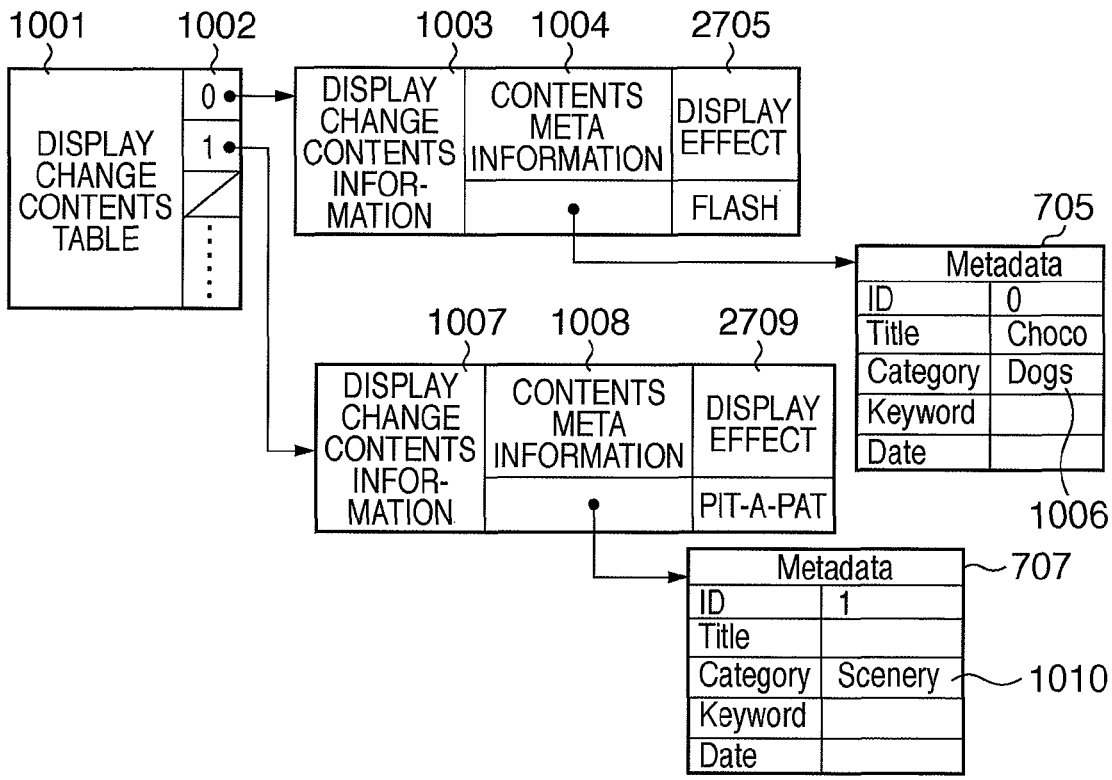

| LOCATION INFORMATION | METADATA | |
|---|---|---|
| file://fs/share/image/IMAGE1.jpg | DOG | ~4403 |
| file://fs/share/image/IMAGE2.jpg | CAT | ~4404 |
| file://fs/share/image/IMAGE3.jpg | GATOR | |
| file://fs/share/image/IMAGE4.jpg | CAT | ~4405 |
| file://fs/share/image/IMAGE5.jpg | BEAR | |

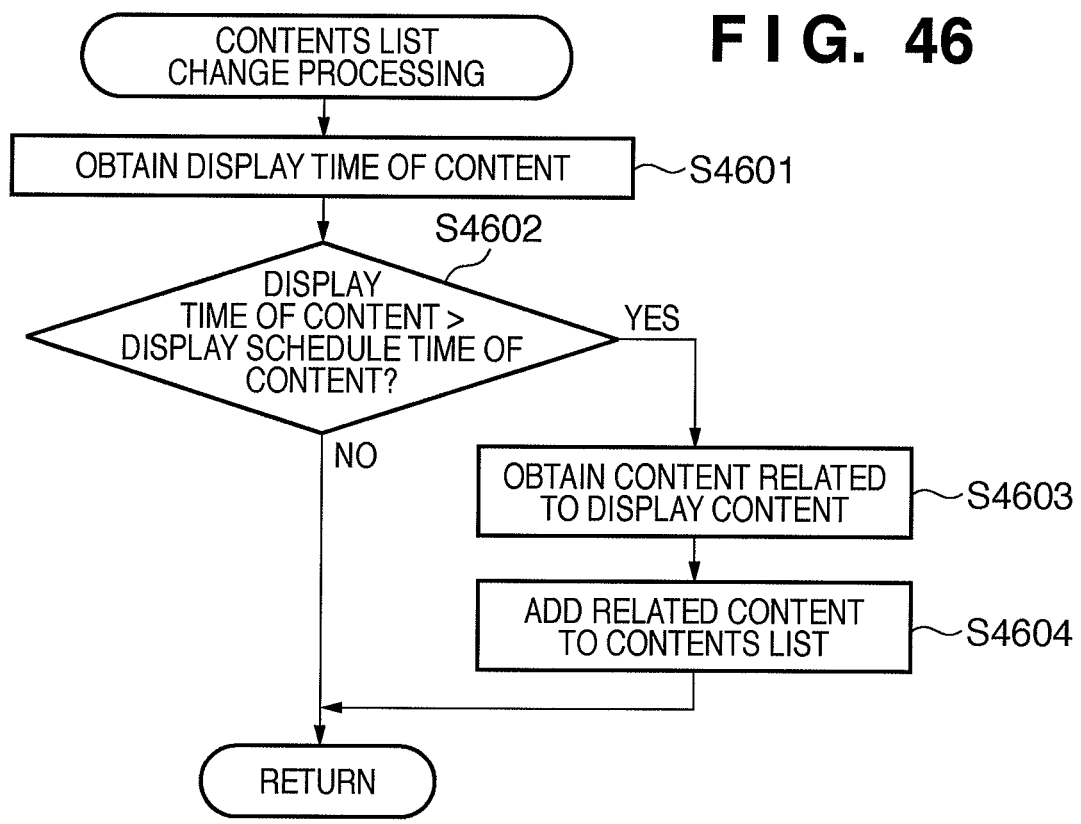

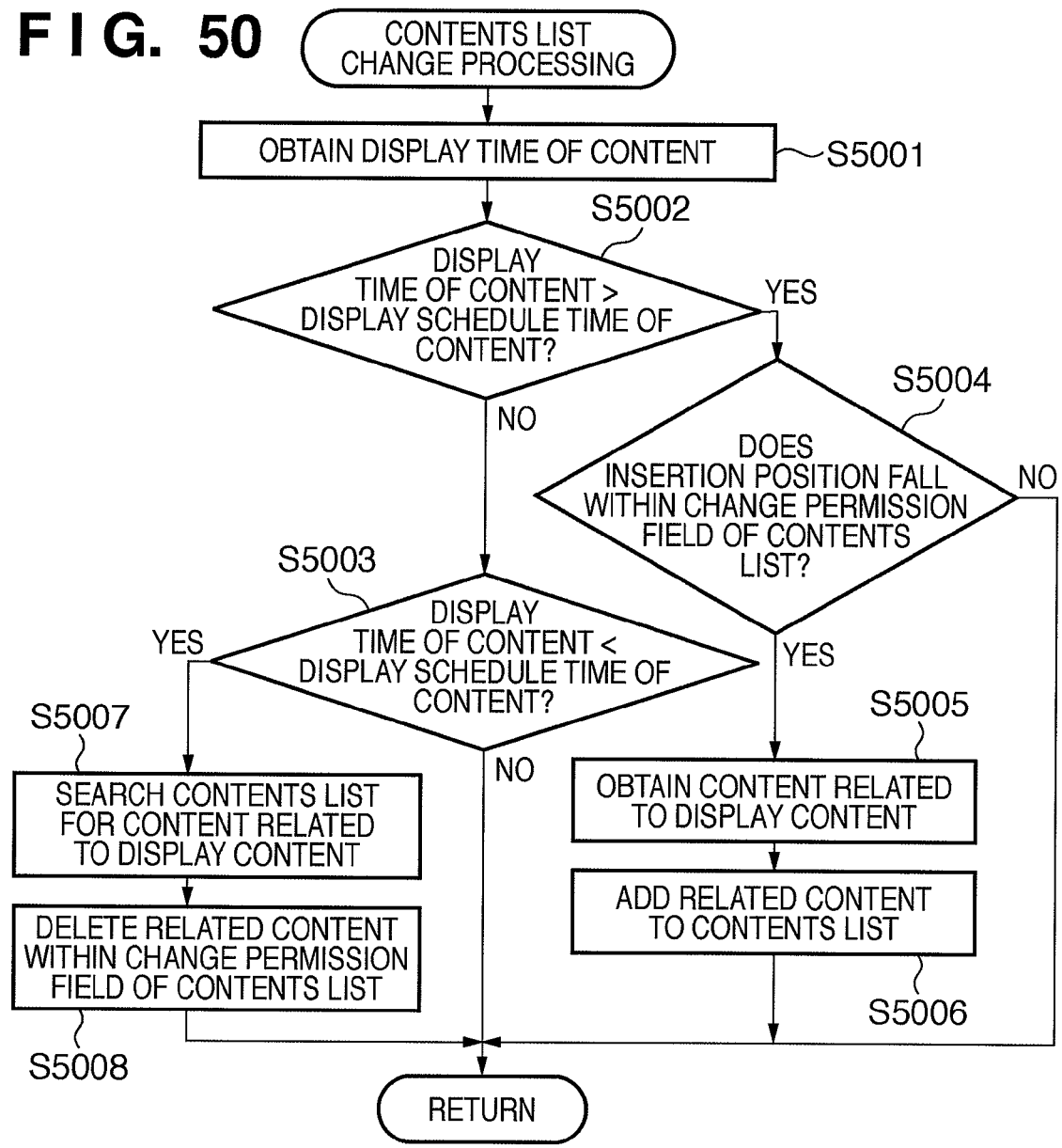

CONTENTS DISPLAY APPARATUS AND CONTROL METHOD THEREOF

BACKGROUND OF THE INVENTION

1. Field of the Invention

The present invention relates to a contents display apparatus for displaying one or a plurality of contents, and a control method thereof.

2. Description of the Related Art

In recent years, with the advent of large-capacity storage media in addition to the popularization of digital cameras and the improvement of network environments, growing of private contents such as images captured by digital cameras and contents obtained via a network is accelerating. Hence, a technique for browsing huge quantities of contents using a function of sequentially switching and displaying a plurality of images and contents on a screen (slideshow) is known. For example, browse software of digital camera images normally includes a slideshow function. This slideshow function is roughly classified into two types of methods, that is, a method of switching pages every time a specific key is pressed, and a method of automatically switching to the next page after an elapse of a predetermined period of time. Another slideshow function combines these two methods, and fast-forwards and switches pages upon pressing a specific key before an elapse of a predetermined period of time. Also, still another slideshow function displays an operation bar in the middle of a slideshow, and allows the user to make operations such as fast-forwarding, reverse-feeding, and suspending.

This slideshow function is normally used when the user searches for a desired image while browsing images captured by a digital camera. In this case, the user normally makes the following operations. That is, the user suspends a slideshow halfway to carefully view a given image, and then restarts the slideshow, or fast-forwards unwanted images. At this time, the user has to repeat similar user operations such as suspending and fast-forwarding with respect to contents displayed in the slideshow since he or she wants to display a desired image for a longer period of time but ceases to display an undesired image quickly.

In order to reduce such user operations, Japanese Patent Laid-Open No. 2006-157884 discloses a method which determines if a readout image matches a predetermined search key when an image feed button is pressed, and sets a longer display time period of an image which matches the search key than that which does not match the search key.

As the method of executing a slideshow, a method of executing a slideshow according to the order of a contents list, or a method of randomly executing a slideshow is used.

The aforementioned slideshow function normally has a mechanism which enhances entertainment by adding a display effect that arouses the user interest at the beginning, during, or end of display for respective contents, so as not to be boring to the viewer. As a method of giving the display effect to each content, a method of randomly giving the display effect by leaving it to an application that executes a slideshow, and a method in which the user performs an edit operation in advance to add the display effect suited to each content are available. In this case, the latter method in which the user adds the display effect can add the display effects suited to each individual content, and a better slideshow can be realized.

However, when the user manually adds the display effect, the processes for assigning display effects in a number as large as the number of contents to be displayed in the slideshow need to be executed, thus requiring much labor. As a technique for reducing the load on such processes, the following techniques have been proposed.

Japanese Patent Laid-Open No. 2006-245646 has proposed a technique which has a function of detecting the number, sizes, positions, and the like of persons who appear in each content, and changing a display time of that content in correspondence with the number, sizes, and positions of persons. As a result, for a content that the user wants to view for a longer period of time, the display time can be automatically prolonged.

Japanese Patent Laid-Open No. 2006-157324 has proposed a technique which has a function of extracting related information such as information at the time of image capturing and category information appended to each content, or previous playback frequency information of that content and controls a playback state based on the related information. As a result, that content can be automatically played back in correspondence with the related information.

Furthermore, in a slideshow, when the user decides the display order of contents, he or she can build a slideshow according to his or her preference. However, in order to execute such slideshow, the user has to select favorite contents in advance and set their display order, resulting in troublesome operations. To solve this problem, the following techniques have been proposed.

Japanese Patent Laid-Open No. 2005-039359 has proposed a technique that searches for images related to those displayed in a slideshow, and displays a list of images related to the displayed images after the slideshow to facilitate selection of favorite contents. However, with the method of Japanese Patent Laid-Open No. 2005-039359, the user has to finally select related images from the list, resulting in troublesome operations.

Japanese Patent Laid-Open No. 2005-341510 discloses a technique that allows the user to switch to display an image related to the displayed image by operating a remote controller. However, in Japanese Patent Laid-Open No. 2005-341510, the user has to consequently select images, resulting in cumbersome operations.

However, with the method proposed by Japanese Patent Laid-Open No. 2006-157884, a search key used to prolong the display time needs to be set before the beginning of a slideshow. For this reason, display of the next and subsequent slides cannot be changed by reflecting the user interactive operation during a slideshow.

Furthermore, in Japanese Patent Laid-Open No. 2006-245646, the display times of respective contents are changed in accordance with the number, sizes, and positions of persons who appear in the contents. However, these conditions (the number, sizes, and positions of persons) that decide the display time are set in advance, and display that the user wants is not always executed. When similar group photos continuously appear, long display times are unwantedly set even for similar contents, and the user gets tired of them.

Japanese Patent Laid-Open No. 2006-157324 controls the playback state in correspondence with arbitrary related information corresponding to contents, and appropriate related information needs to be prepared for each content so as to execute appropriate playback that the user wants. When playback frequency information or the like is used, the user has to repeat playback. If the user makes an inappropriate operation at that time, appropriate playback using operation frequencies is no longer executed. Furthermore, when a plurality of users execute playback, the playback frequency information is not effective for a specific user.

In the methods of Japanese Patent Laid-Open No. 2005-039359 and Japanese Patent Laid-Open No. 2005-341510, which build a slideshow suited to user's preference by deciding the execution order of the slideshow, the user has to select favorite contents in advance so as to execute a slideshow according to his or her preference.

SUMMARY OF THE INVENTION

The present invention has been made in consideration of the above problems, and according to its exemplary embodiments, troublesome repetitions of similar operations during subsequent display is reduced by reflecting a user operation to the currently displayed content upon sequentially switching and displaying a plurality of images and contents on a screen.

According to another exemplary embodiments of the resent invention, a slideshow close to user's preference can be built without any troublesome operations by inserting favorite contents of the user in a slideshow.

Further more, according to another exemplary embodiments of the resent invention, troublesome repetitions of similar operations during subsequent display can be reduced by reflecting a user operation to the currently displayed content during display of a slideshow.

According to one aspect of the present invention, there is provided a contents display apparatus comprising: a storage unit configured to store display schedule information indicating display schedules of a plurality of contents so as to sequentially display the plurality of contents; a display unit configured to display contents on a display according to the display schedule information; an operation unit configured to receive a user operation associated with the display while a content is displayed by the display unit; a determination unit configured to determine, based on metadata of respective contents, a content which is related to the content displayed when the operation unit receives the user operation; and a change unit configured to change the display schedule information using the display schedule of the content determined as a related content by the determination unit.

Furthermore, according to another aspect of the present invention, there is provided a method of controlling a contents display apparatus which comprises a storage unit configured to store display schedule information indicating display schedules of a plurality of contents so as to sequentially display the plurality of contents, comprising: a display step of displaying contents on a display according to the display schedule information; an operation step of receiving a user operation associated with the display while a content is displayed in the display step; a determination step of determining, based on metadata of respective contents, a content which is related to the content displayed when the user operation is received in the operation step; and a change step of changing the display schedule information using the display schedule of the content determined as a related content in the determination step.

Further features of the present invention will become apparent from the following description of exemplary embodiments with reference to the attached drawings.

BRIEF DESCRIPTION OF THE DRAWINGS

FIG. 9 is a flowchart showing the sequence of related contents determination processing according to the embodiment;

FIGS. 10A, 10B, and 10C are views showing an example of a display change contents table according to the first embodiment;

FIG. 11 is a flowchart showing an example of target contents display processing according to the first embodiment;

FIGS. 20A, 20B, 20C, and 20D are views showing examples of display change contents registration rules according to the third embodiment;

FIGS. 27A, 27B, and 27C are views showing an example of the data configuration of a display change contents table according to the fifth embodiment;

FIG. 46 is a flowchart for explaining processing in the contents display apparatus according to the ninth embodiment;

FIG. 47 is a view showing a contents list held in the data memory of the contents display apparatus according to the ninth embodiment;

FIG. 50 is a flowchart for explaining processing in a contents display apparatus according to the 11th embodiment; and FIG. 51 is a view showing an example of the data configuration of a contents list held in a data memory of the contents display apparatus according to the eleventh embodiment.

DESCRIPTION OF THE EMBODIMENTS

Preferred embodiments of the present invention will be described hereinafter with reference to the accompanying drawings.

[First Embodiment]

Figure 1:
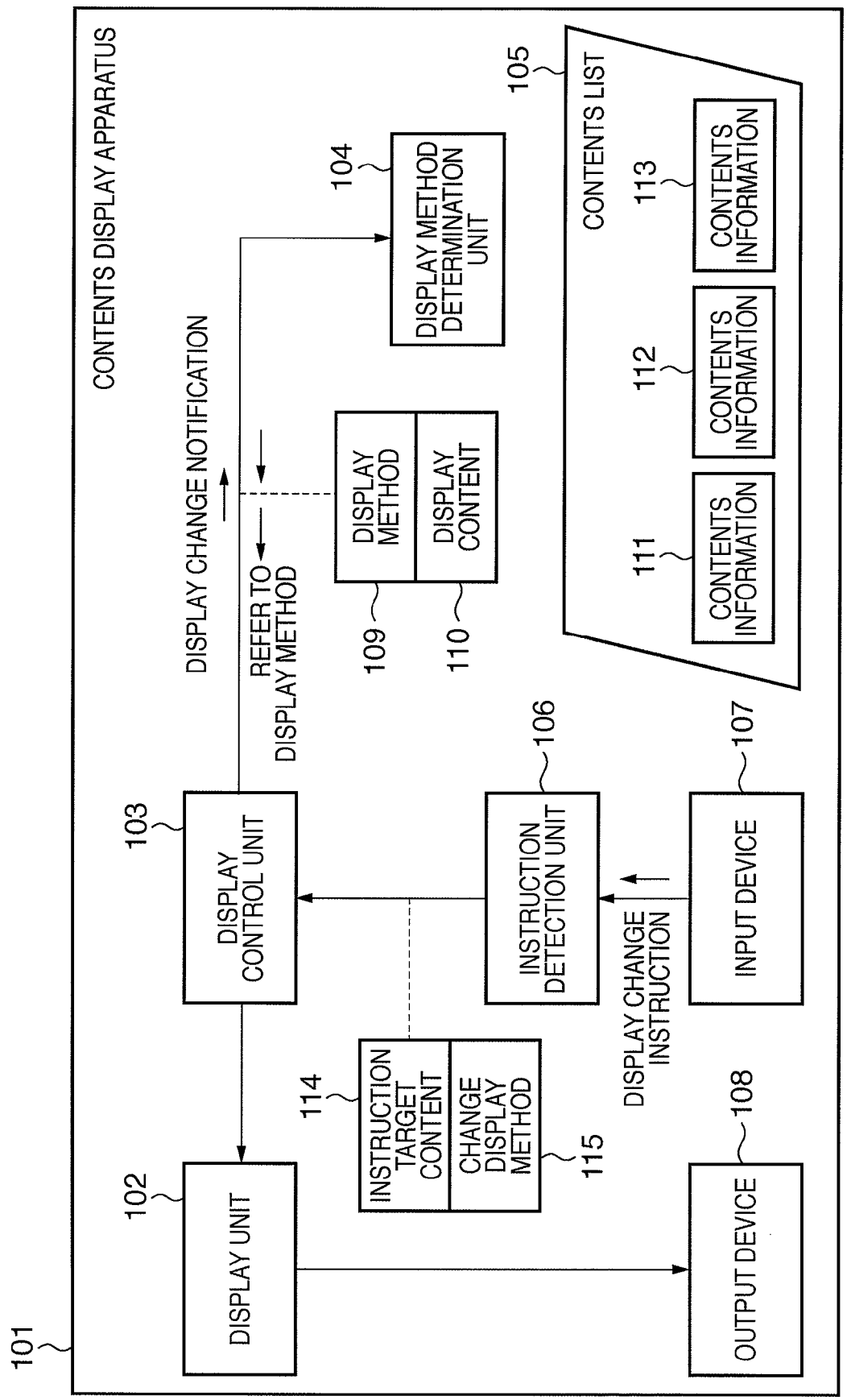
FIG. 1 is a block diagram showing an example of the arrangement of a contents display apparatus according to the first embodiment.

FIG. 1 is a block diagram showing an example of the arrangement of a contents display apparatus according to the first embodiment. A contents display apparatus 101 of this embodiment includes a display unit 102, display control unit 103, display method determination unit 104, contents list 105, instruction detection unit 106, input device 107, and output device 108.

The display unit 102 displays contents on the output device 108 under the control of the display control unit 103. The output device 108 is a display using a liquid crystal panel or the like. The display control unit 103 controls the display unit 102 to display a series of pieces of contents information 111 to 113 based on the contents list 105 by a display method determined by the display method determination unit 104. The display method determination unit 104 determines a content to be displayed and a display method of each content based on the information of a series of contents to be displayed (pieces of contents information 111 to 113 in the contents list 105). The contents list 105 is a list of pieces of contents information 111 to 113 to be displayed, and is display schedule information indicating display schedules of a plurality of contents so as to sequentially display the plurality of contents. The display control unit 103 controls to sequentially display contents according to the content to be displayed and the display method determined by the display method determination unit 104 to realize a slideshow. In this way, the plurality of contents is sequentially displayed on the display according to the display schedule information. The contents list 105 may be stored inside the contents display apparatus 101, or may be stored in an external storage device. Note that details of the contents list 105 as the display schedule information will be described later with reference to FIG. 5.

The instruction detection unit 106 detects a content as an operation target (instruction target content 114) in accordance with a user operation to the content displayed by the display control unit 103, which is input from the input device 107. The instruction detection unit 106 detects change contents (change display method 115) of the display method instructed by the user operation at that time. In this manner, the input device 107 and instruction detection unit 106 receive a user operation associated with display while the content is displayed on the output device 108 by the display unit 102, and hold the received user operation.

Each of the pieces of contents information 111 to 113 stores information for display control (to be also referred to as a display method hereinafter) such as link information to a content stored in a storage device 205 or the like (to be described later with reference to FIG. 2), a display time, and display effect. The display method determination unit 104 obtains a display content 110 according to the link information in the contents information, generates a display method 109 according to the display control information of the contents information, and provides the display content 110 and display method 109 to the display control unit 103. The display method determination unit 104 determines if the display content 110 indicated by the contents information 111 is related to the held instruction target content 114. If it is determined that these contents are related, the display method determination unit 104 changes the display method 109 of the display content 110 based on the held change display method 115.

As described above, the display method determination unit 104 determines a content which is related to a content displayed when the input device 107 and instruction detection unit 106 receive a user operation, with reference to respective contents. In this embodiment, attribute information (metadata) of a content is used to determine the related content. The display method determination unit 104 changes the display schedule by changing the display schedule of a content determined as the related content (e.g., by changing the display method 109), thus displaying a slideshow. As a result, the display time and display effect of a related content are changed in accordance with a user operation with respect to a certain content, as will be described later.

Figure 2:
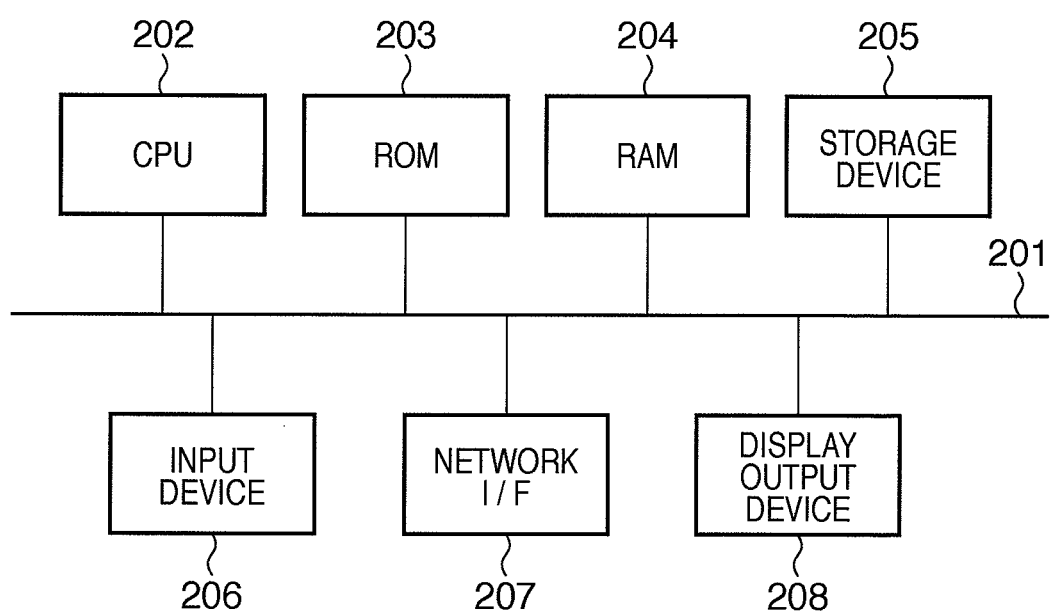
FIG. 2 is a block diagram showing an example of the hardware arrangement of the contents display apparatus according to the first embodiment.

FIG. 2 is a block diagram showing an example of the hardware arrangement of the contents display apparatus according to the first embodiment. The contents display apparatus of this embodiment can be implemented by an information processing apparatus such as a so-called personal computer.

Referring to FIG. 2, reference numeral 202 denotes a CPU which makes arithmetic operations, logical decisions, and the like for various kinds of processing to control respective components connected to a bus 201. This contents display apparatus incorporates a memory including a program memory and data memory. The program memory stores programs for control by the CPU 202 including processing sequences to be described later using the flowcharts. The memory may be a ROM 203 or a RAM 204 on which programs are loaded from an external storage device or the like. Reference numeral 205 denotes a storage device such as a nonvolatile memory or hard disk, which is used to store data and programs. Reference numeral 206 denotes an input device represented by a mouse, touch panel, keyboard, and the like, which is used to input information from the user. Reference numeral 208 denotes a display output device which outputs analyzed data output information, and includes a display device such as a CRT or liquid crystal display. Reference numeral 207 denotes a network I/F which exchanges information with other storage media and devices connected via a network.

Figure 3:
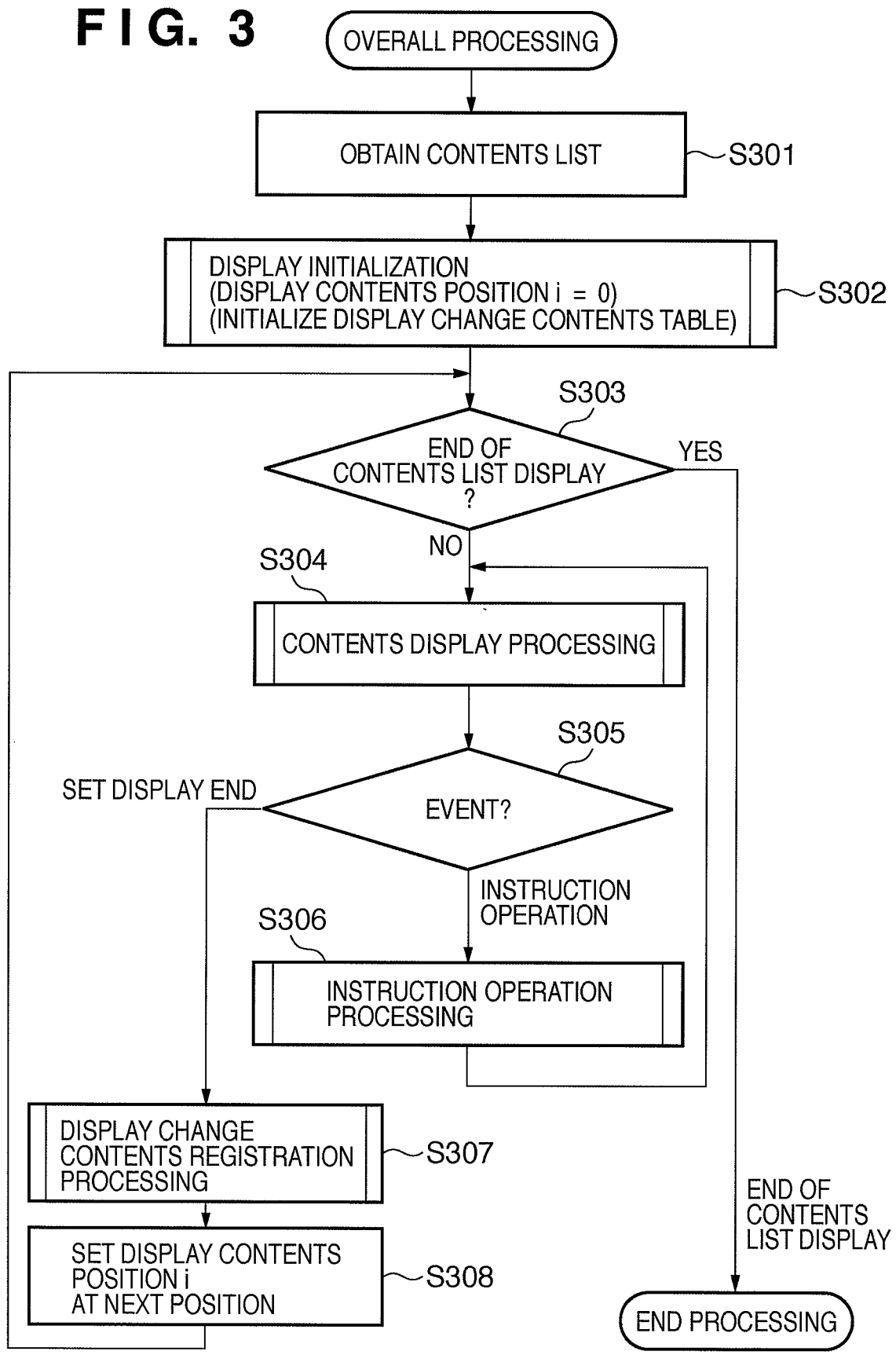
FIG. 3 is a flowchart showing the sequence of the overall processing of the contents display apparatus according to the first embodiment.

FIG. 3 is a flowchart showing an example of the sequence of the overall processing of contents list display according to the first embodiment.

In the contents display apparatus according to the first embodiment, the display method determination unit 104 obtains the contents list 105 to be displayed (step S301). Contents included in the contents list 105 may be either those which are stored in a local storage or those which can be referred to from devices or storages connected via a network.

The display method determination unit 104 then executes initialization for contents list display (step S302). In this case, for example, the unit 104 sets a current display contents position i to a start position (i=0) of the list, and initializes a display change contents table 1001 shown in FIGS. 10A, 10B, and 10C.

The display method determination unit 104 determines in step S303 if all contents have been displayed. If the current display contents position i is smaller than a contents list length, the display method determination unit 104 displays a target content via the display control unit 103 (step S304). The processing in step S304 (contents display processing) will be described later with reference to the flowchart of FIG. 4.

After the display target content is displayed in step S304, the process advances to step S305, and the display control unit 103 waits for an event. If the user makes an instruction operation with respect to the currently displayed content, the process advances from step S305 to step S306 (instruction operation processing), and processing corresponding to the instructed operation is executed. If a display end event (e.g., an elapse of a display time) is detected, the process advances from step S305 to step S307 (display change contents registration processing).

Upon completion of the display change contents registration processing in step S307, the display method determination unit 104 increments the display contents position i by one in step S308, and the process returns to the determination processing in step S303. If it is determined in step S303 that the display contents position exceeds the rearmost position of the contents list, the contents list display processing ends.

Figure 4:
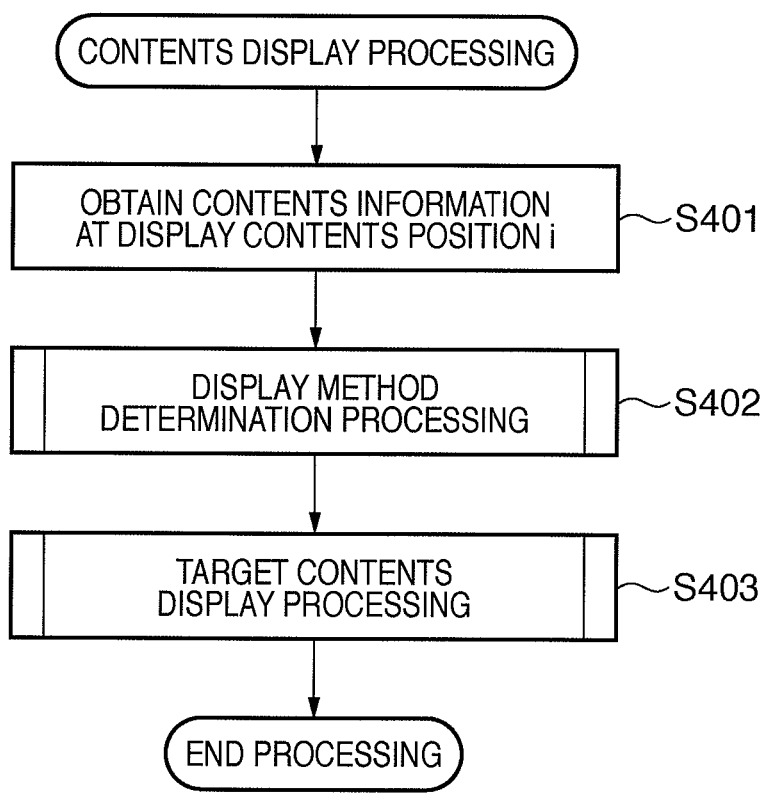
FIG. 4 is a flowchart showing contents display processing according to the first embodiment.

FIG. 4 is a flowchart showing an example of the sequence of the contents display processing according to the first embodiment.

Figure 6:
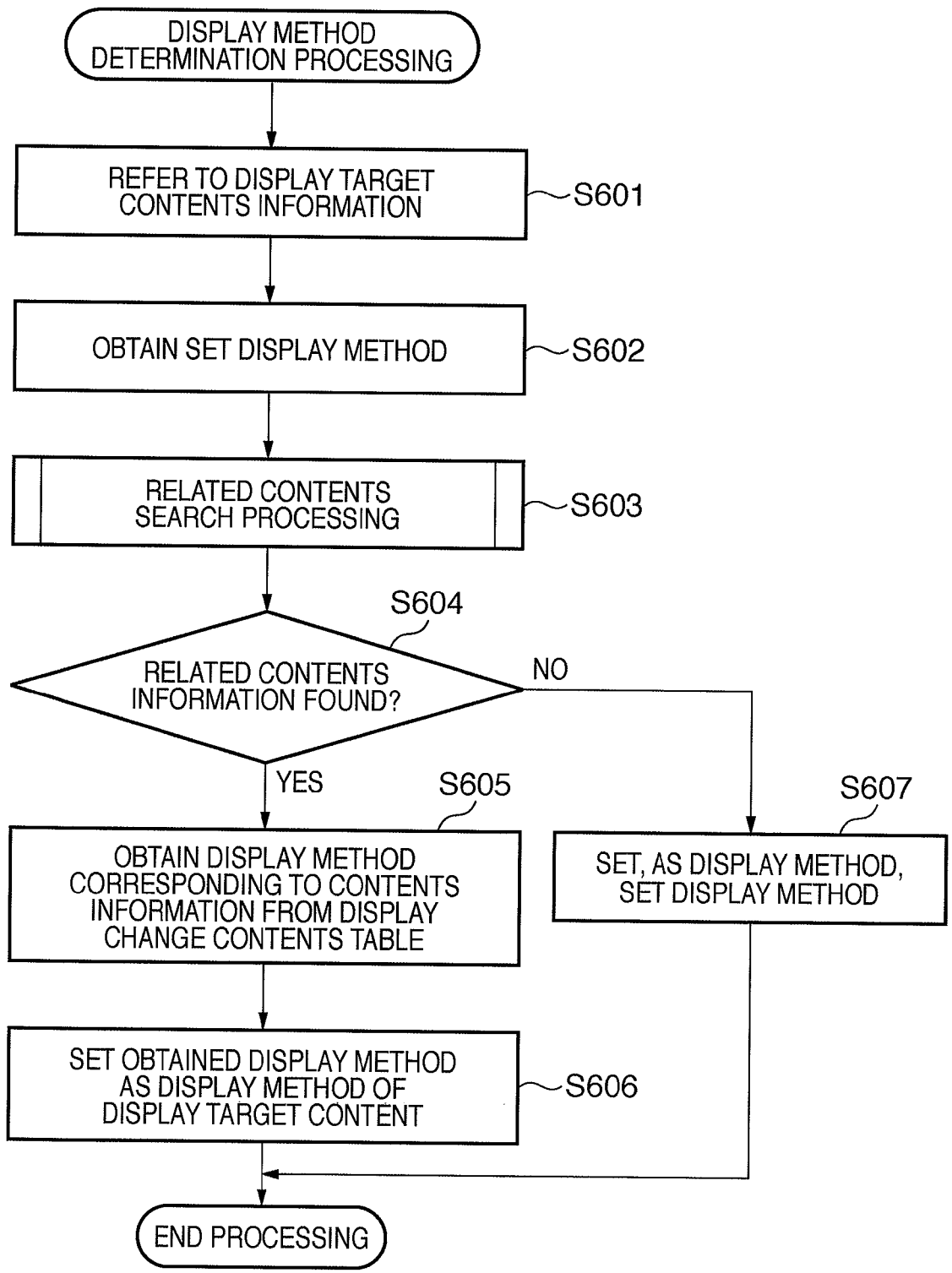
FIG. 6 is a flowchart showing an example of contents display method determination processing according to the embodiment.
Figure 7:
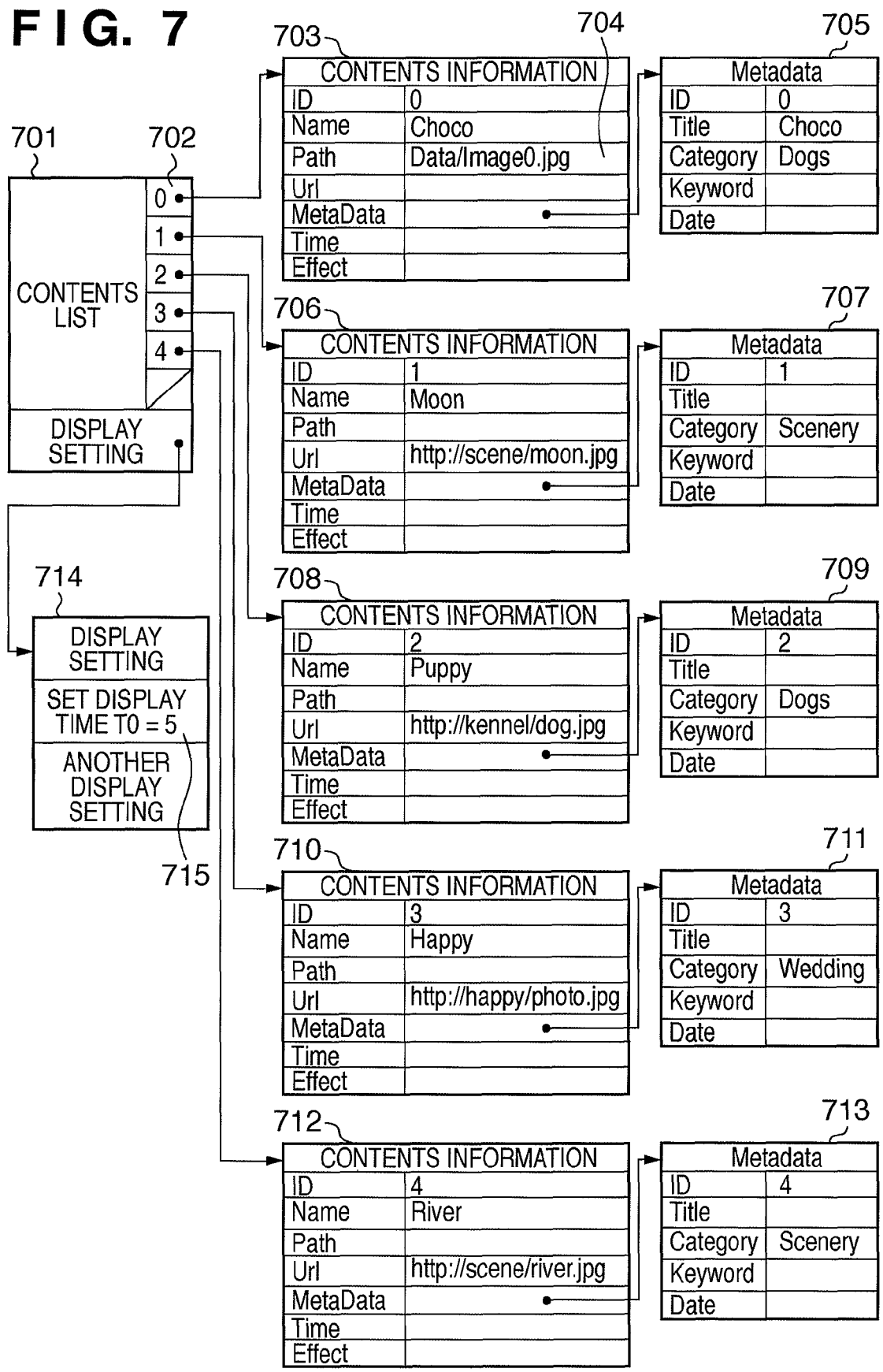
FIG. 7 is a view showing an example of the data configuration of a contents list and contents information according to the first embodiment.

In step S401, the display method determination unit 104 obtains contents information at the display contents position i. The display method determination unit 104 determines a display method using the contents information obtained in step S401 (step S402). FIGS. 6 and 7 show an example of the sequence of the processing in step S402. The display control unit 103 obtains the determined display method and display target content from the display method determination unit 104, and displays the display target content using the determined display method (step S403). An example of the sequence of this processing is shown in FIG. 11.

Figure 5:
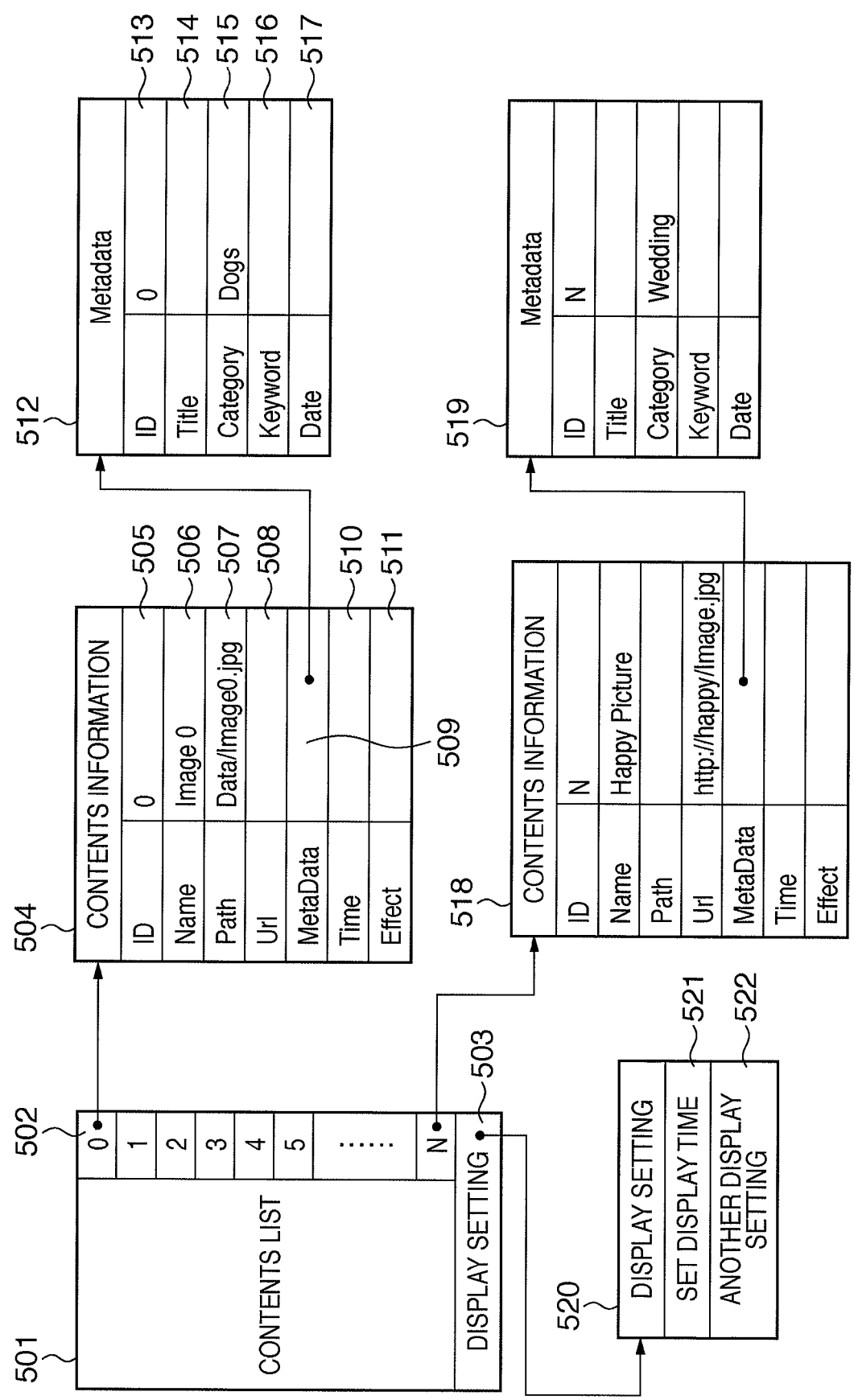
FIG. 5 is a view showing an example of the data configuration of a contents list and contents information according to the first embodiment.

FIG. 5 is a view showing an example of the contents list obtained in step S301, and the contents information obtained in step S401.

A contents list 501 (corresponding to the contents list 105) includes pointers 502 to a plurality of pieces (N pieces) of contents information, and a pointer 503 to a display setting for these pieces of contents information. According to FIG. 5, the 0th pointer of the contents list points to contents information 504.

The contents information 504 includes seven pieces of information 505 to 511. Reference numeral 505 denotes a contents identifier "ID=0"; and 506, a contents name "Name=Image0".

The contents information 504 includes, as a link to an entity of a content, information of a path 507 to contents data in case of local data or an access URL 508 to contents data in case of data in an external storage. The contents information 504 also includes information such as a pointer 509 to contents metadata (MetaData), a contents display time 510 (Time) as information for display control (display method), and contents display effect 511 (Effect). The pointer 509 to the contents metadata points to contents metadata 512. The contents metadata 512 corresponding to the contents information 504 includes a contents identifier 513, title 514, category 515, keyword 516, date of creation (Date) 517, and the like.

Likewise, the pointers 502 to the respective pieces of contents information in the contents list 501 point to corresponding pieces of contents information. For example, the fifth pointer points to contents information 518, and a pointer to metadata (Metadata) in that contents information 518 points to contents metadata 519.

The pointer 503 to the display setting of the contents list points to a display setting 520 of the contents list. The display setting 520 includes a set display time 521. The display setting 520 may include another display setting information (another display setting 522). The set display time 521 is set with a standard display time of each content.

FIG. 6 is a flowchart showing an example of the sequence of the display method determination processing in step S402.

The display method determination unit 104 refers to display target contents information (that pointed by a pointer at the position i) like the contents information 504 in FIG. 5 (step S601), and obtains the set display method (step S602). The display method obtained in this case includes the display setting 520 shown in FIG. 5 and the display method (contents display time 510 and display effect 511) in the contents information 504 of the display target content. The display method determination unit 104 determines if the display method of a content related to the display target content has been changed by a user operation in the contents display processing executed so far (step S603).

This processing refers to the display change contents table 1001 shown in FIGS. 10A to 10C. Information of the content whose display method has been changed by a user instruction operation is compared with the contents information of the current display target content to determine if there is a related content. If it is determined that the display change contents table 1001 includes related contents information, the process advances from step S604 to step S605. In step S605, the display control unit 103 obtains the display method corresponding to the contents information from the display change contents table 1001 (step S605). The display control unit 103 notifies the display method determination unit 104 of the obtained display method, and the display method determination unit 104 sets the notified display method as that for the display target content (step S606).

On the other hand, as a result of the related contents determination processing in step S603, if no related content is found, the process advances from step S604 to step S607. In step S607, the display method determination unit 104 determines the display method obtained in step S602 as that of the corresponding content.

FIG. 7 is a view showing an example of the contents list and contents information according to the first embodiment. The sequence of display processing according to this embodiment will be described using a contents list 701 and pieces of contents information 703, 706, 708, 710, and 712 in FIG. 7. Reference numeral 702 denotes pointers which respectively point to the storage positions of the pieces of contents information 703, 706, . . . .

In a slideshow of this embodiment, contents are sequentially displayed according to the contents list 701 in FIG. 7. Examples when a display time included in the display method has been changed, that is, an example in which when the user carefully views a content indicated by the contents information 703 for a long period of time by making a suspension operation during display of that content, a content indicated by the contents information 708, which is related to the contents information 703, is also displayed for the same long period of time, and an example in which when the user fast-forwards a content corresponding to the contents information 706, a content indicated by the contents information 712, which is related to the contents information 706, is also displayed only for a short period of time will be described.

In step S302 in FIG. 3, the current display contents position i is set at the start position of the list, and the process advances to the contents display processing in step S304. In the contents display processing, the contents information 703 at the display contents position i=0 is obtained from FIG. 7 in step S401. In step S402, a display method is determined. The sequence of this processing is shown in FIG. 8.

Figure 8:
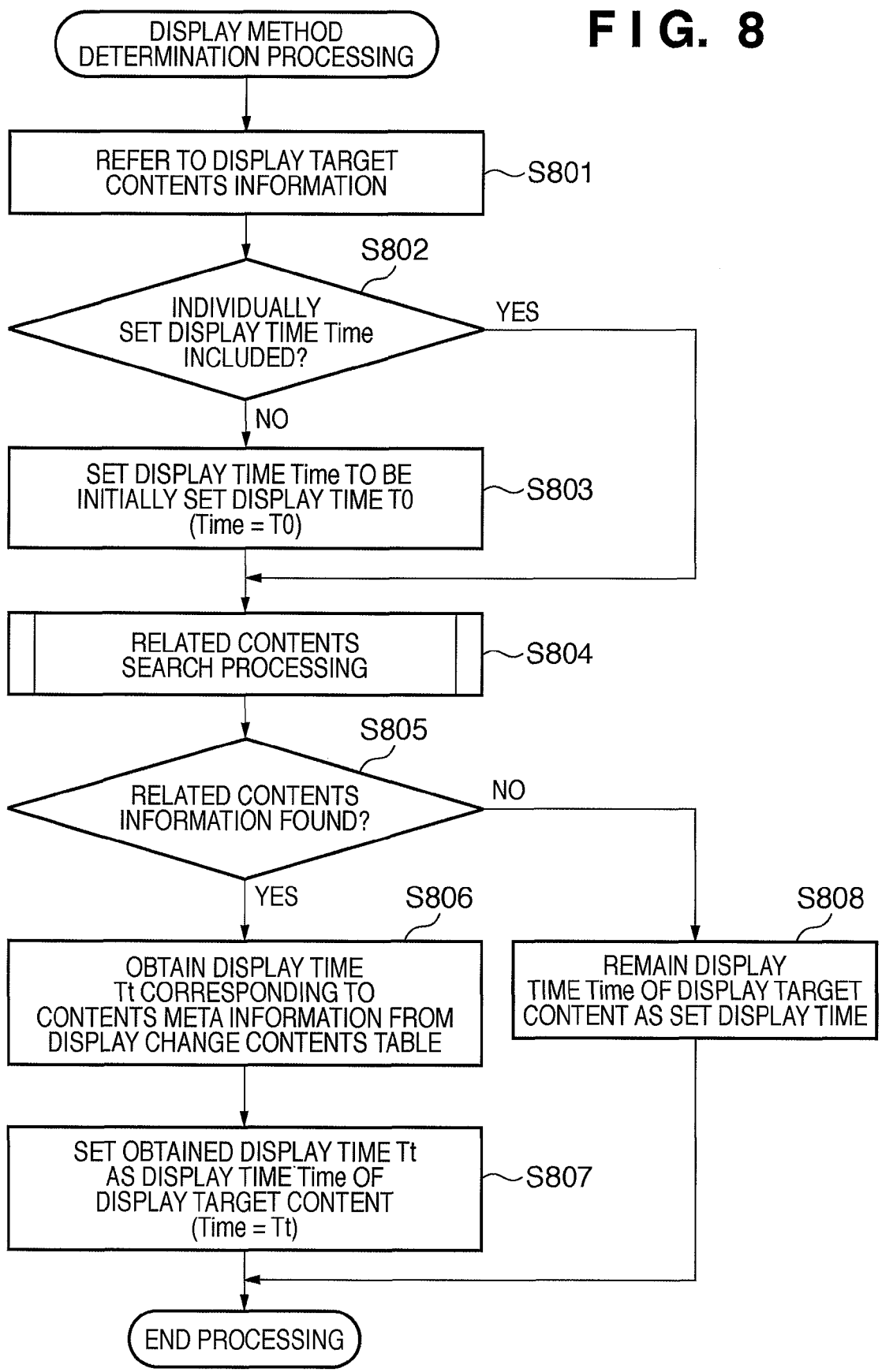
FIG. 8 is a flowchart showing an example of contents display method determination processing according to the first embodiment.

FIG. 8 is a flowchart showing an example of the display method determination processing in step S402 according to the first embodiment. In the flowchart in FIG. 8, the display method determination processing shown in FIG. 6 is specialized to a display time.

In step S801, the display method determination unit 104 refers to the display target contents information 703. With reference to the contents information 703, since no individually set display time Time is set, the process advances from step S802 to step S803. Since a set display time 715 in a display setting 714 of the contents list 701 is T0=5, the display method determination unit 104 sets the display time Time (=initially set display time T0)=5 of the contents information 703. In step S804, the display method determination unit 104 executes related contents search processing. This related contents search processing will be described below with reference to the flowchart of FIG. 9.

FIG. 9 is a flowchart showing an example of the sequence of the related contents search processing in step S804 according to the first embodiment.

In step S901, the display method determination unit 104 sets a search pointer p which points to a position on the display change contents table 1001 to be searched to point to the start position of the table. If the search processing of the display change contents table 1001 is not complete yet, the process advances from step S902 to step S903, and the display method determination unit 104 refers to display change contents information pointed by the search pointer p. The display method determination unit 104 refers to contents metadata in the display change contents information which is being referred to (step S904). Furthermore, the display method determination unit 104 refers to MetaData (metadata 705 in this case) of the contents information of the display target content to be displayed, and compares it with the contents metadata referred to in step S904 (step S905).

The display method determination unit 104 determines in step S906 based on the comparison result in step S905 if the two contents are related to each other. If the two contents are not related to each other, the display method determination unit 104 increments, by one, the search pointer p that points to the position on the display change contents table 1001 in step S907, and the process returns to step S902. The aforementioned processes are repeated until it is determined in step S902 that the search processing for the table is complete or until a related content is found in step S906. If the search processing for the table is complete without finding any related content, it is determined that no related content is found (step S909). If a related content is found, the display method determination unit 104 determines the presence of related contents information in step S908, thus ending this processing.

In this embodiment, assume that a content which is determined as a related content in step S906 is that which has the same values of corresponding items in metadata.

In this case, the display change contents table 1001 may be referred to in turn, and a content which is found first may be determined as a related content. Alternately, the entire display change contents table 1001 may be referred to and the best related content may be searched for. For example, if pieces of contents meta information including the same metadata items are registered in the display change contents table 1001, a content including more matched items may be determined as a related content.

FIGS. 10A to 10C are views showing an example of the display change contents table according to the first embodiment.

In the display initialization processing in step S302, assume that the display change contents table 1001 is initialized, as shown in FIG. 10A. Since the current display target content is the first one of the contents list, the display change contents table 1001 is empty.

Hence, in the related contents search processing in step S804, the process advances from step S902 to step S909 in FIG. 9 to determine that no related content is found. As a result, the process advances from step S805 to step S808, and the target display content is set to have a display time Time=5, thus ending the display method determination processing (step S402) in FIG. 4.

The process then advances to step S403 to execute target contents display processing. The sequence of this processing is shown in FIG. 11. FIG. 11 is a flowchart showing an example of the sequence of the target contents display processing by the display control unit 103 according to the first embodiment.

The display control unit 103 initializes a display time T of the display target content to zero (step S1101), and also initializes a suspension time Ts of the display target content to zero (step S1102). The display control unit 103 then obtains Path information of the display target contents data from the display method determination unit 104, and obtains actual display data based on the obtained Path information (step S1103). The display method determination unit 104 obtains Path information with reference to a Path attribute 704 in the contents information of the current display target content, and provides the obtained Path information to the display control unit 103.

Furthermore, in step S1104 the display control unit 103 receives a notification of the display method (display time Time=5) determined in step S402 in FIG. 4 from the display method determination unit 104, and displays the content by the notified display method (step S1104). At the same time, the display control unit 103 starts measurement of the display time T of the display target content (step S1105).

Subsequently, the sequence of the overall processing (FIG. 3) advances to step S305, and the display control unit 103 waits for an event. Assume that the user gives an instruction to make a suspension operation at the timing of the display time T=1 with respect to the currently displayed content.

As a result of the user suspension operation, an instruction operation event is recognized in step S305, and the process advances to step S306 (instruction operation processing). The sequence of the instruction operation processing in this embodiment will be described below with reference to the flowchart of FIG. 12.

Figure 12:
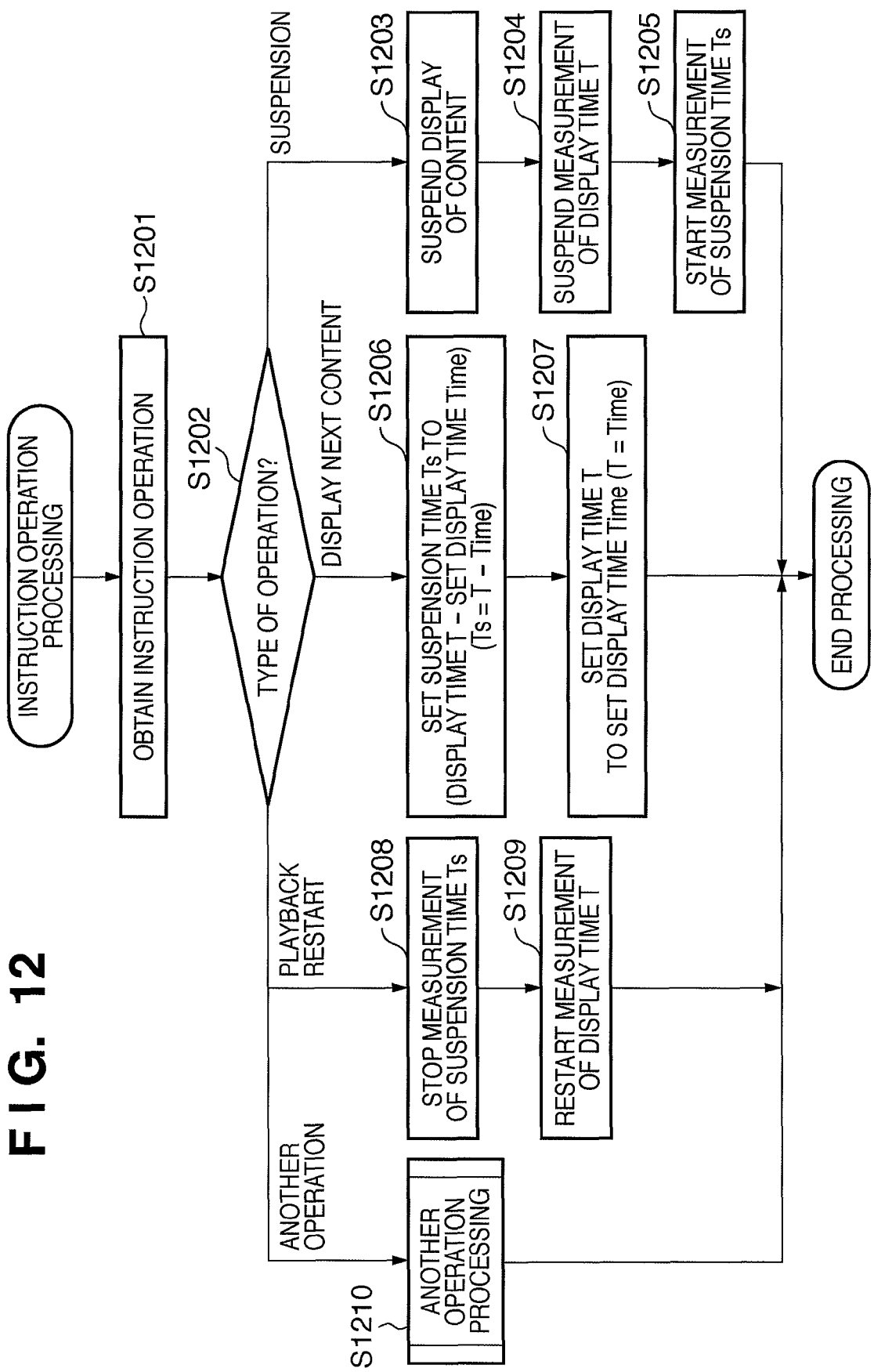
FIG. 12 is a flowchart showing an example of instruction operation processing according to the first embodiment.

FIG. 12 is a flowchart showing an example of the sequence of the instruction operation processing according to the first embodiment. In step S1201, the display control unit 103 obtains a user operation ("suspension" in this case), the instruction for which was given from the input device 107 by the user and was detected by the instruction detection unit 106. In step S1202, the display control unit 103 determines the type of operation. In this case, since the operation is "suspension", the process advances to step S1203. The display control unit 103 suspends display of the content (step S1203), and also suspends measurement while the display time T assumes the current value (T=1) (step S1204). Furthermore, the display control unit 103 starts measurement of a suspension time as Ts (step S1205), and the process returns to the event waiting state in step S305 in FIG. 3.

If the user makes a playback restart instruction operation after he or she suspends display for a while, the process advances from step S305 to step S306 (the instruction operation processing in FIG. 12) in the same manner as described above.

If the display control unit 103 obtains an operation, the instruction for which was given by the user ("playback restart" in this case) in step S1201, the process advances from step S1202 to step S1208. In step S1208, the display control unit 103 ends measurement of the suspension time Ts. Assume that Ts=30. In step S1209, the display control unit 103 restarts measurement of the display time T from the time (T=1 in this example) suspended in step S1203, and returns to the event waiting state (step S305 in FIG. 3). Note that the flowchart of FIG. 12 shows operations other than those described above as "another operation" (step S1210).

After the display time T of the display target content elapses until the display method (display time Time=5) determined in step S402 in FIG. 4, the set display time ends, and the process advances from step S305 to step S307 (display change contents registration processing). The display change contents registration processing will be described below with reference to the flowchart of FIG. 13.

Figure 13:
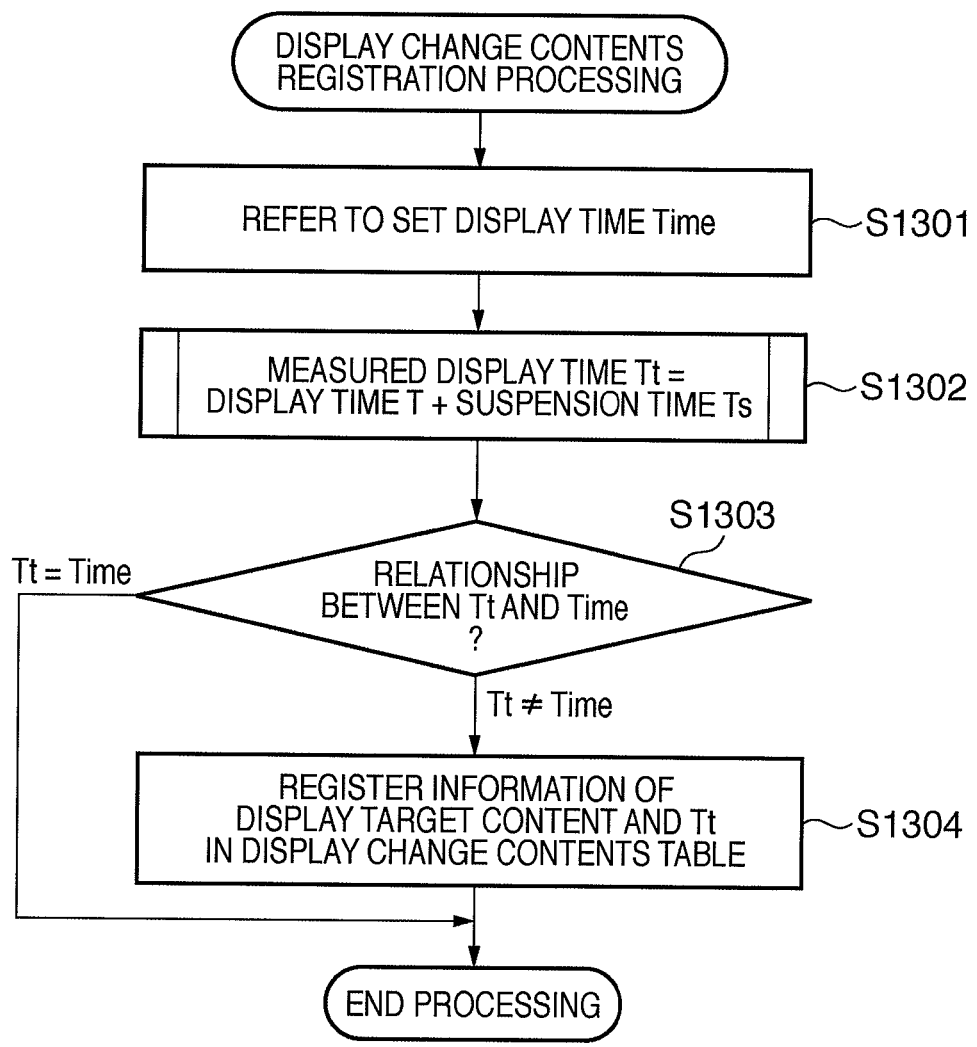
FIG. 13 is a flowchart showing an example of display change contents registration processing according to the first embodiment.

FIG. 13 is a flowchart showing an example of the sequence of the display change contents registration processing according to the first embodiment. This processing registers metadata of a content displayed at the time of reception of the user operation, and the display method changed by the user operation in the display change contents table 1001 as change information.

The display control unit 103 refers to the display method (display time Time=5) determined by the display method determination unit 104 in step S402 in FIG. 4 (step S1301). Subsequently, the display control unit 103 calculates a total measured display time Tt during which the display target content was displayed (step S1302). The total measured display time Tt is calculated by [display time T (Time=5)]+[suspension time Ts (=30)]=35. The display control unit 103 then determines the relationship between the measured display time Tt and set display time Time (step S1303).

When the actually displayed total display time Tt is different from the set display time Time, the process advances from step S1303 to step S1304. In step S1304, the display control unit 103 registers the metadata 705 of the display changed contents information 703, and the measured display time Tt (=35) in the display change contents table 1001 (step S1304).

As a result, the display change contents table 1001 shown in FIG. 10A is updated to that shown in FIG. 10B. In the display change contents table 1001 shown in FIG. 10B, a new pointer 1002 to 0th display change contents information 1003 is added. The display change contents information 1003 pointed by the pointer 1002 includes a pair of a pointer 1004 to contents meta information and a display time 1005. Note that the display time 1005 stores the aforementioned measured display time Tt. The pointer 1004 to the contents meta information points to the metadata 705 of the display changed contents information 703.

Upon completion of the display change contents registration processing in step S307, the process advances to step S308. The display control unit 103 increments the display contents position i by one in step S308 to set i=1, and the process returns to step S303. After that, a content of the contents information 706 having metadata 706 is displayed in step S304 in the same sequence.

That is, in the aforementioned sequence of the processing, the display method determination unit 104 determines a display method (display time Time=5) in step S402 in FIG. 4, and the display control unit 103 displays the content in step S403. The process then advances to step S305 in FIG. 3, and the display control unit 103 waits for an event.

After the display time T of the display target content elapses until the display method (display time Time=5) determined in step S402 in FIG. 4, a set display end event is generated. As a result, the process advances from step S305 to step S307, and the display control unit 103 executes display change contents registration processing (FIG. 13).

At this time, the measured display time Tt calculated in step S1302 matches the set display time Time. Therefore, the display change contents registration processing ends from step S1303, and the process advances to step S308. In step S308, the display contents position i is incremented by one to set i=2, and the process returns to step S303. Then, the second contents information 708 in the contents list is displayed in step S304.

In the contents display processing (step S304), the display method determination unit 104 obtains the contents information 708 (FIG. 7) at the display contents position i=2. In step S402, the display method determination unit 104 executes the display method determination processing shown in FIG. 8.

In step S801, the display method determination unit 104 refers to the display target contents information 708. By referring to the contents information 708, since no individually set display time Time is set, the process advances from step S802 to step S803. Since the set display time 715 in the display setting 714 of the contents list 701 is T0=5, the display time Time (=initially set display time T0)=5 is set. In step S804, the display method determination unit 104 executes the related contents determination processing.

At this time, the display change contents table 1001 is as shown in FIG. 10B. In the related contents search processing in step S804, the display method determination unit 104 refers to the 0th pointer 1002 in the display change contents table 1001 (step S903). The display method determination unit 104 refers to the metadata 705, which is pointed by the pointer 1004 to contents meta information in the registered display change contents information 1003, pointed by the pointer 1002 (step S904). Furthermore, in step S905 the display method determination unit 104 refers to metadata 709 in the contents information 708 of the current display target content. As a result of comparison between the two metadata, since "Category=Dogs" (1006) is matched, the process advances from step S906 to step S908, and the display method determination unit 104 determines that "a related content is found".

As a result, YES is determined in step S805, and the process advances to step S806. In step S806, the display method determination unit 104 changes the display method of the display target content in accordance with the change information obtained from the display change contents table. That is, the display method determination unit 104 obtains the display time Tt=35 corresponding to the related contents meta information from the display time 1005 of the display change contents information 1003 shown in FIG. 10B. In step S807, the display method determination unit 104 sets "35" in the display target contents display time Time, thus ending the display method determination processing (step S402 in FIG. 4).

After that, the process advances to step S403 in FIG. 4, and the display control unit 103 executes target contents display processing. As a result, the display target content corresponding to the position i=2 in the contents list is displayed by Time=35 in accordance with the sequence of the processing shown in FIG. 11.

Likewise, processing for displaying contents in the contents list 701 (display using the contents information 710 and metadata 711 at i=3, and that using the contents information 712 and metadata 713 at i=4) is repeated until the display contents position i=4.

As described above, according to the first embodiment, when the user displays a certain content for a time longer than the set display time by, for example, suspending display while that content is displayed, a content which is related to that content can be displayed for the same longer time when the related content is displayed.

In this embodiment, assume that the first contents information 706 in the contents list 701 in FIG. 7 is determined to have the display time Time=5 in step S402 (FIG. 4). Then, assume that the user skips display at the time of T=1 during display of a content indicated by the contents information 706 to display the next content. In this case, the display time of the contents information 712, which is related to the contents information 706, is set to be Time=1.

The sequence of the processing executed when the user skips display at the time of T=1 during display of a content indicated by the contents information 706 to display the next content is as follows.

In step S1201 in FIG. 12 (instruction operation processing), the display control unit 103 obtains an operation "display next content" instructed by the user. In step S1202, the display control unit 103 determines the type of operation obtained in step S1201. Since the operation is "display next content", the process advances to step S1206.

In step S1206, the display control unit 103 sets the suspension time Ts to be "display time T—set display time Time". In this example, since T=1 and Time=5, Ts=−4. In step S1207, the display control unit 103 sets the display time T to be the set display time Time (T=Time=5) to end display of the display target content.

After that, the process returns to the event waiting state in step S305 in FIG. 3. Since the display time T is set to be the set display time Time in step S1207, a set display end event is immediately generated, and the process advances from step S305 to step S307 (display change contents registration processing in FIG. 13).

The display control unit 103 refers to the display method (display time Time=5) determined by the display method determination unit 104 in step S402 in FIG. 4 (step S1301). The display control unit 103 then calculates the total measured display time Tt in which the display target content was displayed (step S1302). In this case, the total time Tt is calculated by display time T (Time=5)+suspension time Ts (=−4)=1. Subsequently, the display control unit 103 determines the relationship between the total display time Tt and set display time Time (step S1303). Since the actually displayed total display time Tt is different from the set display time Time, the process advances from step S1303 to step S1304. In step S1304, the display control unit 103 registers metadata 707 of the display changed contents information 706, and its total display time Tt (=1) in the display change contents table 1001 (step S1304).

As a result, the display change contents table 1001 is updated from the state shown in FIG. 10B to that shown in FIG. 10C.

The process then advances to step S308, and the display control unit 103 increments the display contents position i by one to set i=2. The process then returns to step S303. After that, processing for displaying contents in the contents list is repeated until i=4 in step S308.

Processing executed when contents information related to the contents information 706 is displayed will be described below. The contents display processing (step S304) when i=4 in the example of FIG. 7 will be exemplified below.

In the contents display processing shown in FIG. 4, the display method determination unit 104 obtains the contents information 712 at the position i=4 in the contents list 701 in step S401. In step S402, the display method determination unit 104 determines a display method of that content. The sequence of this processing is shown in FIG. 8.

In step S801, the display method determination unit 104 refers to the display target contents information 712. By referring to the contents information 712, since no individually set display time Time is set, the process advances to step S803. Since the set display time 715 set in the display setting 714 of the contents list 701 is T0=5, the display method determination unit 104 sets the display time Time (=initially set display time T0)=5. In step S804, the display method determination unit 104 executes related contents search processing.

The current display change contents table 1001 is as shown in FIG. 10C. The metadata 713 in the contents information 712 of the current display target content is compared with metadata 707 pointed by a pointer 1008 to contents meta information included in display change contents information 1007 that was registered in the display change contents table 1001. In this case, since "Category=Scenery" (1010) is matched, it is determined in the related contents search processing shown in FIG. 9 that a related content is found.

Hence, YES is determined in step S805, and the process advances to step S806. In step S806, the display method determination unit 104 obtains a display time 1009, that is, Tt=1 corresponding to the related contents meta information from the display change contents table 1001 shown in FIG. 10C.

In step S807, the display time Time=1 of the display target content is set, thus ending the display method determination processing in step S402 in FIG. 4.

After that, the process advances to step S403 in FIG. 4, and the target contents display processing is executed. In this case, the display target content is displayed only for Time=1.

As described above, processing for displaying contents in the contents list is repeated until the display contents position i reaches end of the contents list.

In this way, when the user displays a certain content for a time shorter than the set display time by fast-forwarding display, a content related to that content can be displayed for the same shorter time when the related content is displayed.

In the first embodiment, the correspondence between the contents information and display method is added to the display change contents registration table based on a user instruction, and is used to determine the display method of a related content. However, the present invention is not limited to such specific embodiment. For example, as another embodiment, every time the user makes an instruction operation, the display method (the display time 510 and display effect 511 in FIG. 5) of all contents in the contents list may be updated.

As described above, with the arrangement of this embodiment, based on a user operation during display of an arbitrary content, the display methods of subsequent related contents can be changed. For this reason, the contents list can be displayed according to user's preference without repeating the same operations.

Since the display times of the subsequent related contents is changed based on the display time change operation by the user, a content that the user wants to view can be displayed for a longer time, and another content that the user does not so want to view can be displayed for a shorter time.

[Second Embodiment]

The second embodiment will explain, in the arrangement that repetitively executes contents display according to display schedule information described in the first embodiment, a contents display apparatus which operates to inhibit a display change contents table from being changed by a user operation in contents display of the first round, and to register a user operation in the display change contents table, and to display respective contents by changing the display schedules of related contents according to the contents of the display change contents table in repetitive displays of the second and subsequent rounds.

Figure 14:
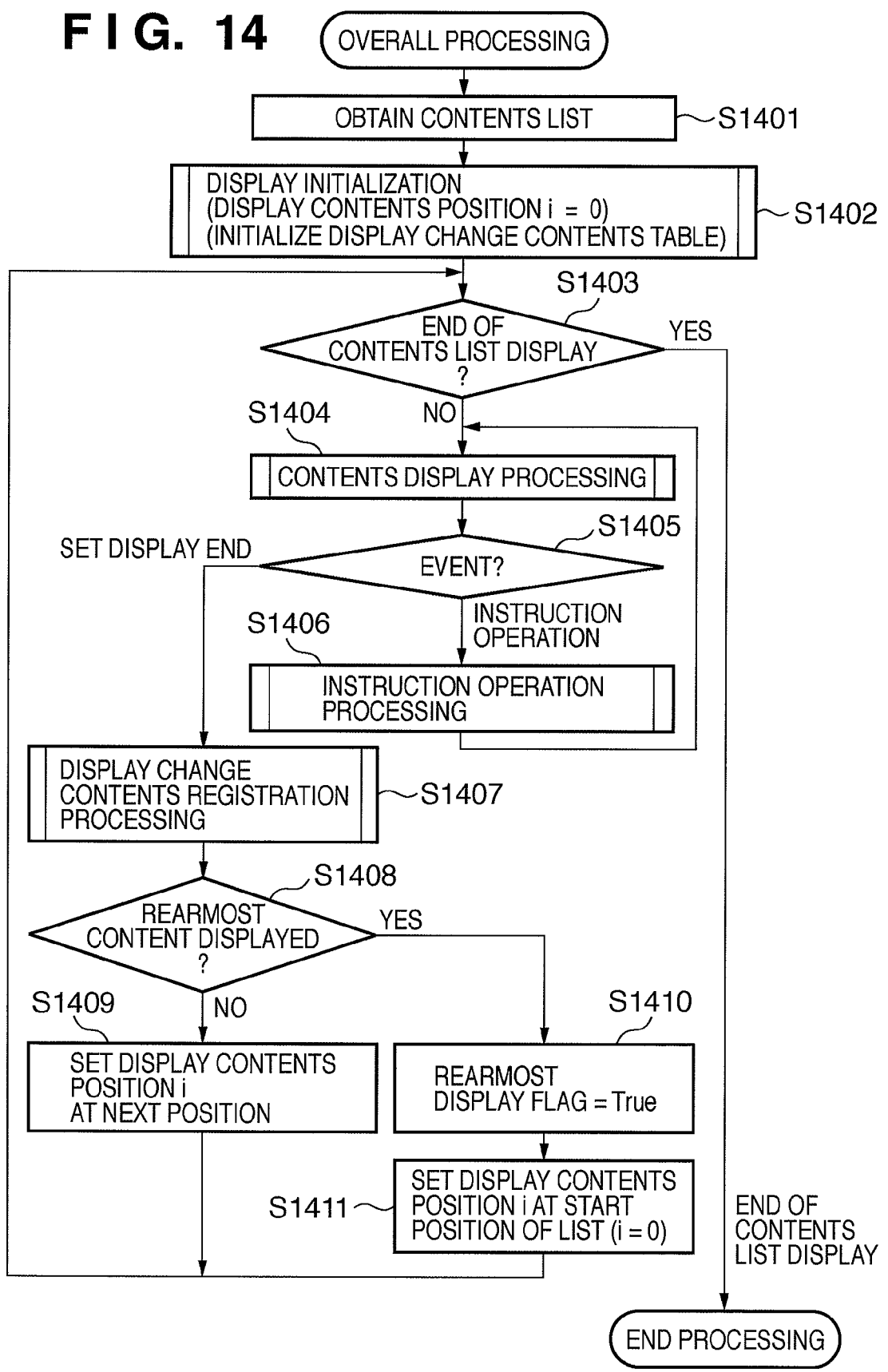
FIG. 14 is a flowchart showing the sequence of the overall processing of a contents display apparatus according to the second embodiment.

FIG. 14 is a flowchart showing an example of the sequence of the overall processing according to the second embodiment. In FIG. 14, the processes in steps S1408, S1410, and S1411 are added to the overall processing (FIG. 3) in the first embodiment. Therefore, steps S1401 to S1407 and S1409 in FIG. 14 are the same processes as in steps S301 to S308 in FIG. 3.

The display control unit 103 determines in step S1408 if a rearmost content has been displayed. If it is determined that the rearmost content has been displayed, the display control unit 103 sets a rearmost display flag=True in step S1410. In step S1411, the display control unit 103 returns the next display contents position to the start position (to set i=0). With this processing, contents are repetitively displayed according to the display schedule information (contents list).

Figure 15:
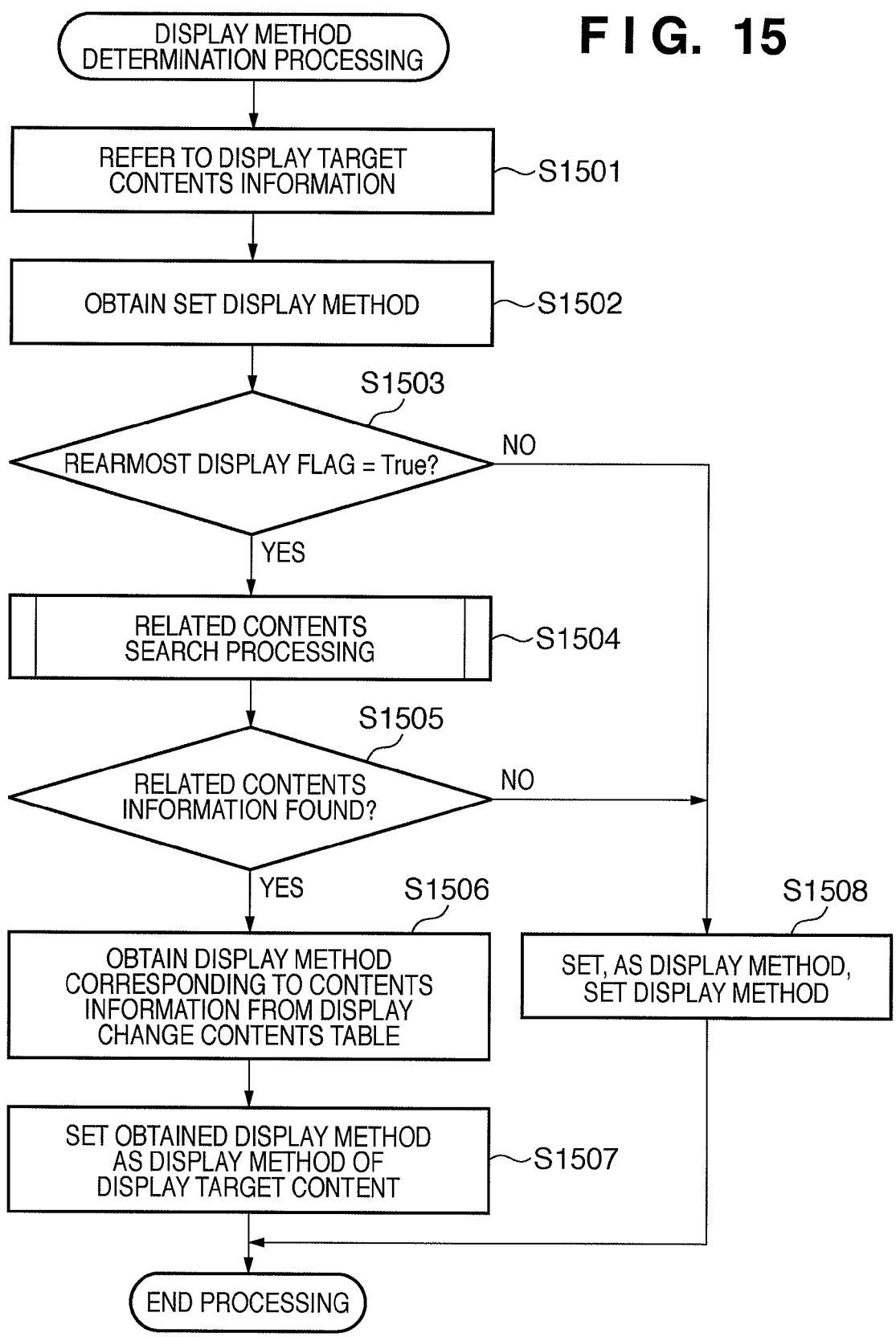
FIG. 15 is a flowchart showing an example of contents display method determination processing according to the second embodiment.

FIG. 15 is a flowchart showing an example of the sequence of display method determination processing according to the second embodiment. In FIG. 15, the determination process in step S1503 is added to the contents display method determination processing (FIG. 6) of the first embodiment. That is, steps S1501, S1502, and S1504 to S1508 are the same as the processes in steps S601, S602, and S603 to S607 in FIG. 6.

The display method determination unit 104 determines in step S1503 if the rearmost content has been displayed. In this embodiment, whether or not the rearmost content has been displayed is determined by checking if the rearmost display flag, which is set to be True in step S1410 when the rearmost content has been displayed, is True.

If it is determined in step S1503 that the rearmost display flag is False, since the display processing of the first round is in progress, the process advances to step S1508. Therefore, contents in the contents list are displayed by the display method as it is set in the display processing of the first round unless the user makes an operation "suspension" or "display next content". On the other hand, if the rearmost display flag is True, since the display processing of the second or subsequent round is in progress, the process advances from step S1503 to step S1504, and processing as described in the first embodiment is executed. That is, the user display change operation is registered in a display change contents table, and the display method of a related content is changed according to the display change contents table.

Figure 16:
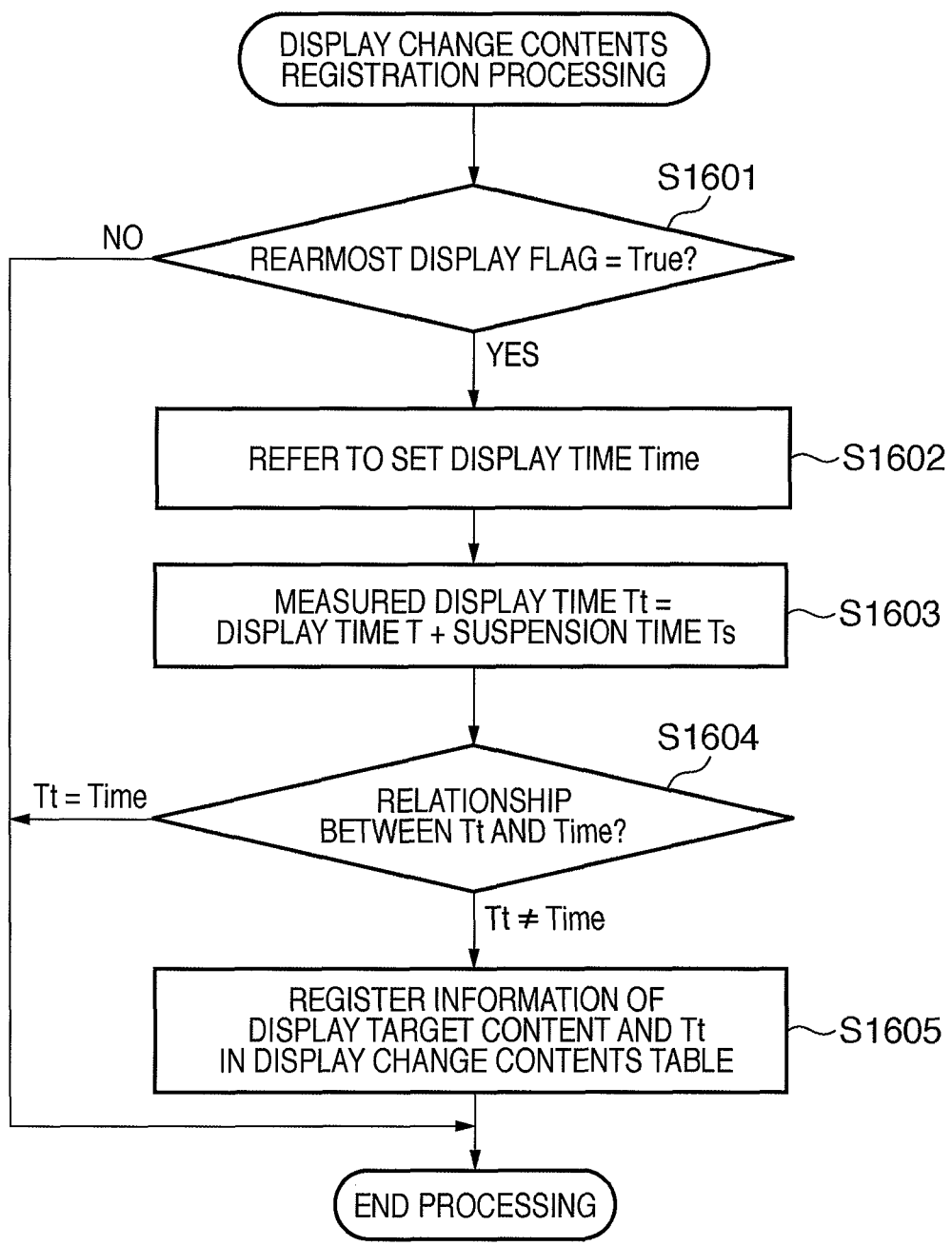
FIG. 16 is a flowchart showing an example of display change contents registration processing according to the second embodiment.

FIG. 16 is a flowchart showing an example of display change contents registration processing according to the second embodiment. In FIG. 16, the determination process in step S1601 is added to the display change contents registration processing (FIG. 13) of the first embodiment. That is, steps S1602 to S1605 are the same as the processes in steps S1301 to S1304 in FIG. 13.

The display control unit 103 determines in step S1601 if the rearmost display flag indicating whether or not rearmost content has been displayed is set to be True in step S1410. If it is determined in step S1601 that the rearmost display flag is False, the processing ends. If the rearmost display flag is True, the processes (steps S1301 to S1304) described in the first embodiment are executed in steps S1602 to S1605. That is, the display control unit 103 additionally registers, based on a user display change operation, a display method corresponding to the display change operation and the like in the display change contents table 1001.

As described above, with the arrangement of the second embodiment, a contents sequence is displayed by the display method as it is set in the display processing of the first round, and the display methods of subsequent related contents can be changed based on user display change operations in the second or subsequent round. Hence, when a significant contents sequence is to be displayed, the display setting can be inhibited from being changed halfway.

Also, the determinations in steps S1503 and S1601 may be changed to determine if "the rearmost display flag is False". In this case, the display methods of subsequent related contents are changed based on user display change operations in the first round, and contents are displayed by the default display method in the second or subsequent round.

Alternatively, it may be determined in step S1503 if "the rearmost display flag is True", and the determination process in step S1601 may be omitted to always execute the processes in step S1602 and subsequent steps. As a result, display methods based on user display change operations are registered in turn in the display change contents table, while the contents sequence is displayed by the display method as it is set in the display processing of the first round. In the second or subsequent round, the display methods of subsequent related contents are changed based on user display change operations by also reflecting the display change operations in the first round.

By switching the display determination method using the rearmost display flag, a part that allows changing display by user interactive operations, and a part that does not allow change can be set. Of course, an arrangement that allows the user to select the aforementioned display mode may be adopted.

[Third Embodiment]

Figure 17:
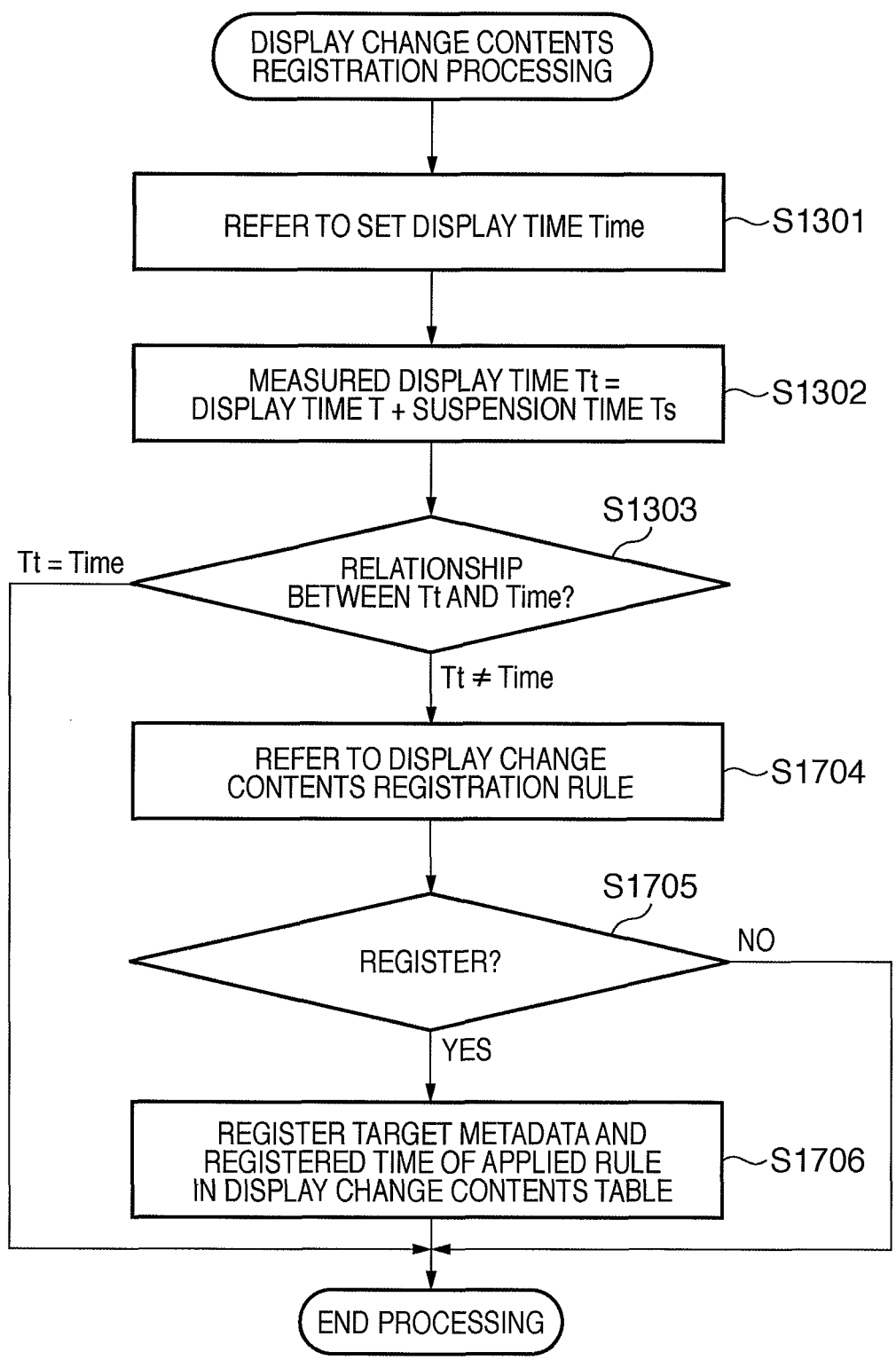
FIG. 17 is a flowchart showing an example of display change contents registration processing according to the third embodiment.
Figure 18:
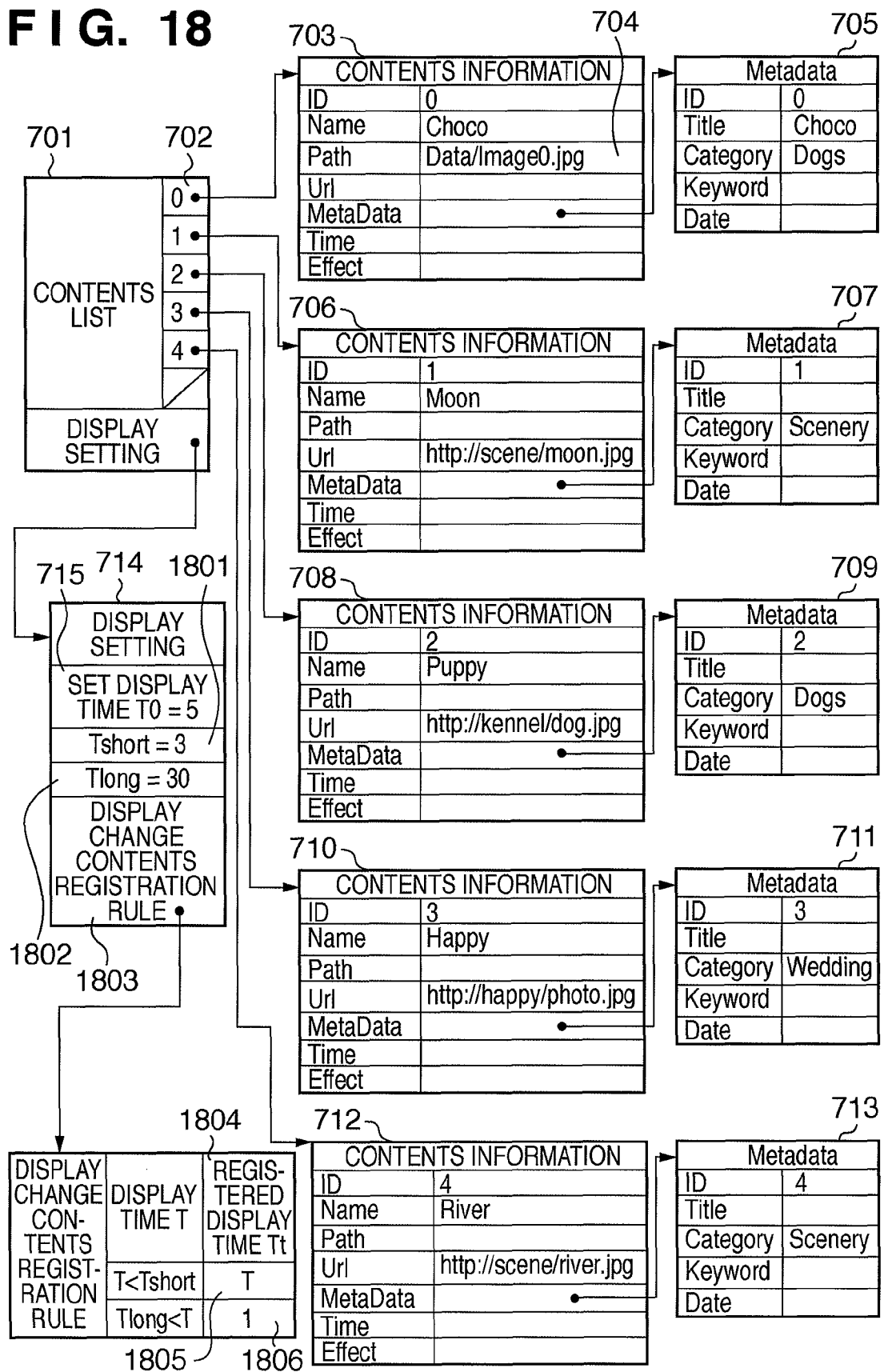
FIG. 18 is a view showing an example of the data configuration of a contents list and contents information according to the third embodiment.

FIG. 17 is a flowchart showing an example of the sequence of display change contents registration processing according to the third embodiment. In the display change contents registration processing according to the third embodiment, step S1304 of the display change contents registration processing (FIG. 13) of the first embodiment is replaced by steps S1704 to S1706. FIG. 18 is a view showing an example of a contents list and contents information according to the third embodiment. The data configuration of a display setting 714 in FIG. 18 is different from that of the display setting 714 in the first embodiment shown in FIG. 7. That is, the display setting 714 of the third embodiment includes values Tshort 1801 and Tlong 1802, and a pointer 1803 to a display change contents registration rule. A display change contents registration rule 1804 as an entity pointed by the pointer 1803 includes rules 1805 and 1806.

The display change contents registration rule 1804 defines a display time Tt to be registered with respect to a display time T which is changed by a change operation instruction given by the user, and is registered as the rules 1805 and 1806 in this example. The rule 1805 defines that when the display time T of a certain content is shorter than the set value Tshort, the display time T of a content related to that content is set to be equally short (registered time Tt=T). Also, the rule 1806 defines that when the display time T of a certain content is longer than the set value Tlong, display of a content related to that content is skipped (registered time Tt=1). Using these rules, the processing of the third embodiment will be described.

Assume that during display of a content indicated by contents information 703 in a contents list 701, the user makes a suspension operation as an instruction operation in the same processing as in the first embodiment. In this case, assume that a set display time Time=5, and the suspended state continues until Ts=30 in step S1208. Furthermore, assume that playback is restarted, display ends as per normal, and the total time Tt is calculated by display time T (Time=5)+suspension time Ts (=30)=35 in step S1302.

Subsequently, the display control unit 103 determines the relationship between the total display time Tt and set display time Time (step S1303). Since the actually displayed total display time Tt=35 is different from the set display time Time=5, the process advances to step S1704.

In step S1704, the display control unit 103 refers to the display change contents registration rule 1804 in FIG. 18. As a result, since the total display time Tt=35 satisfies the rule 1806 (Tt>Tlong), it is determined to "register" the instruction operation, and the process advances from step S1705 to step S1706. In step S1706, the display control unit 103 registers metadata 705 of the display changed contents information 703, and a registered time Tt (=1) described in the rule 1806 in a display change contents table (a table 1901 in FIGS. 19A and 19B).

Figure 19A:
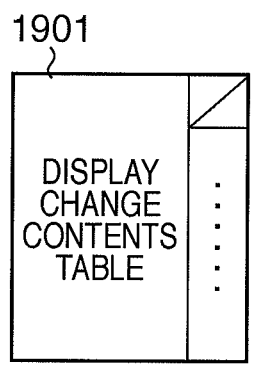
FIGS. 19A and 19B are views showing an example of the data configuration of a display change contents table according to the third embodiment.
Figure 19B:
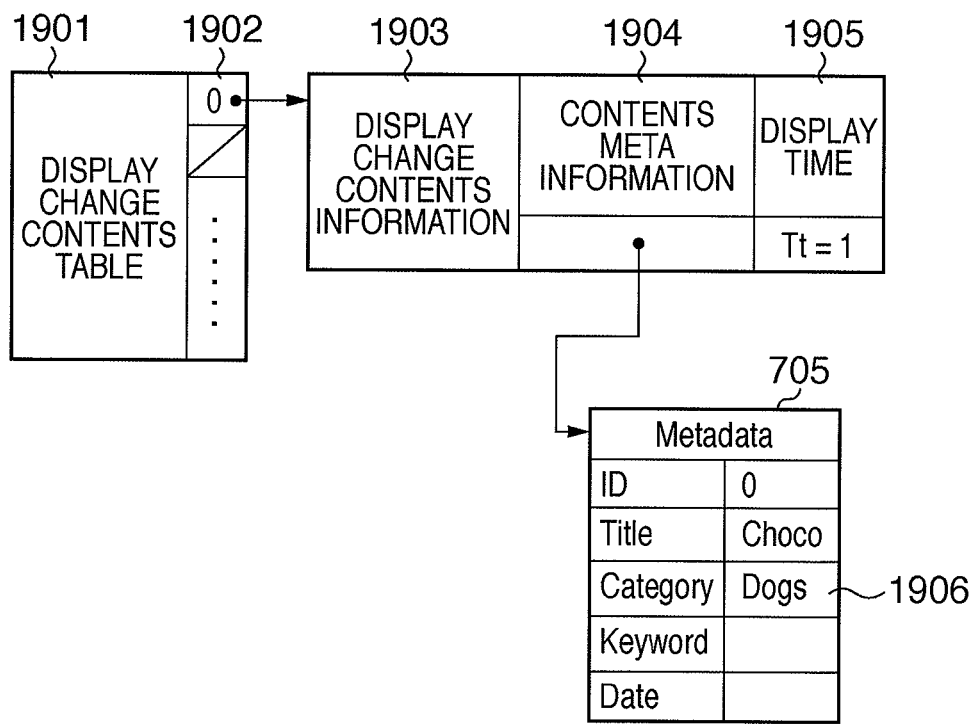

As a result of the aforementioned processing, the display change contents table 1901 in FIG. 19A is updated to that shown in FIG. 19B.

Subsequently, the contents list display processing is continued, and if a display contents position is incremented to i=2 in step S308, processing for displaying second contents information 708 in the contents list is executed in step S304.

The sequence of this processing is shown in FIG. 4. In step S401, the display method determination unit 104 obtains the contents information 708 at the display contents position i=2 from FIG. 18. In step S402, the display method determination unit 104 determines a display method. Furthermore, this display method determination processing is shown in FIG. 8.

In step S801, the display method determination unit 104 refers to the display target contents information 708. In step S802, since no individually set display time Time is set by referring to the contents information 708, the process advances to step S803. Since a set display time 715 in a display setting 714 in the contents list 701 is T0=5, the display method determination unit 104 sets the display time Time (=initially set display time T0)=5. In step S804, the display method determination unit 104 then executes related contents determination processing.

The current display change contents table is as shown in FIG. 19B. In related contents search processing in step S804, the display method determination unit 104 refers to a 0th pointer 1902 in the display change contents table 1901 (step S903). The display method determination unit 104 refers to metadata 705 pointed by a pointer 1904 to contents meta information in registered display change contents information 1903 (step S904). Furthermore, in step S905 the display method determination unit 104 refers to metadata 709 in the contents information 708 of the current display target content. As a result of comparison between the two metadata, since "Category=Dogs" (1906) is matched, the process advances from step S906 to step S908, and it is determined that "a related content is found".

As a result, YES is determined in step S805, and the process advances to step S806. In step S806, the display method determination unit 104 obtains a display time 1905 (Tt=1)

corresponding to related contents meta information (the metadata 705 pointed by the pointer 1904) from the display change contents table 1901 shown in FIG. 19B. In step S807, the display method determination unit 104 sets the display time Time=1 of the display target content, thus ending the display method determination processing in step S402 in FIG. 4. In this way, in the display method determination processing of the third embodiment, the display time specified in the display schedule of a content determined as a related content is changed based on that registered in the display change contents table.

Next, the process advances to step S403 in FIG. 4 to execute target contents display processing. As a result, the display target content is displayed for only Time=1.

Likewise, processing for displaying contents in the contents list is repeated until the display contents position i=4 is reached.

As described above, according to the third embodiment, when the user displays a certain content for a time longer than the set display time by making, for example, a suspension operation during display of the content, display of a content related to that content can be controlled to be skipped.

In the third embodiment, by the rule 1805, a content related to content (display time T) which was displayed for a time shorter than Tshort=3 is displayed for the same display time T. Note that the display change contents registration rules are not limited to the aforementioned rules 1805 and 1806, and various rules can be applied, as shown in FIGS. 20A to 20D. FIGS. 20A to 20D are views showing examples of display change contents registration rules. A rule 2001 shown in FIG. 20A defines that when the set display time is changed to an actual display time T by a user instruction operation, the display time of a content related to the content whose display time has been changed is set to be the same as T (2002). According to this rule 2001, the same processing as in the first embodiment can be implemented.

A rule 2003 shown in FIG. 20B defines that a content related to a content which was displayed for a display time T longer than an arbitrary set time Tlong by a user instruction operation is displayed by the display time T (2004).

A rule 2005 shown in FIG. 20C includes two rules 2006 and 2007. The first rule 2006 defines that a content related to a content which was displayed by a display time T shorter than an arbitrary set time Tshort by a user instruction operation are set to have a display time T=1, that is, the related content is displayed by fast-forwarding. The other rule 2007 defines that a content related to a content which was displayed by a display time T longer than an arbitrary set time Tlong by a user instruction operation are set to have a display time=1, that is, the related content is displayed by fast-forwarding.

A rule 2008 shown in FIG. 20D includes two rules 2009 and 2010. The first rule 2009 defines that "when the set display time is changed to an actual display time T by a user instruction operation, and metadata of the display target content includes "Category=Dogs"", "a content related to that content is displayed by the display time T". The other rule 2010 defines that "when the set display time is changed to an actual display time T by a user instruction operation, and metadata of the display target content includes "Category=Scenery"", "a content related to that content is set to have a display time=1, that is, the related content is displayed by fast-forwarding".

As described above, with the arrangement according to the third embodiment, since the display times of subsequent related contents can be changed based on user display change operations, a content that the user wants to view can be displayed for a longer time, and another content that the user does not so want to view can be displayed for a shorter time.

[Fourth Embodiment]

Figure 21:
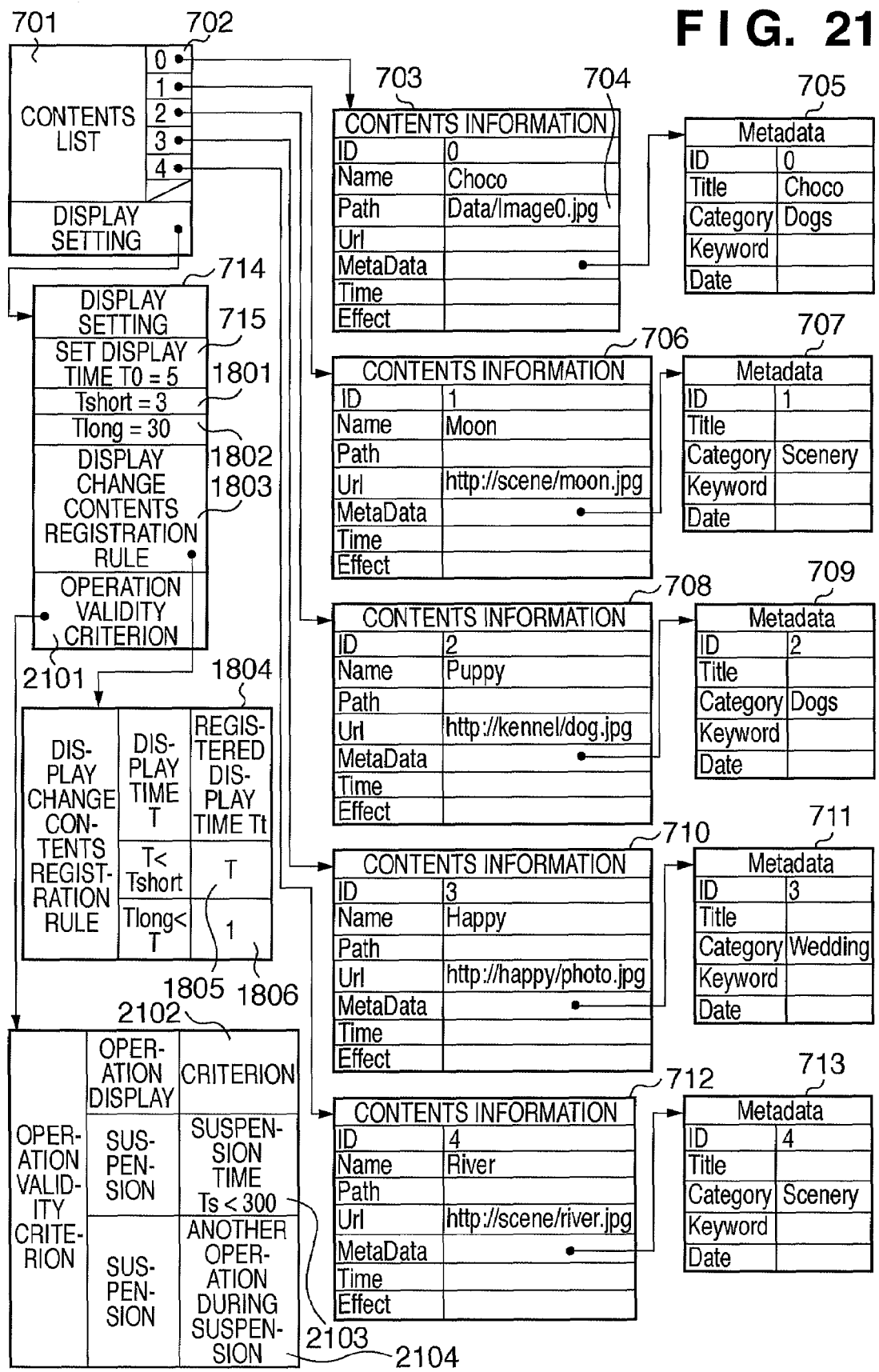
FIG. 21 is a view showing an example of the data configuration of a contents list and contents information according to the fourth embodiment.

FIG. 21 is a view showing an example of a contents list and contents information according to the fourth embodiment. FIG. 21 shows a pointer 2101 to operation validity criteria 2102 indicating determination rules used to determine validity of a display suspension operation, which is added to the contents list and contents information described in the third embodiment (FIG. 18).

The pointer 2101 points to the operation validity criteria 2102 as its contents. The operation validity criteria 2102 are used to determine whether or not a user instruction operation during display is valid, and describe two criteria 2103 and 2104 in this embodiment. In the first criterion 2103, a criterion "suspension time Ts<30" is set with respect to an instruction operation "suspension". In the other criterion 2104, a criterion "another operation during suspension" is given as an instruction with respect to an instruction operation "suspension".

The processing of the fourth embodiment when the operation validity criteria 2102 shown in FIG. 21 are set will be described below. Assume that the user instructs a suspension operation with respect to the currently displayed content when a display time T=1.

Figure 22:
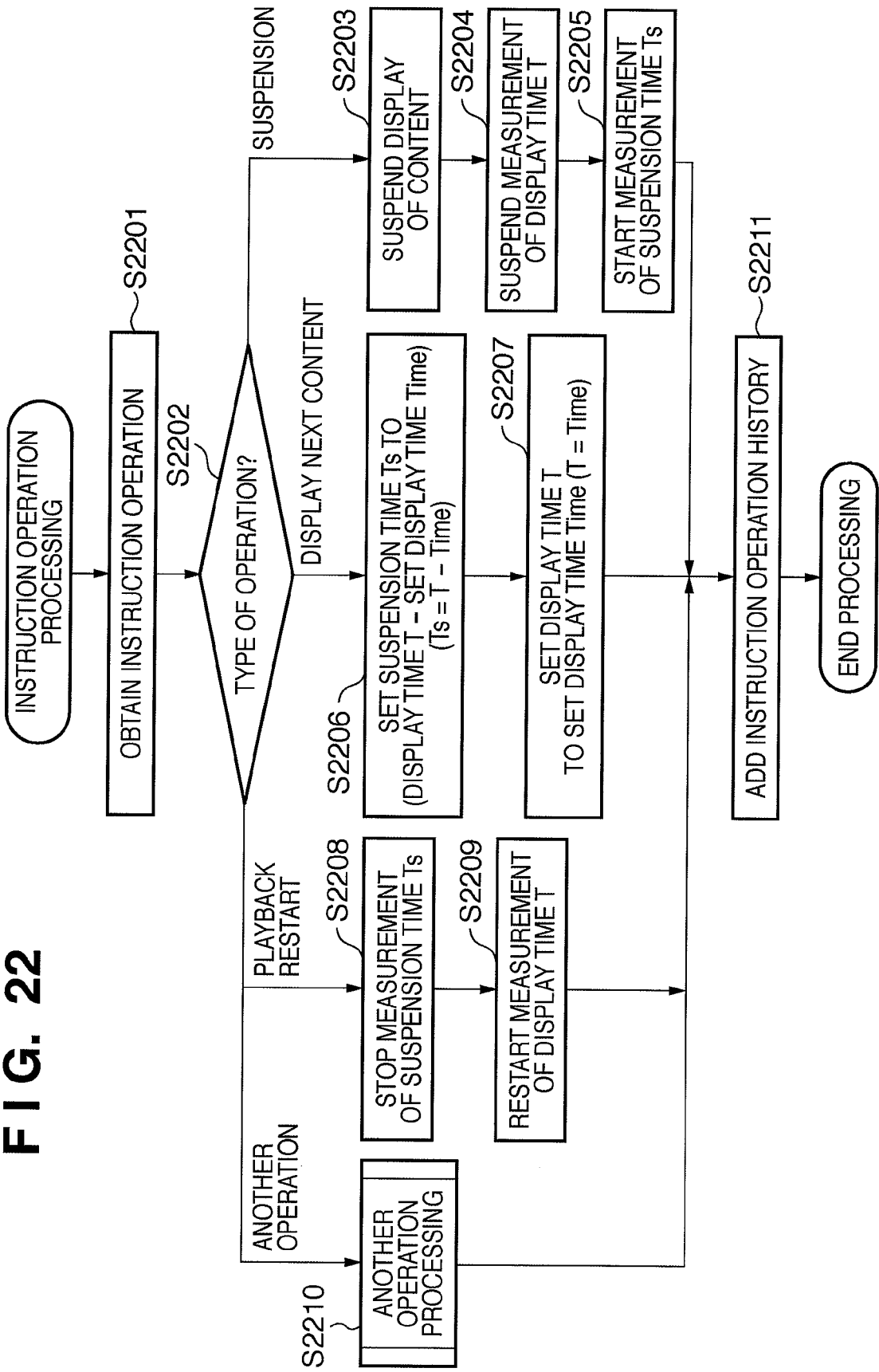
FIG. 22 is a flowchart showing an example of instruction operation processing according to the fourth embodiment.

As a result of the suspension operation by the user, the process shown in FIG. 3 advances from step S305 to step S306. FIG. 22 shows instruction operation processing according to the fourth embodiment.

FIG. 22 is a flowchart showing an example of instruction operation processing according to the fourth embodiment. In the fourth embodiment, the process in step S2211 (add instruction operation history) is added to the instruction operation processing (FIG. 12) in the first embodiment. The processes in steps S2201 to S2210 are the same as those in steps S1201 to S1210 in FIG. 12.

In step S2201, the display control unit 103 obtains an operation ("suspension" in this example), for which an instruction was given by the user. In step S2202, the display control unit 103 determines the type of operation obtained in step S2201. Since the operation is "suspension", the process advances to step S2203. The display control unit 103 suspends display of the content (step S2203), and also suspends measurement while the display time T assumes the current value (T=1) (step S2204). Furthermore, the display control unit 103 starts measurement of a suspension time as Ts (step S2205). Finally, in step S2211 the display control unit 103 adds "suspension operation" as an instruction operation history, and returns to the event waiting state in step S305 in FIG. 3.

Subsequently, assume that the user instructs an enlargement display operation of the content during suspension. Upon reception of this operation instruction, the process advances from step S305 to step S306 (the instruction operation processing in FIG. 22).

In step S2201, the display control unit 103 obtains an operation "enlargement display" which was instructed by the user. In this case, the process advances from step S2202 to step S2210. In step S2210, contents enlargement display is executed as another operation processing, and the process advances to step S2211. In step S2211, "enlargement display operation" is added as an instruction operation history, and the process returns to step S305 (event waiting state) in FIG. 3.

Furthermore, when the user makes a playback restart instruction operation, the process advances from step S305 to step S306 (instruction operation processing in FIG. 22).

In step S2201, the display control unit 103 obtains an operation "playback restart" instructed by the user. As a result, the process advances from step S2202 to step S2208. In step S2208, the display control unit 103 ends measurement of the suspension time Ts. Assume that Ts=30. In step S2209, the display control unit 103 restarts measurement of the display time T from T=1. Finally, in step S2211 the display control unit 103 adds "playback restart operation" as an instruction operation history, and returns to the event waiting state in step S305 in FIG. 3.

After the display time T of the display target content elapses until the display method (display time Time=5) determined in step S402 in FIG. 4, the set display time ends, and the process advances from step S305 to step S307 (display change contents registration processing). The display change contents registration processing of the fourth embodiment is shown in FIG. 23.

Figure 23:
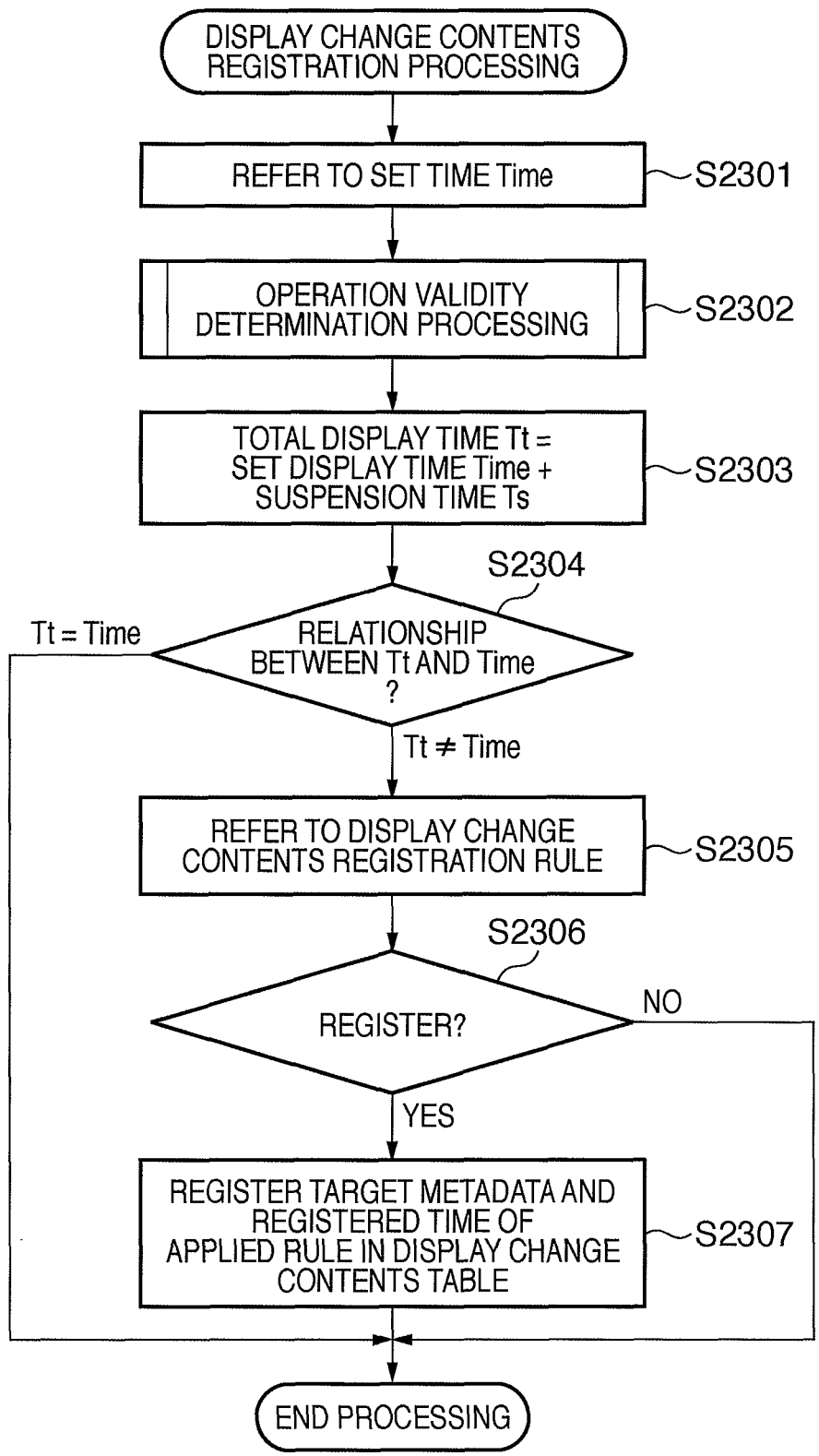
FIG. 23 is a flowchart showing an example of display change contents registration processing according to the fourth embodiment.

FIG. 23 is a flowchart showing an example of the sequence of the display change contents registration processing according to the fourth embodiment. In the fourth embodiment, operation validity determination processing in step S2302 is added to the display change contents registration processing (FIG. 17) of the third embodiment. That is, steps S2301 and S2303 to S2307 are the same as steps S1301 to S1303 and S1704 to S1706 in FIG. 17.

Figure 24:
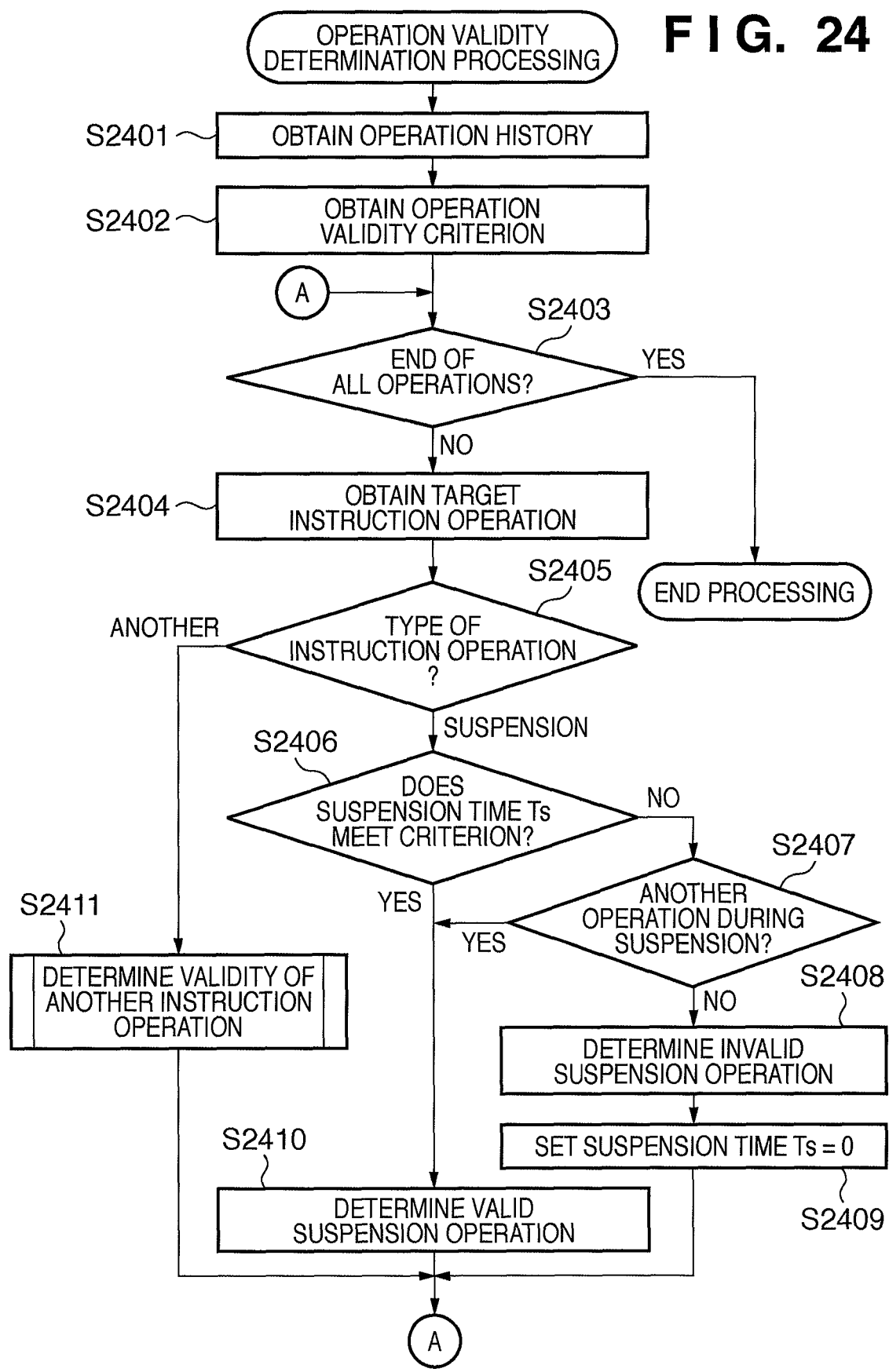
FIG. 24 is a flowchart showing an example of operation validity determination processing according to the fourth embodiment.

The display control unit 103 obtains the set display time Time=5 in step S2301, and executes operation validity determination processing in step S2302. Details of this validity determination processing will be described below with reference to the flowchart of FIG. 24. FIG. 24 is a flowchart showing an example of the operation validity determination processing according to the fourth embodiment.

In step S2401, the display control unit 103 obtains the instruction operation histories generated in step S2211 in FIG. 22. Note that the obtained instruction operation histories are "suspension"→"enlargement operation"→"playback restart" in the aforementioned example. Furthermore, in step S2402, the display control unit 103 obtains the two criteria 2103 and 2104 of the operation validity criteria 2102 pointed by the pointer 2101. Then, the display control unit 103 repeats the following processes in steps S2404 to S2411 for all the instruction operations as targets of the obtained operation validity criteria (step S2403).

In step S2404, the display control unit 103 obtains a target instruction operation. In step S2405, the display control unit 103 determines the type of the obtained target operation. Since the criteria 2103 and 2104 obtained in step S2402 are those for an instruction operation=suspension, the process advances to step S2406. In subsequent steps S2406 to S2409, the processing for determining the validity of the suspension operation is executed. This processing determines whether or not a suspension operation made by the user is valid. For example, the following determination can be made. That is, when the user suspends display of a content for the purpose of careful viewing, the operation is valid. However, when the user suspends display and leaves there, the operation is invalid.

The display control unit 103 determines in step S2406 if the suspension time Ts<300 is met for the criterion 2103 in the operation validity criteria 2102. Since the user restarted the suspended display at Ts=30, YES is determined in step S2406, and the display control unit 103 determines that the suspension operation is valid (step S2410).

If the suspension time of the user does not satisfy Ts<300, the process advances to step S2407. For example, when the user suspends display and leaves his or her seat, the suspension time Ts will exceed a suspension time criterion (Ts<300). In such case, NO is determined in step S2406, and the process advances to step S2407.

The display control unit 103 determines in step S2407 if a condition for the criterion 2104 in the operation validity criteria 2102 is satisfied. In the above example, it can be detected from the instruction operation histories obtained in step S2401 that another operation (enlargement operation) was made during suspension (between the suspension operation and playback restart operation). Hence, the process advances to step S2410, and the display control unit 103 determines that the suspension operation is valid.

On the other hand, if the user did not make any operation such as an enlargement display operation during suspension, the process advances from step S2407 to step S2408. In step S2408, the display control unit 103 determines that the suspension operation is invalid. Then, in step S2409 the display control unit 103 sets zero in the suspension time Ts, thus ending this processing. In this manner, if neither the criteria 2103 nor 2104 in the operation validity criteria 2102 are satisfied, the display control unit 103 determines that the suspension operation is invalid (step S2408). Also, the display control unit 103 resets the suspension time Ts (Ts=0) for the subsequent processes (step S2409). As can be seen from the above description, the criteria used in the operation validity determination processing are not limited to those described above. Validity determination for instruction operations other than the suspension operation is executed in step S2411.

After that, the process advances to step S2303. In step S2303, the display control unit 103 calculates a total display time Tt as the sum of the set display time and suspension time. As described above, only in a case of the valid instruction operation, Ts≠0, and the suspension time is added as the display time for the target content. The subsequent processes in steps S2304 and S2305 to S2307 are the same as steps S1303 and S1704 to S1706 of the third embodiment (FIG. 17).

Note that whether or not the histories include another user operation is used to determine the validity of the user suspension operation when the suspension time has elapsed beyond a predetermined time and no user operation is detected during suspension. In this case, a screen saver or dialog may be displayed to prompt the user to make an operation during suspension, and a user operation in response to such display may be held as an operation history. In this way, whether or not the user views display during a suspension period may be determined.

As described above, with the arrangement according to the fourth embodiment, whether or not a user instruction operation is valid for contents display is determined. As a result, the following effect can be obtained. That is, a content related to a content which was suspended since the user wanted to view for a longer time is displayed for a long time, and another content related to a content which was suspended since the user left his or her seat is inhibited from being displayed for a long time.

In the example of the fourth embodiment, the default display method of a content to be displayed obtained in step S602 in FIG. 6 is set in the contents list and contents information. However, the present invention is not limited to such specific example. For example, the default display method may be set at another location or may be externally changed in the middle of the processing. The same applies to embodiments other than the fourth embodiment.

The default display method of a content to be displayed may be set in the contents display apparatus itself or may be set for each user who makes display.

Each of the above embodiments has exemplified the case in which in order to display a content, display targets are given as a sequence of a plurality of contents (contents list) to the contents display apparatus. However, the present invention is not limited to such a specific example. For example, one content divided into a plurality of data or a partial set sequence of an arbitrary content may be given to the contents display apparatus.

For example, as links to the entity of a content in FIG. 5, the path 507 to contents data in case of local data and the access URL 508 to contents data in case of data in an external storage are used. However, the present invention is not limited to such specific links. For example, a partial set of an arbitrary content may be used as an entity of the content based on position information or time information in the content.

Also, contents may be image data such as still pictures and movies, or may be text data and music data.

For example, as the path 507 or access URL 508 to the entity of a content in FIG. 5, a path to a movie file may be given, or respective frames of a movie content may be handled as individual contents. Scene changes of a movie content may be extracted, their start and end times may be given as information, and each scene may be handled as one content.

In each of the above embodiments, assume that the display method of the current content is determined based on the display method for a previous content. Also, assume that the user makes an instruction operation during display of this content. In such case, the display methods of subsequent related contents may use that of the currently displayed content or a newly instructed display method.

[Fifth Embodiment]

The first to fourth embodiments have explained the processing when the user has changed the display time as the display method. The fifth to eighth embodiments to be described hereinafter will explain a case in which the display effect of the display method has been changed by a user operation during continuous display (slideshow) of contents. As for a change in display effect, as described in the second embodiment, the changed display effect may be applied in the second or subsequent slideshow.

The sequence of the overall processing of contents continuous display of the fifth embodiment is as has been described using the flowchart of the first embodiment (FIG. 3). However, in step S303, it is determined whether or not display of all the contents is complete or whether or not the last one content is displayed if a plurality of contents are to be displayed. In step S306 which is executed if it is determined in step S305 that the user makes an instruction operation with respect to the currently displayed content, a change corresponding to the instructed operation is applied to redisplay the content. In the fifth embodiment, a content is redisplayed using the method instructed in step S305 based on information of the display effect.

Upon detection of a timer event for displaying the next content after, for example, an elapse of a display time, the process advances from the determination process in step S305 to display change contents table registration processing (step S307).

The contents display processing in step S304 is the same as that in the first embodiment (FIG. 4).

That is, in step S401 the display method determination unit 104 obtains contents information at a display contents position i. The display method determination unit 104 then determines a display method using the obtained contents information (step S402). The sequence of this processing is as has been described in the first embodiment using FIGS. 6 and 7.

A display target content is displayed using the display method determined in this processing (step S403). An example of the sequence of this display processing will be described later with reference to FIG. 28.

Figure 42:
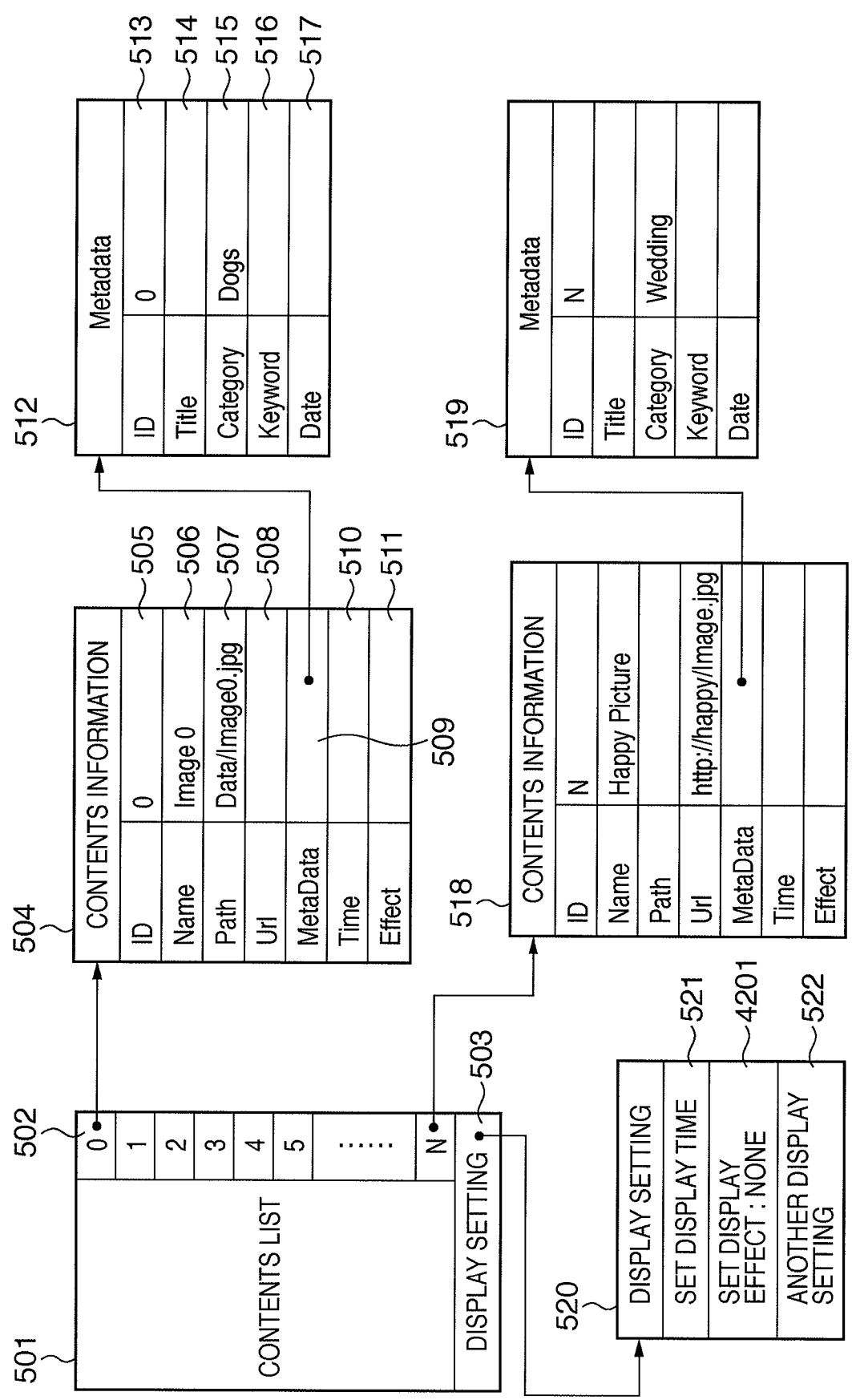
FIG. 42 is a view showing an example of the data configuration of a contents list and contents information according to the fifth embodiment.

A contents list obtained in step S301 and contents information obtained in step S401 of the fifth embodiment are nearly the same as those in the first embodiment (FIG. 5). However, as shown in FIG. 42, a display setting 520 includes a set display effect 4201.

Figure 25:
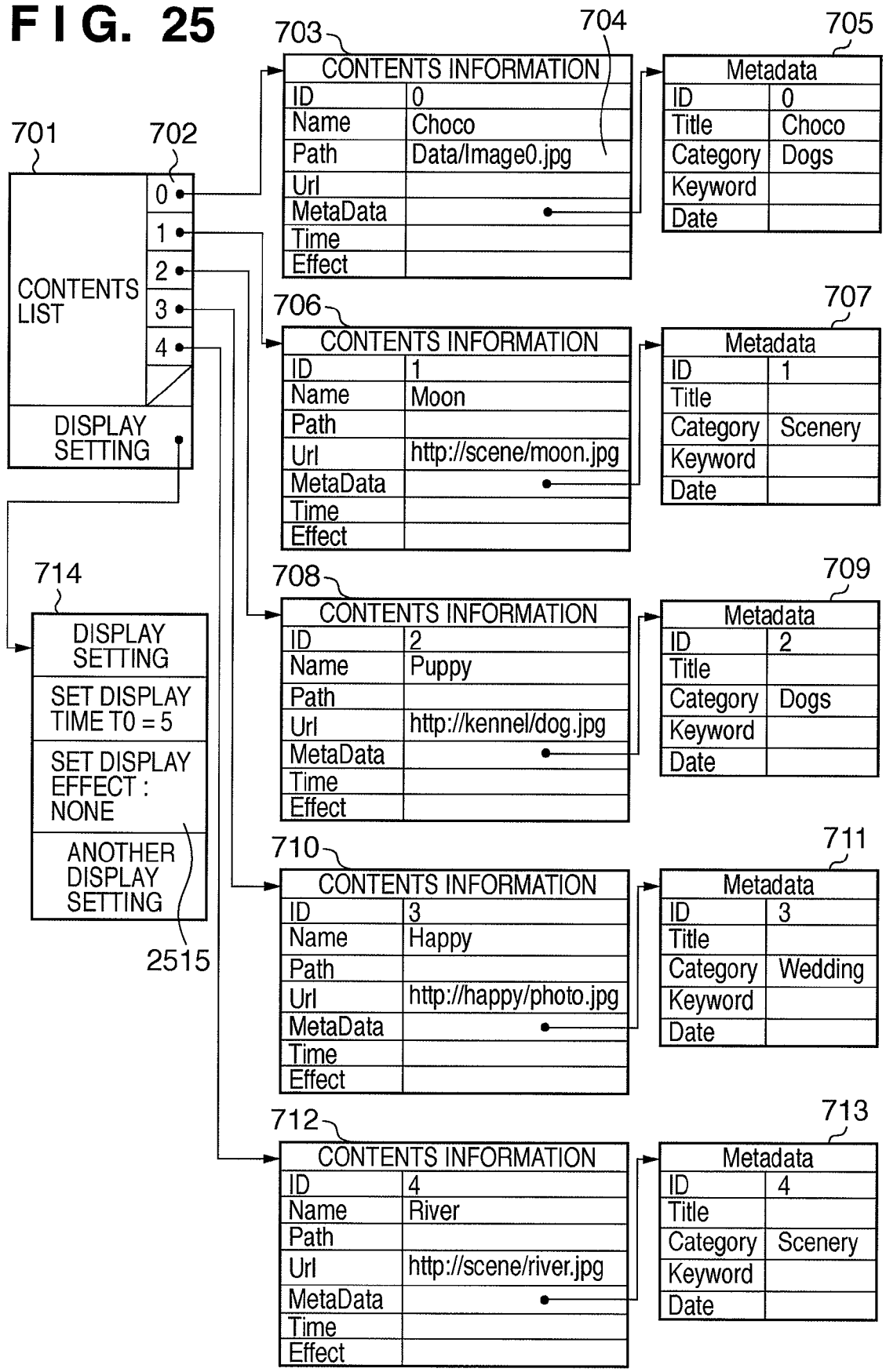
FIG. 25 is a view showing an example of the data configuration of a contents list and contents information according to the fifth embodiment.

FIG. 25 is a view showing an example of a contents list and contents information according to the fifth embodiment. Note that the same reference numerals in FIG. 25 denote the same pieces of information as in the first embodiment (FIG. 7).

Assume that the user adds an effect "flash" for flashing a background of a content indicated by contents information 703 in a star pattern during display of that content upon displaying a contents list 701 shown in FIG. 25. In this case, a content indicated by related contents information 708 (having the same Category) is also displayed by adding the flashing effect of a background in a star pattern. When the user adds a display effect "pit-a-pat" that repetitively enlarges and reduces contents information 706 in FIG. 25, the same display effect that repeats enlargement and reduction is added to related contents information 712. Details of such operations according to the fifth embodiment will be described below.

Figure 26:
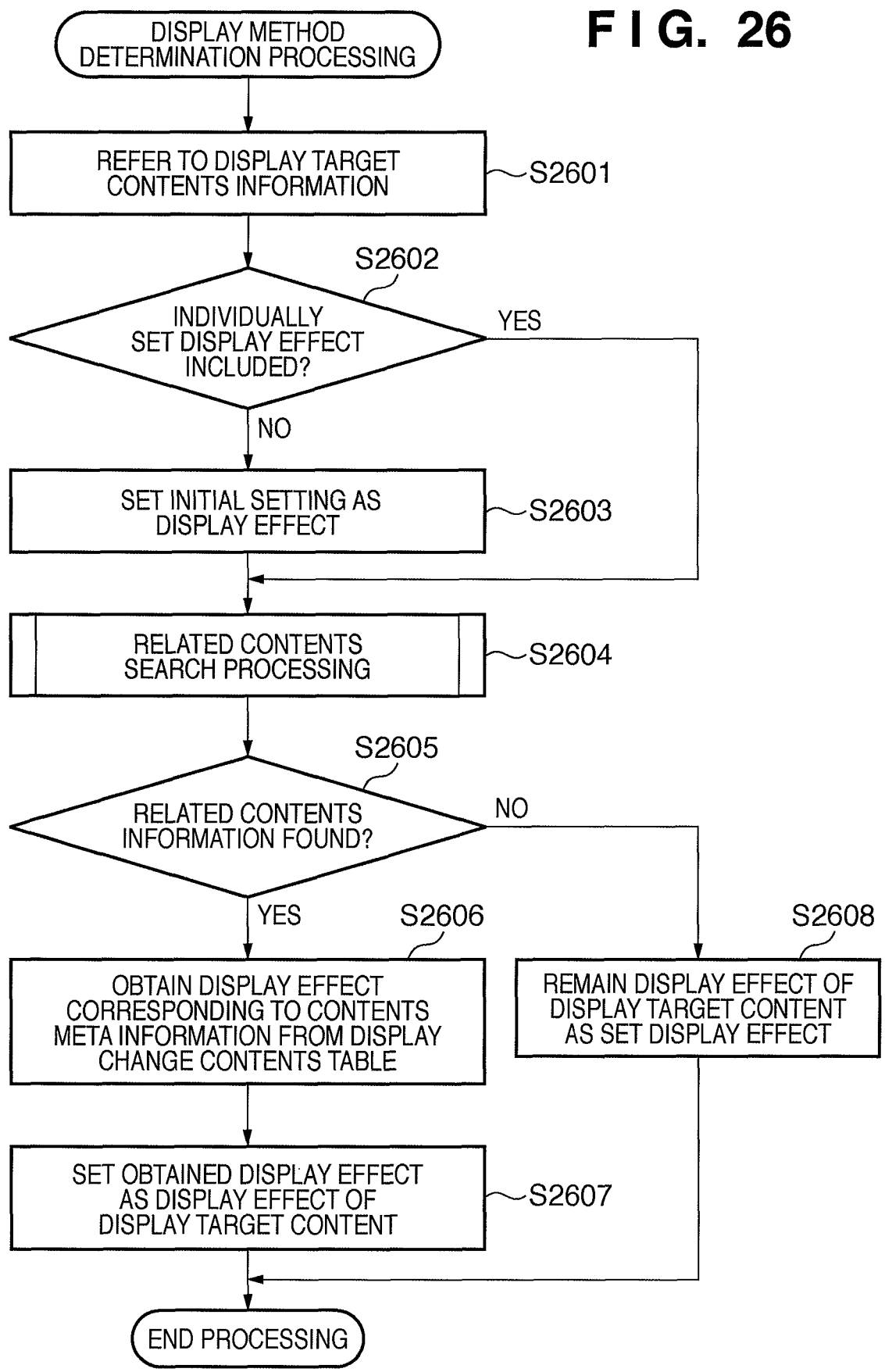
FIG. 26 is a flowchart showing an example of contents display method determination processing according to the fifth embodiment.

In step S302 in FIG. 3, the display control unit 103 sets the position i of the current display content at the start position of the list, and the process advances to step S304. In step S304, the display control unit 103 executes the contents display processing shown in FIG. 4. In step S401, the display control unit 103 obtains the contents information 703 at the display contents position i=0 from the contents list 701 in FIG. 25. In step S402, the display method determination unit 104 determines a display method. The display method determination processing according to the fifth embodiment will be described in detail below with reference to the flowchart of FIG. 26. FIG. 26 is a flowchart showing an example of the sequence of the display method determination processing in step S402 according to the fifth embodiment. In the flowchart of FIG. 26, the display method determination processing shown in FIG. 6 is specialized to determination of a display effect.

In step S2601, the display method determination unit 104 refers to the display target contents information 703. In step S2602, the display method determination unit 104 refers to the display target contents information to determine if an individually set display effect is set. Since no individually set display effect Effect is set in the contents information 703, the process advances to step S2603. In this case, since no display effect is set in a set display effect 2515 in a display setting 714 in the contents list 701, the display effect is set to be "none". Subsequently, in step S2604 the display method determination unit 104 executes related contents search processing. This related contents search processing is as has been described above using FIG. 9.

FIGS. 27A to 27C are views showing an example of a display change contents table according to the fifth embodiment.

Assume that a display change contents table is initialized, as shown in FIG. 27A, in display initialization processing in step S302 (FIG. 3). Since the current display target content is the start content in the contents list, the display change contents table is empty. Hence, in the related contents search processing in step S2604, the process advances to step S909 based on the determination result in step S902 in FIG. 9, and it is determined that no related content is found. As a result, the process advances from step S2605 to step S2608 to set that the display effect of the display target content is not changed, thus ending the display method determination processing in step S402 in FIG. 4.

The process advances to step S403 in FIG. 4, and the display control unit 103 executes target contents display processing. The sequence of this processing is shown in FIG. 28.

Figure 28:
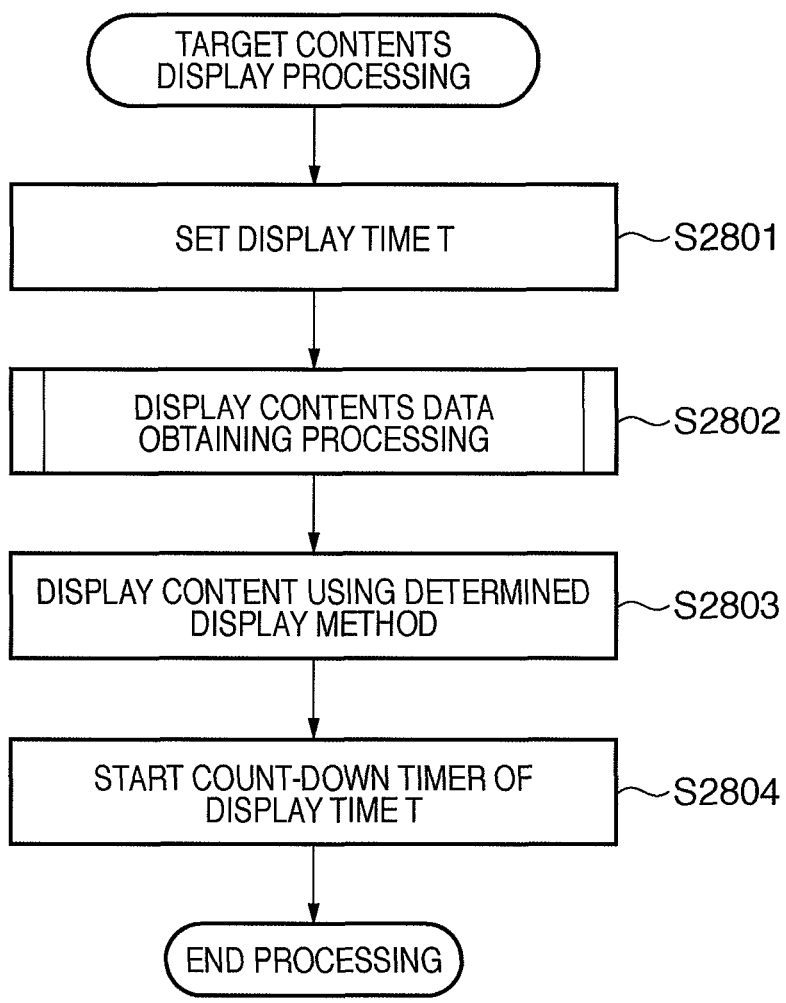
FIG. 28 is a flowchart showing an example of target contents display processing according to the fifth embodiment.

FIG. 28 is a flowchart showing an example of the sequence of the target contents display processing according to the fifth embodiment.

The display control unit 103 initializes a predetermined display time T of the display target content (step S2801). Then, the display control unit 103 executes display target contents data obtaining processing (step S2802). The display control unit 103 obtains actual display data with reference to a Path attribute 704 of the contents information 703 of the current display target content, which is notified from the display method determination unit 104.

Furthermore, in step S2803 the display control unit 103 receives a notification of the display method (display effect) determined in the display method determination processing in step S402 in FIG. 4 by the display method determination unit 104, and displays the content by the notified display method. The display control unit 103 starts a count-down timer of the display time T of the display target content concurrently with the display start of the content (step S2804). This count-down timer generates a timer event upon completion of its measurement.

The sequence of the overall processing (FIG. 3) advances to step S305, and the display control unit 103 enters an event waiting state. Assume that the user gives the instruction for a display effect change operation with respect to the currently displayed content.

Figure 31:
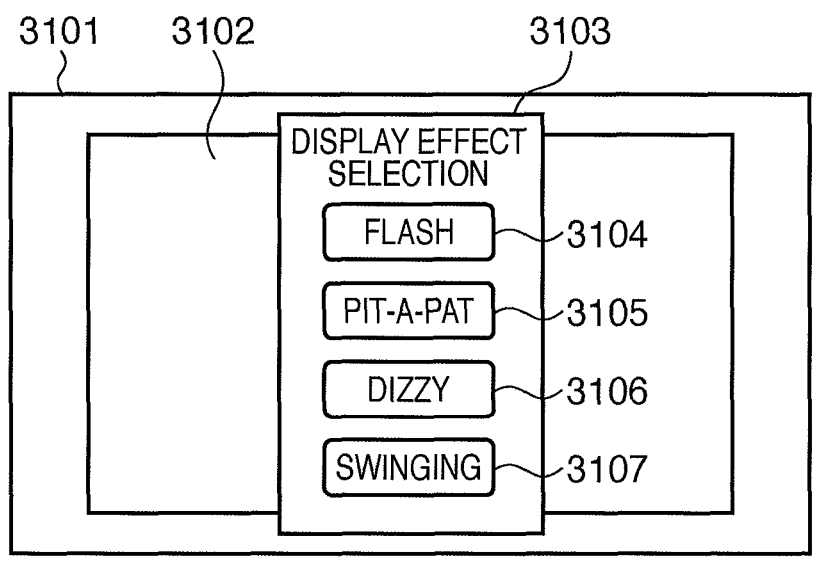
FIG. 31 is a view showing an example of a display screen according to the fifth embodiment.

FIG. 31 is a view showing an example of the display screen which is displaying a content in step S2803. In FIG. 31, reference numeral 3101 denotes a display screen; and 3102, a content. Reference numeral 3103 denotes a display effect selection dialog, which is displayed when the user made an operation to instruct to change the display effect; and 3104, 3105, 3106, and 3107, buttons used to select selectable display effects.

Figure 29:
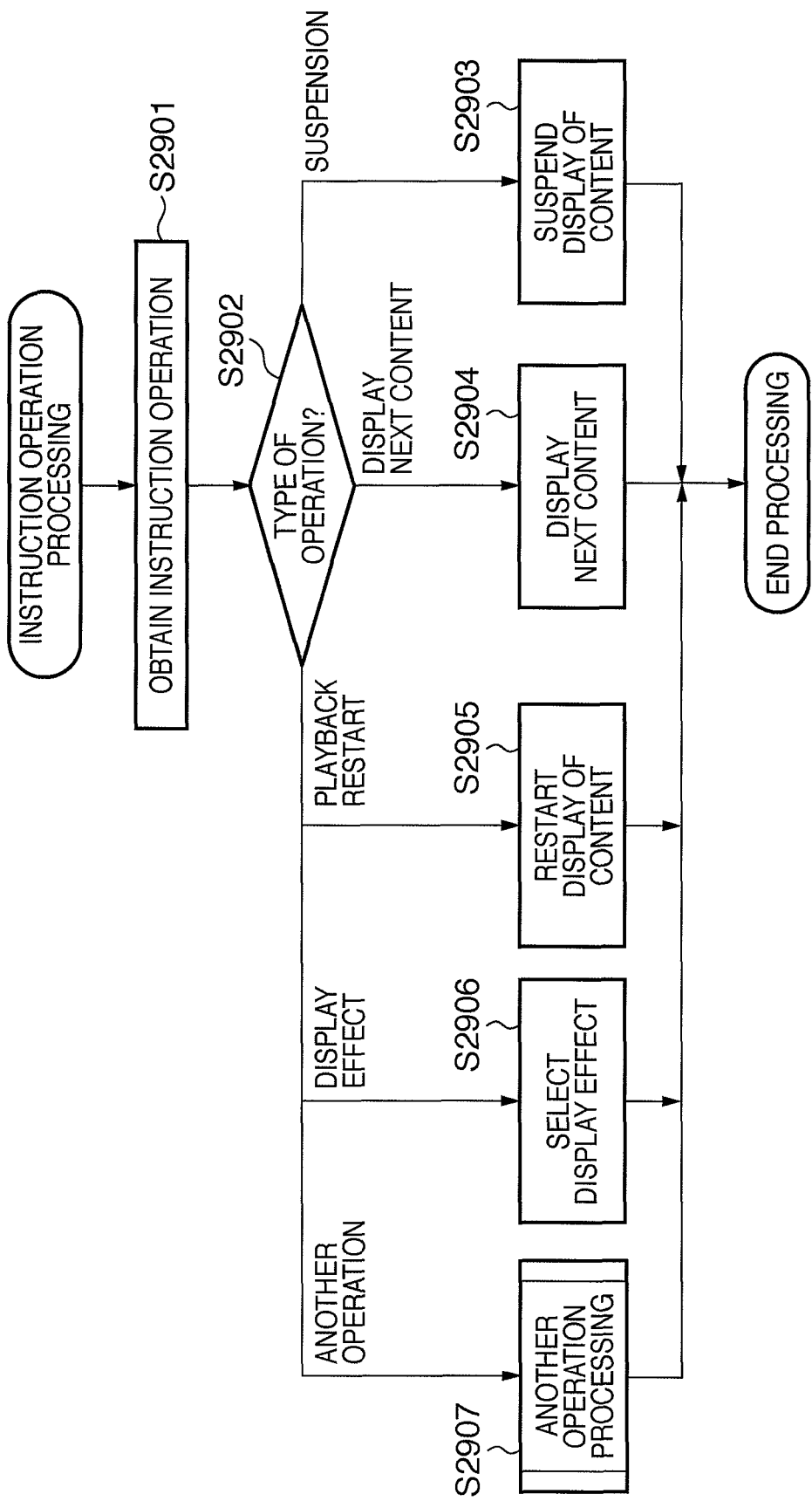
FIG. 29 is a flowchart showing an example of instruction operation processing according to the fifth embodiment.

When the user selects a desired display effect from the selection dialog 3103, the process advances from step S305 to the instruction operation processing in step S306 in response to an instruction operation event generated by that selection. The instruction operation processing according to the fifth embodiment will be described below with reference to the flowchart of FIG. 29. FIG. 29 is a flowchart showing an example of the instruction operation processing according to the fifth embodiment.

The display control unit 103 obtains a user operation instructed by the user in step S2901. The display control unit 103 is notified of the user operation input from the input device 107 via the instruction detection unit 106. In step S2902, the process branches depending on the type of operation obtained in step S2901. Step S2903 (suspension), step S2904 (display next content), step S2905 (playback restart), and step S2907 are similar to steps S2203 to S2205, S2206 and S2207, S2208 and S2209, and S2210 in FIG. 22, respectively. Since a change in display effect is obtained based on the operation using the user interface shown in FIG. 31, the process advances to step S2906. In step S2906, the display control unit 103 selects the display effect ("flash 3104" in this case) selected from the selection dialog 3103 in FIG. 31 by the user.

The display control unit 103 registers the display effect (flash) selected by the user in an Effect item of contents information (the contents information 703 in this case) as the current display target. This instruction operation processing ends, and the process returns to step S304 in FIG. 3. The display control unit 103 then redisplays the content with the display effect "flash".

After that, after an elapse of a predetermined time period, that is, if the count-down timer started in step S2804 reaches a time-out, a timer event for switching display to the next content is detected, and the process advances to step S307.

In step S307, the display control unit 103 executes display change contents registration processing. The display change contents registration processing according to the fifth embodiment will be described in detail below with reference to the flowchart of FIG. 30.

In step S3001, the display control unit 103 refers to the display effect determined in step S402 in FIG. 4 (no display effect in this example) in association with the currently displayed content. In step S3002, the display control unit 103 refers to the currently displayed display effect (flash in the above example). In step S3003, the display control unit 103 compares the two values referred to in steps S3001 and S3002. If the two values do not match, the process advances from step S3003 to step S3004, and the display control unit 103 registers metadata 705 of the changed contents information 703 and the changed display effect in a display effect 2705 in a display change contents table 1001 (FIG. 27A). In the above example, the metadata 705 of the changed contents information 703 is registered in the display change contents table (FIG. 27B), and the changed display effect "flash" is registered in the display effect 2705.

As a result, the display change contents table 1001 in FIG. 27A is updated to that shown in FIG. 27B.

In the display change contents table 1001 in FIG. 27B, a new pointer 1002 to 0th display change contents information is added. The pointer 1002 to the display change contents information points to display change contents information 1003. The display change contents information 1003 includes a pair of a pointer 1004 to contents meta information and the display effect 2705. The pointer 1004 to contents meta information points to the metadata 705 of the display changed contents information 703.

Upon completion of the display change contents registration processing (step S307), the process advances to step S308. In step S308, the display control unit 103 increments the display contents position by one to set i=1, and the process returns to step S303. After that, a content of contents information 706 corresponding to i=1 is displayed by the same processing. That is, the process advances to step S304, and a display method for the content is determined (no display effect) in step S402 in FIG. 4, and the content is displayed in step S403. Subsequently, the sequence of the overall processing (FIG. 3) advances to step S305, and the display control unit 103 waits for an event.

After that, in response to generation of a timer event after an elapse of a predetermined time period, the process advances from step S305 to step S307. In step S307, the display control unit 103 executes the display change contents registration processing shown in FIG. 30. In the above case, since no set display effect is changed, the set display effect (no display effect) referred to in step S3001 matches the current display method referred to in step S3002. For this reason, the display change contents registration processing ends, and the process advances to step S308.

In step S308, the display control unit 103 increments the display contents position by one to set i=2, and the process returns to step S303. As a result, second contents information 708 in the contents list is displayed in step S304. In this case, the content of the contents information 703 and that of the contents information 708 have the category of the same contents as metadata. For this reason, the content of the contents information 708 is determined as a related content, and the display effect ("flash" in this example) set for the contents information 703 is used. This processing will be described in detail below.

In step S401, the display method determination unit 104 obtains the contents information 708 at the display contents position i=2 in the contents list 701. Subsequently, in step S402 the display method determination unit 104 determines a display method for the content by the display method determination processing shown in FIG. 26.

In step S2601, the display method determination unit 104 refers to the display target contents information 708, and determines in step S2602 if an individually set display effect Effect is set. By referring to the contents information 708, since no individually set display effect Effect is set, the process advances to step S2603. In this case, since "none" is registered in the set display effect 2515 in the display setting 714 in the contents list 701, the display effect Effect (=initially set display effect)=none is set. Then, in step S2604 the related contents search processing shown in FIG. 9 is executed.

The current display change contents table is as shown in FIG. 27B. In the related contents search processing, the display method determination unit 104 refers to the 0th pointer 1002 in the display change contents table 1001 (step S903). The display method determination unit 104 refers to the metadata 705 pointed by the pointer 1004 to contents meta information of the registered display change contents information 1003 (step S904). Furthermore, in step S905 the display method determination unit 104 refers to metadata 709 in the contents information 708 of the current display target content.

Upon comparison between the two pieces of meta information referred to in steps S904 and S905, the contents of their Category 1006 (=Dogs) match. Therefore, the process advances from step S906 to step S908, and the display method determination unit 104 determines that a related content is found.

As a result, in the display method determination processing in FIG. 26, the process advances from step S2605 to step S2606. In step S2606, the display method determination unit 104 obtains the display effect 2705 (flash) registered in the display change contents information 1003 related to the metadata 705 shown in FIG. 27B. Then, in step S2607 the display method determination unit 104 sets the display effect of the display target content as "flash", thus ending the display method determination processing in step S402 of FIG. 4.

After that, the process advances to step S403 in FIG. 4, and the display control unit 103 executes target contents display processing. As a result of the target contents display processing in FIG. 28, the display target content is displayed with the display effect "flash".

Likewise, processing for continuously displaying contents in the contents list is repeated until the display contents position i=4 is reached.

As described above, according to the fifth embodiment, when the user changes the display effect during display of a certain content, a content related to that content can be displayed with the same display effect upon displaying the related content.

The operations of the fifth embodiment in the following case will be described below. That is, assume that the first contents information 706 in the contents list 701 in FIG. 25 is determined to have "no display effect" in step S402 in FIG. 4. Then, assume that the user selects a display effect "pit-a-pat" different from the previous display effect in step S306 during display of a content indicated by the contents information 706. After that, the content is redisplayed using the new display effect "pit-a-pat" in step S304. Furthermore, after an elapse of a predetermined time period in step S305, the process advances to step S307, and the display control unit 103 executes the display change contents registration processing in FIG. 30 in the same as described above.

The display control unit 103 refers to the display method (no display effect) determined by the display method determination unit 104 in step S402 in FIG. 4 (step S3001). The display control unit 103 refers to the current display effect (pit-a-pat) (step S3002). If the two display effects are different, the process advances from step S3003 to step S3004. In step S3004, the display control unit 103 registers metadata 707 of the display changed contents information 706 and its display effect (pit-a-pat) in the display change contents table 1001 (step S3004). As a result, the display change contents table 1001 shown in FIG. 27B is updated to that shown in FIG. 27C.

Subsequently, the process advances to step S308 to increment the display contents position by one, that is, to set i=2. The process then returns to step S303. After that, processing for continuously displaying contents in the contents list is repeated until i=4 in step S308.

When i=4, the contents display processing in step S304 is executed as follows.

In the contents display processing in FIG. 4, contents information 712 at the display contents position i=4 is obtained from FIG. 25 in step S401. Then, in step S402 the display method determination unit 104 executes the display method determination processing shown in FIG. 26.

In step S2601, the display target contents information 712 is referred to. Subsequently, since no individually set display effect Effect is set by referring to the contents information 712 in step S2602, the process advances to step S2603. In step S2603, since the set display effect 2515 in the display setting 714 in the contents list 701 is "none", the display method determination unit 104 sets the display effect Effect (=initially set display effect)="none". Subsequently, in step S2604 the display control unit 103 executes the related contents search processing.

The current display change contents table 1001 is as shown in FIG. 27C. In the related contents search processing in step S2604, meta information 713 in the contents information 712 of the current display target content is compared with the metadata 707 pointed by a pointer 1008 to contents meta information registered in the display change contents table. As a result of comparison, since "Category=Scenery" (1010) is matched, it is determined that a related content is found.

Therefore, the process advances from step S2605 to step S2606. In step S2606, the display method determination unit 104 obtains a display effect 2709 (pit-a-pat) registered in the display contents information 1007 which points to the metadata 707 including the matched item in FIG. 27C.

In step S2607, the display method determination unit 104 determines "pit-a-pat" as the display effect of the display target content, thus ending the display method determination processing in step S402 in FIG. 4.

The process then advances to step S403 in FIG. 4 to execute the target contents display processing. That is, as a result of the target contents display processing in FIG. 28, the display target content is displayed with the display effect "pit-a-pat".

As described above, processing for continuously displaying contents in the contents list is repeated until the display contents position i reaches to end of the contents list.

As described above, when the user gives an instruction to apply a different display effect to each content during display of a certain content, a content related to that content can be displayed with the same display effect upon displaying the related content.

In the fifth embodiment, correspondence between the contents information and display method is added to the display change contents registration table based on a user instruction, and is used to determine the display method of a related content. However, the present invention is not limited to such specific embodiment. For example, as another embodiment, every time a user operation is made with respect to a content, the display method (item 510 or 511 in FIG. 42) of all contents related to the content of interest in the contents list may be updated. This can be applied to the first to fourth embodiments and those to be described later.

As described above, with the arrangement according to the fifth embodiment, the display methods of subsequent related contents can be changed by user operations during display of arbitrary contents. For this reason, contents can be continuously displayed according to user's preference without repeating identical operations.

[Sixth Embodiment]

In the above fifth embodiment, only one content is displayed concurrently. However, the present invention is not limited to this. In the sixth embodiment, a plurality of contents is displayed concurrently, and the user can instruct to change display effects of the respective contents.

Figure 34:
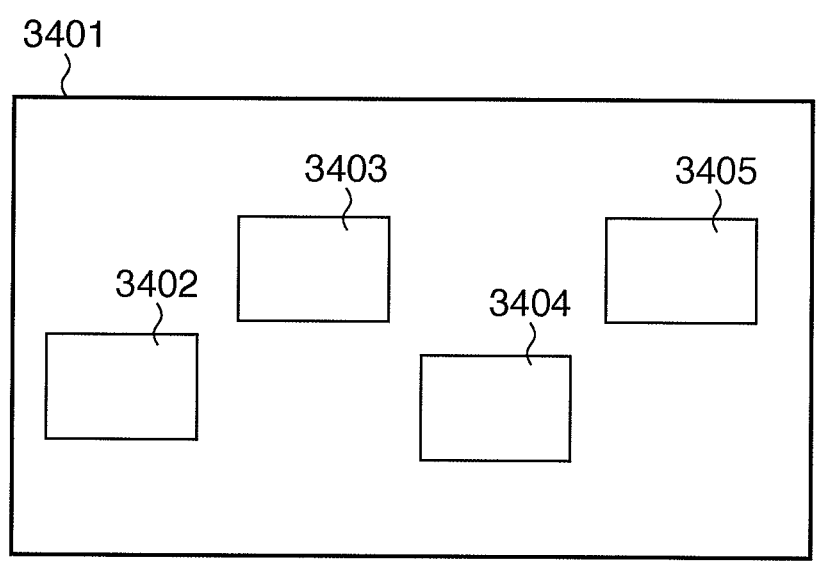
FIG. 34 is a view showing an example of a display screen according to the sixth embodiment.

In the sixth embodiment, a plurality of contents 3402 to 3405 are concurrently displayed on a display screen 3401 of a display, that is, the output device 108 according to display schedule information, as shown in FIG. 34. For example, upon displaying the first contents on the display screen 3401 concurrently with the start of a slideshow, that content begins to be displayed at the right corner of the screen. After an elapse of a predetermined time, the first content moves to the left, and the next content is displayed at the right corner. Likewise, a maximum of four contents are concurrently displayed on the display screen 3401, as in the state shown in FIG. 34. After the last content of a contents list 501 is displayed, a blank space moves from the right corner every time a predetermined time elapses, and the last content is finally laid out at the left corner. After that, after an elapse of a predetermined time, the last content also moves and disappears, thus ending the slideshow.

Figure 32:
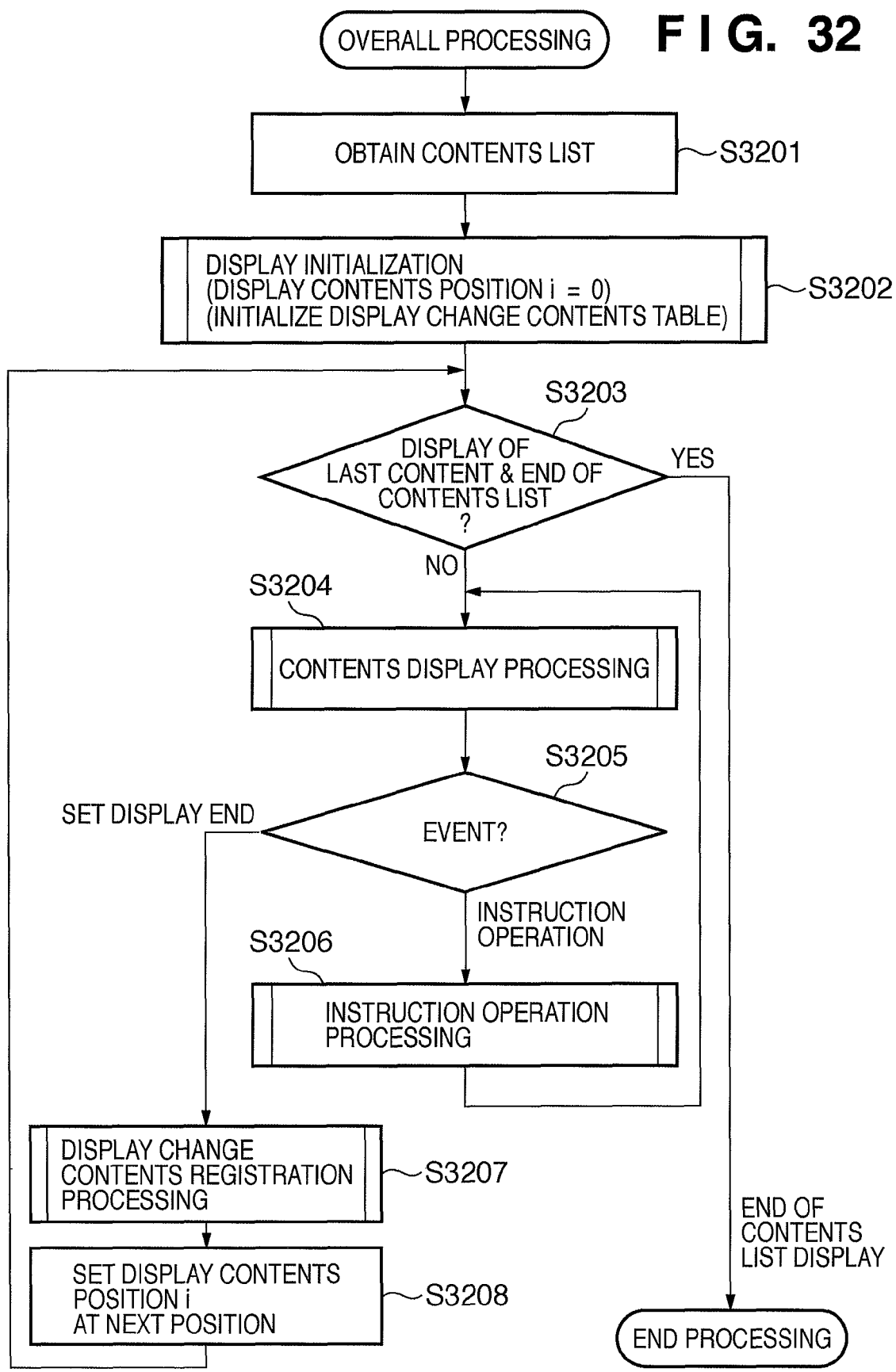
FIG. 32 is a flowchart showing the sequence of the overall processing of a contents display apparatus according to the sixth embodiment.

FIG. 32 is a flowchart showing an example of the overall processing of contents continuous display according to the sixth embodiment. Differences from the overall processing (FIG. 3) in the fifth embodiment are end determination in step S3203, contents display processing in step S3204, and instruction operation processing in step S3206. The sixth embodiment will be described below focusing on these differences.

The processes in steps S3201 and S3202 are the same as the fifth embodiment (steps S301 and S302 in FIG. 3). In step S3203, since the slideshow is continued until all contents displayed on the display screen disappear even after the end of the contents list 501, whether or not the last content is being displayed is added as an end condition.

After the display target content is displayed in step S3204, the display control unit 103 waits for an event in step S3205. If the user makes an instruction operation with respect to the currently displayed content, the process advances from step S3205 to step S3206, and the display control unit 103 executes instruction operation processing corresponding to the instructed operation. Upon detection of a timer event that displays the next content, for example, after an elapse of a display time (time-out of a count-down timer), the process advances from step S3205 to step S3207. In step S3207, the display control unit 103 executes display change contents registration processing. In step S3208, the display control unit 103 increments a display contents position i by one, and the process returns to step S3203.

If it is determined in step S3203 that the display contents position indicates a position behind the rearmost position in the contents list, and the currently displayed content is the last one, the contents list display processing ends.

Figure 33:
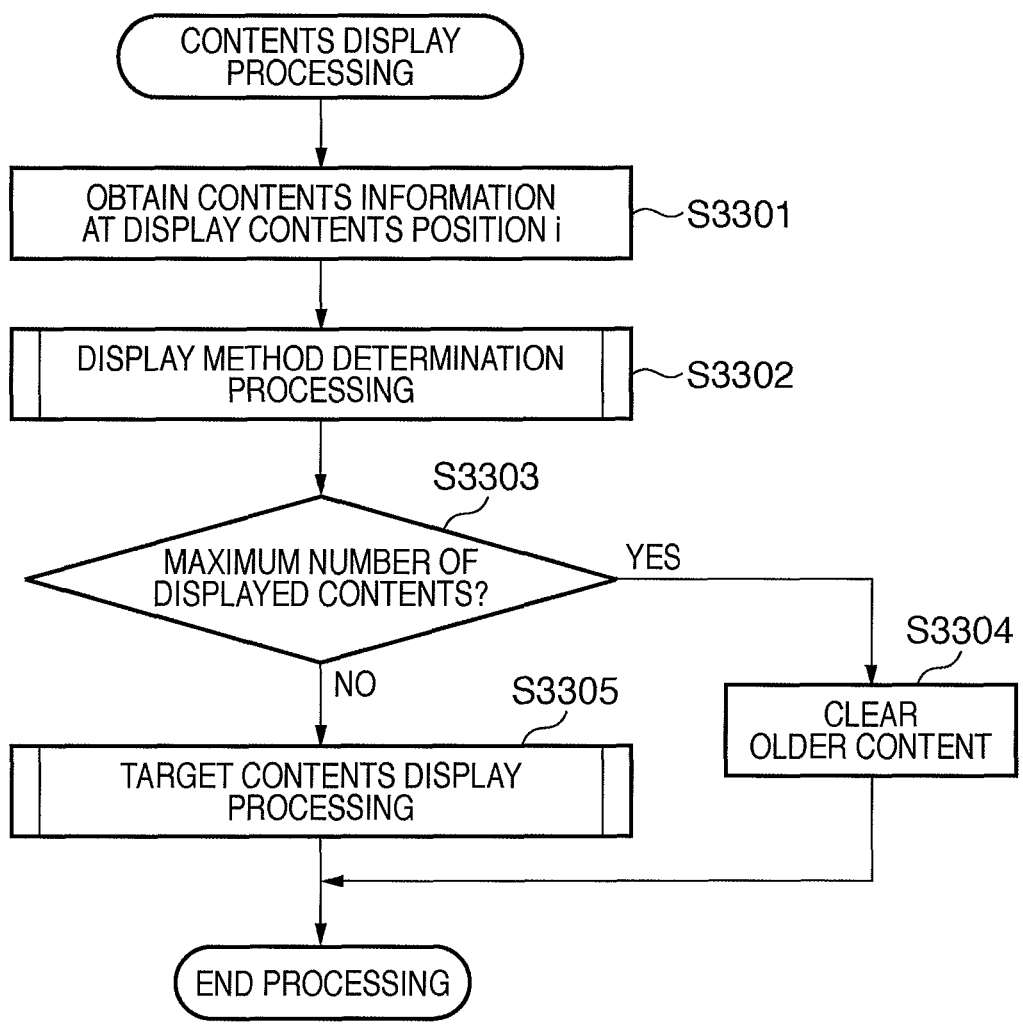
FIG. 33 is a flowchart showing an example of contents display processing according to the sixth embodiment.

FIG. 33 is a flowchart showing an example of the contents display processing (step S3204) according to the sixth embodiment.

In step S3301, the display method determination unit 104 obtains contents information at the display contents position i. In step S3302, the display method determination unit 104 determines a display method using the obtained contents information. This display method determination processing will be described later with reference to FIG. 35.

The display control unit 103 determines in step S3303 if the number of currently displayed contents is equal to the maximum number of displayed contents. If it is determined that the maximum number of displayed contents is not reached, the process advances to step S3305, and the display control unit 103 displays a display target content using the display method determined in step S3302. If it is determined in step S3303 that the maximum number of displayed contents is reached, the process advances to step S3304, and the display control unit 103 clears an oldest content from display targets. After that, the process advances to step S3305, and the display control unit 103 displays a display target content using the display method determined in step S3302.

For example, in the contents display according to the sixth embodiment, if the maximum number of displayed contents is four, a total of four contents, that is, from a newly additionally displayed content to a content additionally displayed three contents before, are concurrently displayed, as shown in the display screen example of FIG. 34.

Figure 35:
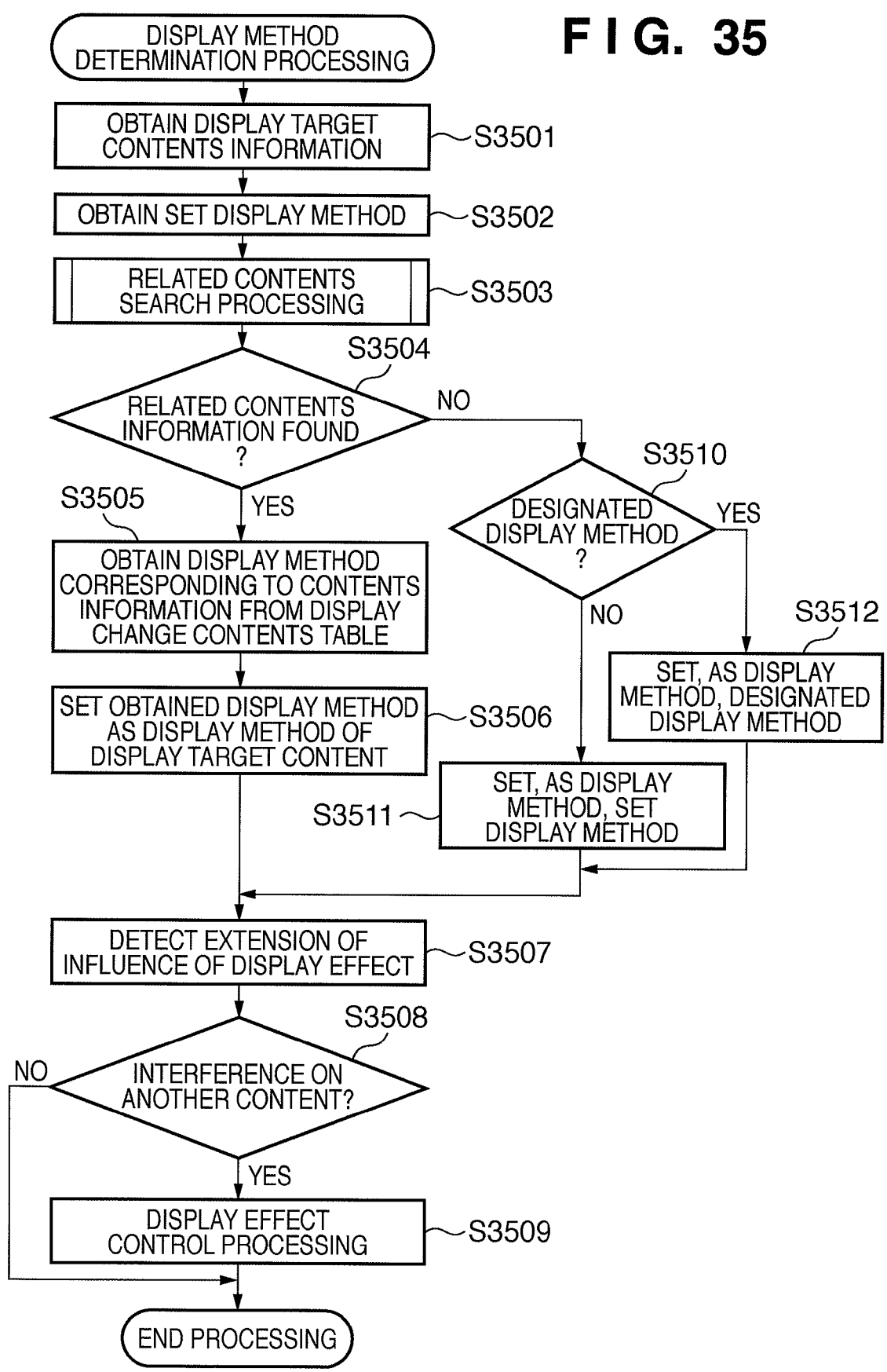
FIG. 35 is a flowchart showing an example of contents display method determination processing according to the sixth embodiment.

FIG. 35 is a flowchart showing an example of the display method determination processing in step S3302.

In step S3501, the display method determination unit 104 refers to information 504 of a display target content, as shown in FIG. 42. In step S3502, the display method determination unit 104 obtains a display method set in the contents information 504. The display method to be obtained includes a display setting 520, and a contents display time 510 and contents display effect 511 in the contents information 504 of the display target content shown in FIG. 42.

Next, the display method determination unit 104 determines in step S3503 if a content related to the display target content was displayed by a special method in the contents display executed so far. That is, the display method determination unit 104 compares information of a content displayed by the special method based on a user instruction operation, and the contents information of the current display target content to determine if a related content is found. This determination process is executed with reference to a display change contents table 1001 shown in FIGS. 27A to 27C. As a result of comparison, if the display change contents table includes related contents information, the process advances from step S3504 to step S3505. In step S3505, the display method determination unit 104 obtains a display method corresponding to the contents information from the display change contents table. In step S3506, the display method determination unit 104 determines the display method obtained in step S3505 as that of the target content.

In step S3507, the display method determination unit 104 detects an extension of influence on the display screen upon adding a display effect as the display method to the content, so as to determine if an interference on other displayed contents is generated. If it is determined that no interference is generated, this processing ends from step S3508, and the display method obtained in step S3505 is set as that of the display target content. On the other hand, if it is determined in step S3507 that an interference is generated, the process advances to step S3509. In step S3509, the display method determination unit 104 executes display effect control for restricting the display effect with respect to the display method obtained in step S3505, and sets the processing result as the display effect of the display target content.

As a result of the related contents determination processing in step S3503, if it is determined that no related content is found, the process advances from step S3504 to step S3510. At this time, if no instruction for a display method is given, the process advances from step S3510 to step S3511. In step S3511, the display method determination unit 104 sets the display method obtained in step S3502 as that of the display target content. Processing when the instruction for the display method is given (step S3512) will be described later.

The sequence of the detailed processing according to the sixth embodiment will be described below using an example of a contents list and contents information shown in FIG. 25. Note that the sequence of processing executed when the user changes a display effect of a content indicated by contents information 703 during display of that content upon displaying a contents list 701 in FIG. 25 will be described below.

In step S3202 in FIG. 32, the current display contents position i is set at the start position of the list, and contents display processing is executed in step S3204. In this contents display processing (FIG. 33), the display method determination unit 104 obtains the contents information 703 at the display contents position i=0 from the contents list 701 (FIG. 25) in step S3301. In step S3302, the display method determination unit 104 determines a display method of this contents information 703. The sequence of this display method determination processing is as has been described above using FIG. 35.

That is, in step S3501 the display method determination unit 104 refers to the display target contents information 703. Next, in step S3502 the display method determination unit 104 obtains a display method from the contents information 703. Since no individually set display effect Effect is set in the contents information 703, a display effect Effect (=initially set display effect)="none" is set. In step S3503, the display method determination unit 104 executes related contents search processing. This related contents search processing is the same as that in the fifth embodiment (FIG. 9). In the sixth embodiment, in the determination process in step S906, a related content is that including the same values of corresponding items in metadata.

In this case, the display change contents table may be referred to in turn, and a content which is found first may be determined as a related content. Alternately, the entire display change contents table may be referred to and the best related content may be searched for. For example, if pieces of contents meta information including the same metadata items are registered in the display change contents table, a content including more matched items may be determined as a related content.

In the display initialization processing in step S3202, assume that a display change contents table is initialized, as shown in FIG. 27A. Since the current display target content is the first one in the contents list, a display change contents table 1001 is empty. Hence, in the related contents search processing in step S3503, the process advances from step S902 to step S909 in FIG. 9, and it is determined that no related content is found. As a result, in FIG. 35, the process advances from step S3504 to step S3510. Furthermore, since no instructed display setting is available, the process advances from step S3510 to step S3511. In step S3511, the display method determination unit 104 determines a display effect "none" as the display method of the display target content, thus ending the display method determination processing (step S3302 in FIG. 33).

The display control unit 103 determines in step S3303 if the number of displayed contents reaches the maximum number of displayed contents. In the initial state, since the maximum number of displayed contents is not reached yet, the process advances to step S3305, and the display control unit 103 executes the target contents display processing shown in FIG. 28. Note that the target contents display processing in FIG. 28 is as has been described above in the fifth embodiment.

Subsequently, in the overall processing (FIG. 32), the process advances to step S3205, and the display control unit 103 waits for an event.

Figure 30:
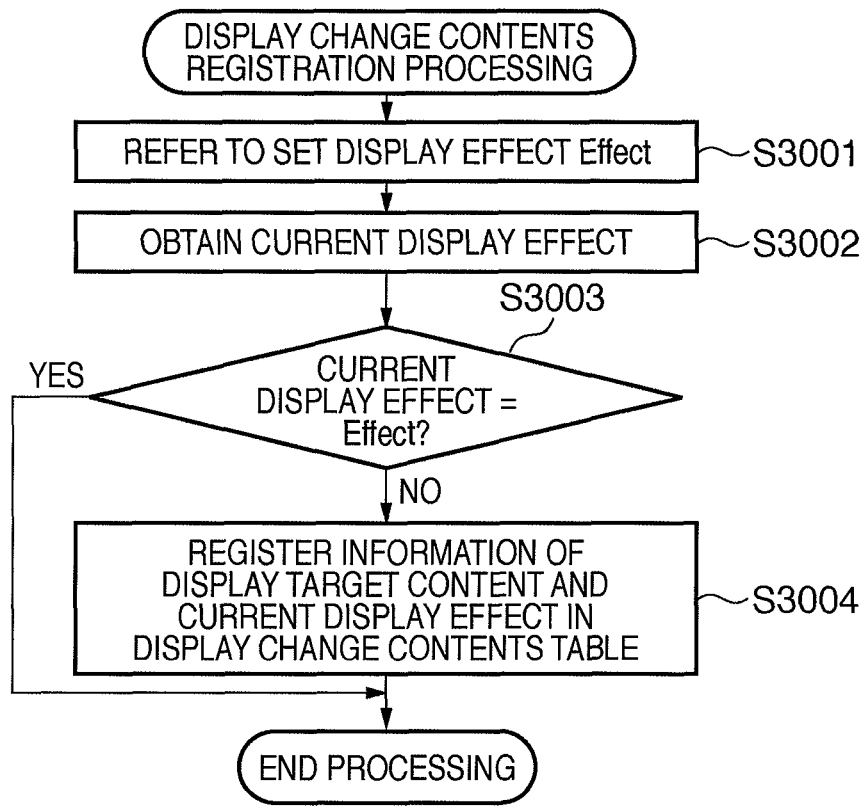
FIG. 30 is a flowchart showing an example of display change contents table registration processing according to the fifth embodiment.

After that, in response to a timer event (time-out of a count-down timer) indicating the end of a display time of one content, the process advances from step S3205 to step S3207. In step S3207, the display control unit 103 executes display change contents registration processing (FIG. 30). Since the user does not change any display effect, both the display effect based on a set display effect 2515 and the current display effect are matched as "none". Therefore, the display change contents registration processing (FIG. 30) ends without updating the display change contents table. In step S3208, the display control unit 103 sets the next display contents position (i=1 in this case), and the process returns to step S3203. At this time, since a display target content is not the last content in the contents list 701, the process advances from step S3203 to step S3204. The display control unit 103 and display method determination unit 104 respectively execute the display method determination processing and contents display processing in association with the position i=1 in step S3204, and the display control unit 103 waits for an event in step S3205.

After that, contents up to four as the maximum number of displayed contents are similarly displayed on the display screen.

Figure 38:
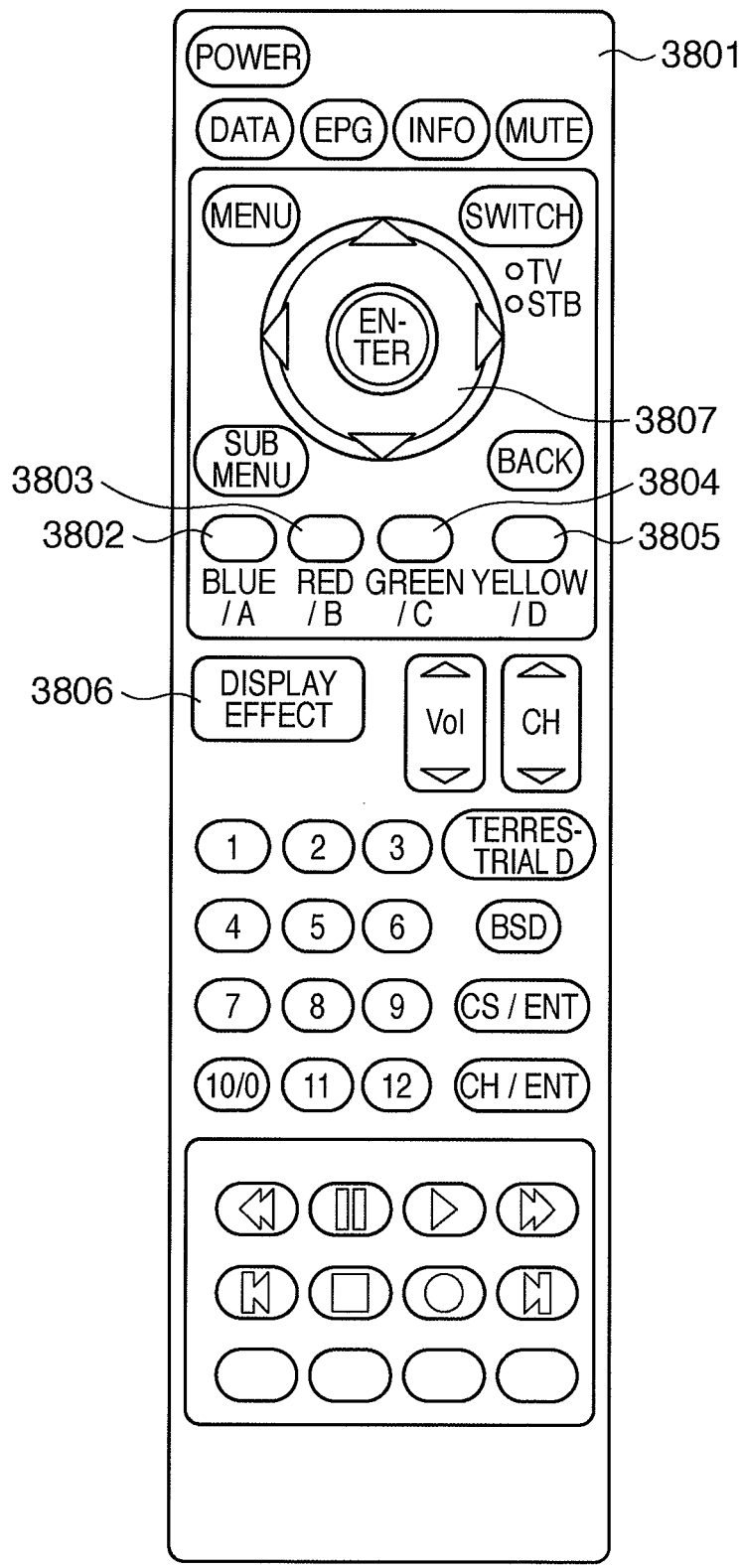
FIG. 38 is a view showing an example of a remote controller used in the instruction operation processing according to the sixth embodiment.

Assume that the user selects a specific displayed content, and makes a change instruction operation of a display effect. In the case of this embodiment, a user operation from the input device 107 includes an instruction to select one of a plurality of contents concurrently displayed by the display control unit 103, and an instruction of a user operation with respect to the selected content. This operation is attained when the user presses a display effect button 3806 on a remote controller 3801 shown in, for example, FIG. 38.

Figure 36:
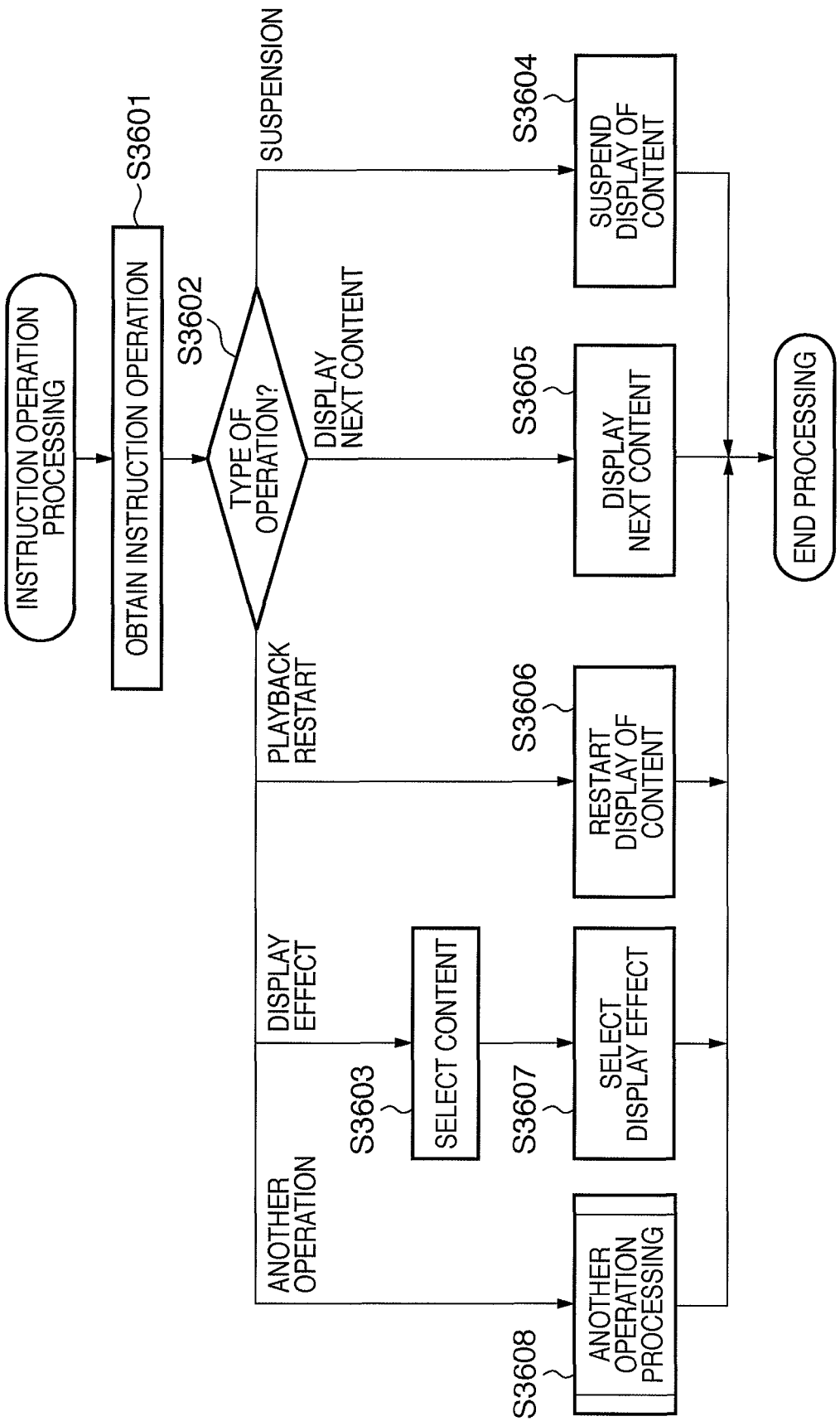
FIG. 36 is a flowchart showing an example of instruction operation processing according to the sixth embodiment.

In response to the display effect designation operation (an operation of the display effect button 3806) by the user, the process advances from step S3205 to step S3206. The instruction operation processing according to the sixth embodiment will be described below with reference to the flowchart of FIG. 36. FIG. 36 is a flowchart showing an example of the sequence of the instruction operation processing according to the sixth embodiment.

In step S3601, an instruction for the operation "display effect" given by the user is obtained. In step S3602, the type of operation is determined. In this case, since the operation is "display effect", the process advances from step S3602 to step S3603. In step S3603, the instruction detection unit 106 selects a content so as to determine to which one of the plurality of contents displayed on the display screen the instruction operation is made.

Figure 37:
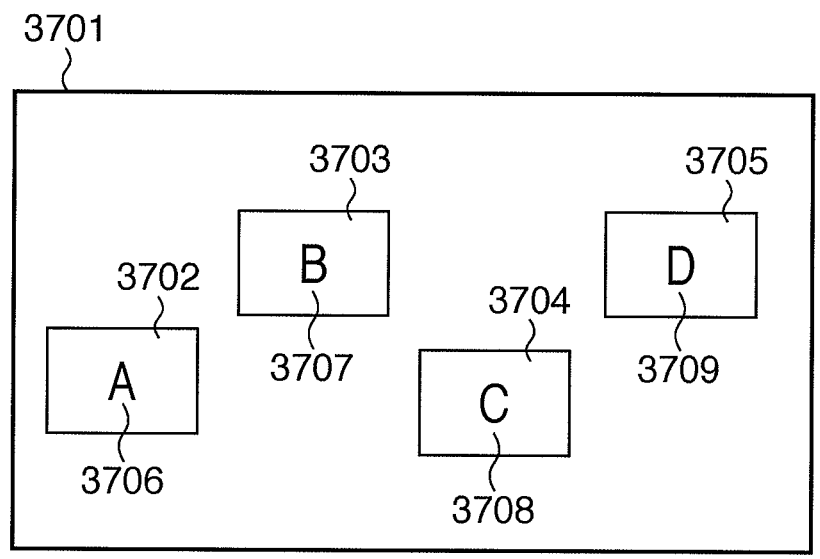
FIG. 37 is a view showing an example of a display screen of the instruction operation processing according to the sixth embodiment.

FIG. 37 is a view showing a display screen example upon selecting a content in step S3603. Reference numerals 3702, 3703, 3704, and 3705 denote displayed contents. Reference numerals 3706, 3707, 3708, and 3709 denote identification displays used to assist the selection operation of a content in step S3603. The user can select one from among the plurality of contents displayed concurrently by operating one of buttons 3802 to 3805 corresponding to symbols of these identification displays. Assume that an identification display "A" of the contents information 703 is selected. After that, a display effect for the selected content is selected in step S3607.

Figure 39:
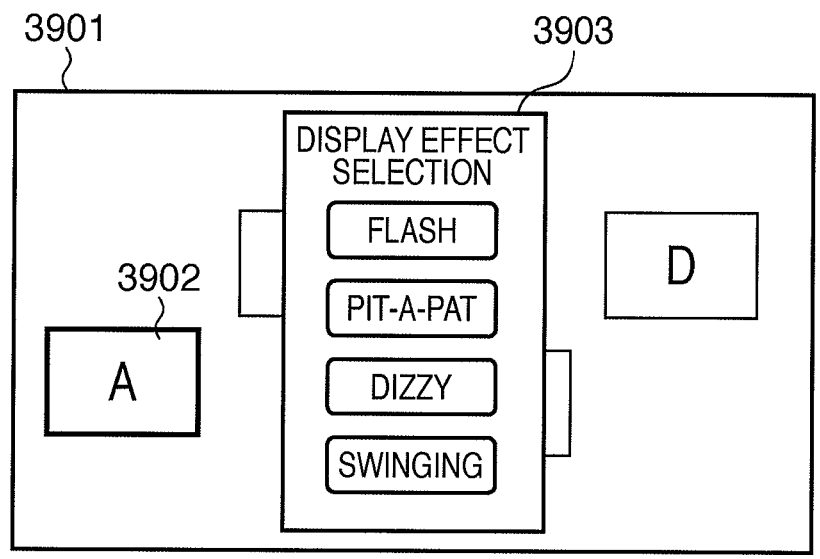
FIG. 39 is a view showing an example of a display screen of the instruction operation processing according to the sixth embodiment.

FIG. 39 is a view showing a display screen example upon selection of a display effect. The user can select a target display effect from a display effect selection dialog 3903 on a display screen 3901 by operating a cursor button 3807 of the remote controller 3801. In this case, assume that "flash" is selected as a display effect. After that, the display control unit 103 executes contents display processing (FIG. 35) using the selected display effect in step S3204. Also, assume that a content 3902 is selected.

In step S3501 in FIG. 35, the display method determination unit 104 refers to the display target contents information 703. In step S3502, the display method determination unit 104 obtains a display method set in this contents information 703. In step S3503, related contents determination processing is executed, but it is determined that no related contents information is found, as in the above case. As a result, the process advances from step S3504 to step S3510. Since the display method "flash" is designated, the process advances from step S3510 to step S3512, and the display method determination unit 104 sets the designated effect "flash" as the display method.

Figure 40:
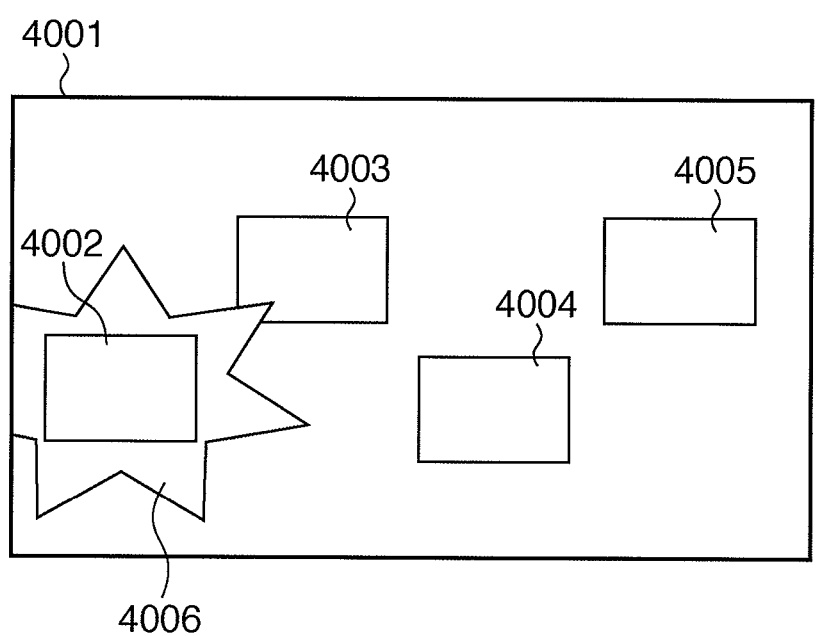
FIG. 40 is a view showing an example of a display screen according to the sixth embodiment.

In step S3507, the display method determination unit 104 detects an influence of the display effect. FIG. 40 is an image view when a display effect with which a background is flashing in a star pattern is applied to a content 4002 of contents 4002, 4003, 4004, and 4005 to have a standard size on a display screen 4001. FIG. 40 illustrates a state in which a display effect 4006 has a display part that overlaps a neighboring content 4003. In this case, the display method determination unit 104 determines in step S3507 that an interference to another content occurs, and the process advances to step S3509. In step S3509, the display method determination unit 104 executes display effect restriction processing. After that, in step S3305 the display control unit 103 executes target contents display processing with the display effect determined by the display method determination unit 104.

Figure 41:
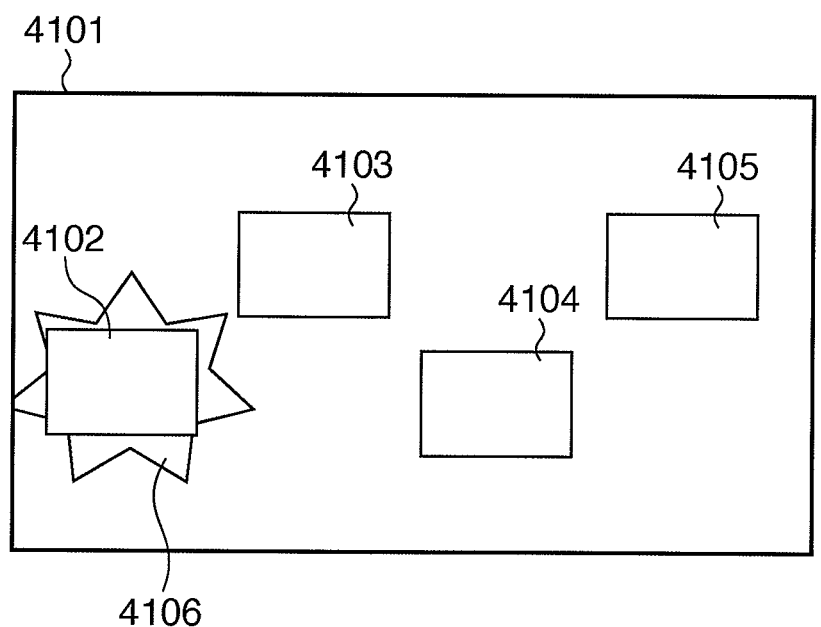
FIG. 41 is a view showing an example of a display screen according to the sixth embodiment, and a state in which a display effect is restricted from the display state shown in FIG. 40.

FIG. 41 is a view showing an example of display screen 4101 the display effect restriction processing, that is, a case in which the display range of the display effect is reduced. A display effect 4106 with which a background is flashing in a star pattern is appended to a contents 4102. In FIG. 41, the display effect 4106 does not interfere with a neighboring content 4103. Note that contents 4104 and 4105 respectively correspond to contents 4004 and 4005 in FIG. 40.

After that, the process advances to step S3205 in FIG. 32, and the display control unit 103 waits for an event. If a timer event is generated, the process advances from step S3205 to step S3207, and the display change contents registration processing (FIG. 30) is executed.

The display change contents registration processing of the sixth embodiment (FIG. 30) is as has been described in the fifth embodiment. As a result of the processing in FIG. 30, the display change contents table 1001 shown in FIG. 27A is updated to that shown in FIG. 27B.

To the display change contents table 1001 shown in FIG. 27B, a pointer 1002 to 0th display change contents information 1003 is added.

The pointer 1002 to display change contents information points to the display change contents information 1003. The display change contents information 1003 includes a pair of a pointer 1004 to contents meta information and a display effect 2705. The pointer 1004 to contents meta information points to metadata 705 of the display changed contents information 703.

Upon completion of the display change contents registration processing in step S3207, the process advances to step S3208. In step S3208, the display control unit 103 increments the display contents position i by one (i=1), and the process returns to step S3203. After that, a content of contents information 706 is displayed in step S3204 in the same sequence. That is, the display control unit 103 displays that display target content in step S3305 by the display method (no display effect) determined by the display method determination unit 104 in step S3302.

The process then advances to step S3205 in FIG. 32, and the display control unit 103 waits for an event. After that, the process advances to step S3207 in response to a timer event, and the display control unit 103 executes display change contents registration processing.

Since the set display effect Effect (none) in the contents information 706 matches the current display effect in step S3003 in FIG. 30, the display change contents registration processing ends. The process then advances to step S3208. In step S3208, the display contents position is incremented by one to set i=2, and the process returns to step S3203. Since the last content is not displayed yet, the process advances to step S3204.

In step S3204, the display method determination unit 104 displays second (i=2) contents information 708 (FIG. 25) in the contents list. The contents display processing (step S3204) at this time will be described below with reference to the flowchart of FIG. 33.

In step S3301, the display method determination unit 104 obtains the contents information 708 at the display contents position i=2 (FIG. 25). In step S3302, the display method determination unit 104 determines a display method in association with this contents information. The sequence of this processing is shown in FIG. 35.

In step S3501, the display method determination unit 104 refers to the display target contents information 708. In step S3502, the display method determination unit 104 obtains a display method set in the contents information 708. Since no individually set display effect Effect is set in the contents information 708, "none" is obtained. Since the set display setting 2515 in the display setting 714 of the contents list 701 is also "none", the display effect Effect (=initially set display effect)="none" is set.

In step S3503, the related contents determination processing is executed. The current display change contents table is as shown in FIG. 27B. In the related contents determination processing in step S3503, the 0th pointer in the display change contents table 1001 is referred to (step S903). Then, the metadata 705 pointed by the pointer 1004 to contents meta information of the registered display change contents information 1003 is referred to (step S904).

Furthermore, in step S905 the display method determination unit 104 refers to metadata 709 in the contents information 708 corresponding to the current display target content. As a result of comparison between two metadata, since "Category=Dogs" (1006) is matched, the process advances from step S906 to step S908, and it is determined that related contents information is found.

As a result of the above processing, the process advances from step S3504 to step S3505. In step S3505, the display method determination unit 104 obtains the display change contents information 1003 having the pointer 1004 to the related contents meta information 705 from the display change contents table 1001 shown in FIG. 27B. Then, the display method determination unit 104 obtains the display effect 2705 (flash) included in the display change contents information 1003. In step S3506, the display method determination unit 104 sets the display effect Effect="flash" of the display target content.

In step S3507, the display method determination unit 104 detects an extension of influence of the display effect. As described above, when the display effect interferes with a neighboring content, the process advances from step S3508 to step S3509, and the display method determination unit 104 executes display effect restriction processing. In this way, the display method determination processing in step S3302 in FIG. 33 in association with the contents information 708 ends. If it is determined in step S3303 that the maximum number of displayed contents is reached, the display control unit 103 clears the oldest content, and the process advances to step S3305. In step S3305, the display control unit 103 executes target contents display processing using the display effect determined by the display method determination unit 104 and its restriction processing result. For example, according to the sequence of the processing shown in FIG. 28, the display target content is displayed with the display effect "flash", the extension of which is reduced as needed. This state is exemplified by the display effects 4006 and 4106 in FIGS. 40 and 41.

As described above, with the arrangement according to the sixth embodiment, even when a display effect is added to a specific content in a slideshow in which a plurality of contents are concurrently displayed, that display effect can be reflected to a related content. When the display effect interferes with display of a neighboring content, such interference is detected before it happens, and the display effect is restricted, thus always adding the display effect without interfering with display of another content. As for a content related to the content to which the display effect was added previously, when the display effect is added to that related content without the intervention of the user, if that display effect interferes with display of a neighboring content, such interference is detected before it happens, and the display effect is restricted.

In the sixth embodiment, an interference with a neighboring content is prevented by the display effect restriction control that reduces the extension of the display effect. However, the method of preventing an interference is not limited to reduction of the extension. For example, as the display effect restriction control, a display part of the display effect may be displayed as transparent display. For example, such control can be implemented by changing the degree of transparency (α blending value) of the display part by the display effect. Such technique is known to those who are skilled in the art. Furthermore, a method of eliminating the influence of the display effect by placing a neighboring content on a topmost layer by adjusting display layers of that content may be used. That is, as the display effect restriction control, the display order of an overlapping layer of a display part by the display effect may be controlled.

[Seventh Embodiment]

In the sixth embodiment, an interference between the display effect added to one content and a neighboring content itself is prevented. However, the present invention is not limited to such specific embodiment. When display effects are added to neighboring contents, and display effect parts consequently interfere with each other, an interference between the display effects may be prevented. Upon detection of the extension of influence of the display effect in step S3507, an interference may be detected based on display ranges upon applying the display effects to neighboring contents.

With this arrangement, even when display effects are added to neighboring contents, their display effects can be effectively displayed.

[Eighth Embodiment]

In the aforementioned fifth to seventh embodiments, interferences between neighboring contents and their display effects are prevented. Alternatively, a new display effect may be developed based on a combination of the display effects of neighboring contents.

For example, a combination table of possible interferences between display effects is held, and new display effects upon generation of interferences based on respective combinations are associated. Then, a new display effect is generated with reference to the combination table in association with a combination of contents that suffer an interference as a result of automatic addition of the display effects.

With this arrangement, entertainment when the user gives the instruction to add display effects to contents can be enhanced.

[Ninth Embodiment]

Figures 43, 44:
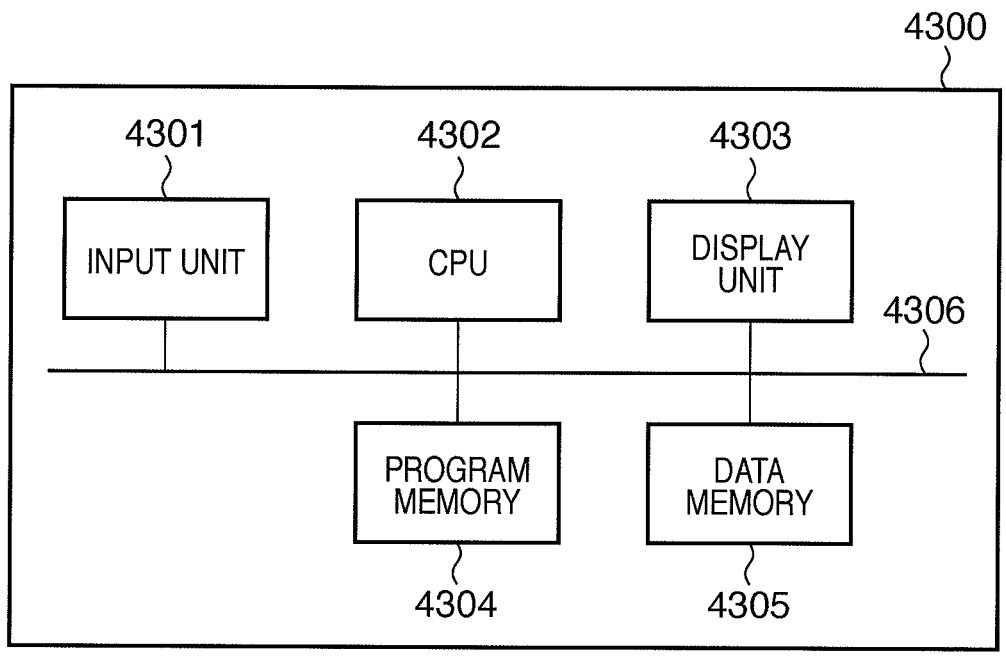
FIG. 43 is a block diagram showing an example of the arrangement of a contents display apparatus according to the ninth embodiment.
FIG. 44 is a view showing an example of the data configuration of a contents list held in a data memory of the contents display apparatus according to the ninth embodiment.

The ninth embodiment will be described below. FIG. 43 is a block diagram showing an example of the hardware arrangement of a contents display apparatus according to the ninth embodiment. Referring to FIG. 43, a contents display apparatus 4300 comprises the following components.

An input unit 4301 is used to input information (data). As the input unit 4301, a keyboard, a mouse, or a remote input using a remote controller may be used. A CPU 4302 controls respective components connected to a bus 4306 by executing arithmetic operations, logical decisions, and the like for various kinds of processing. A display unit 4303 displays information (data). As the display unit 4303, a display such as an LCD or CRT can be used. A program memory 4304 stores programs for control by the CPU 4302 including conditional decisions and screen control. The program memory 4304 also stores a contents list that holds information of contents so as to display a slideshow. The contents list is used as display schedule information which indicates display schedules of a plurality of contents so as to sequentially display the plurality of contents. That is, the ninth embodiment also displays contents on a display according to the display schedule information as in the aforementioned first to eighth embodiments. Note that the contents list as the display schedule information according to the ninth embodiment has the data configurations shown in FIGS. 44, 47, 49, and 51 to be described later. Note that the program memory 4304 may include a ROM or a RAM on which programs are loaded from an external storage device or the like. A data memory 4305 stores data generated by various kinds of processing.

Assume that the data memory 4305 comprises a RAM, and required data are loaded onto the data memory 4305 from a nonvolatile external storage device prior to processing or as needed. The bus 4306 transfers address signals that designate respective components to be controlled by the CPU 4302, control signals that control respective components, and data to be exchanged among respective components.

FIG. 44 is a view showing an example of the contents list held in the data memory 4305 according to the ninth embodiment. The contents list in FIG. 44 stores pieces of contents information in the order they are displayed in a slideshow. Each contents information includes location information 4401 required to obtain a content, and metadata 4402 that represents an attribute of the content.

Note that the location information 4401 of a content can be data used to obtain a content. The metadata 4402 of the content can be information comparable with another content. For example, the metadata 4402 may be time data, place information, person information, or feature amount information of a content. Note that the metadata 4402 may be directly obtained from a content. In this case, the metadata need not be included in the contents list.

Figure 45:
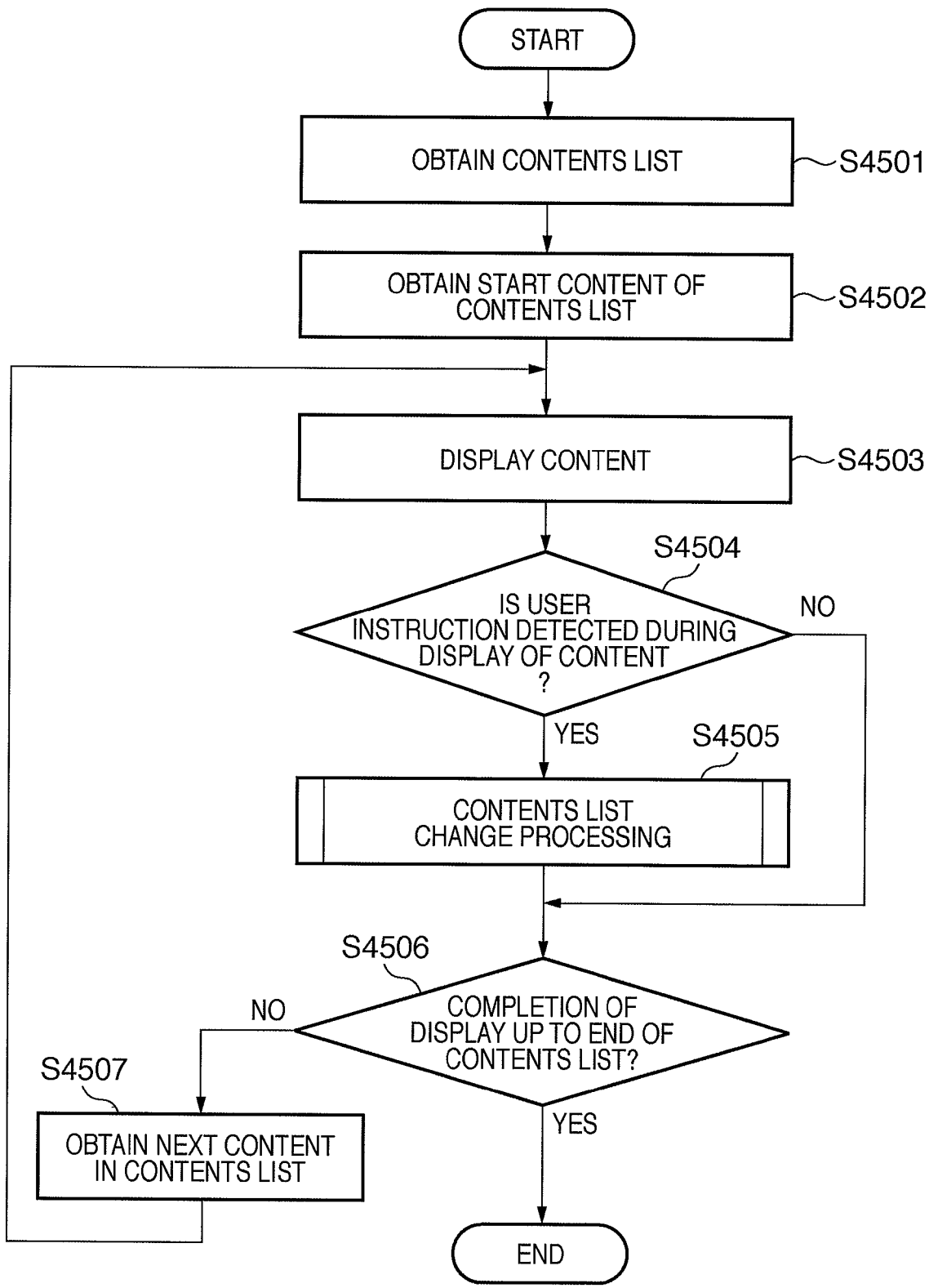
FIG. 45 is a flowchart for explaining processing in the contents display apparatus according to the ninth embodiment.

Slideshow display control processing according to the ninth embodiment will be described below with reference to the flowchart of FIG. 45. Processing corresponding to the flowchart of FIG. 45 is implemented when the CPU 4302 executes a processing program stored in the program memory 4304 shown in FIG. 43.

In step S4501, the CPU 4302 obtains a contents list used to display a slideshow from the program memory 4304. In step S4502, the CPU 4302 loads data of a content onto the data memory 4305 based on start contents information in the contents list. In step S4503, the CPU 4302 displays the content loaded onto the data memory 4305 on the display unit 4303. Upon displaying a content, if data of the content to be displayed remains in the data memory 4305, the contents data on the data memory 4305 may be displayed.

In this embodiment, the CPU 4302 loads a content 4403 at the first position in, for example, the obtained content list shown in FIG. 44 onto the data memory 4305 based on the location information 4401 of the content, and displays that content on the display unit 4303.

The CPU 4302 detects an input from the input unit 4301 during contents display in step S4504 to detect if an instruction to the content is received. If it is detected that an instruction is received, the process advances to step S4505; otherwise, the process jumps to step S4506. In the ninth embodiment, when a display time of a content is changed by a user instruction, the process advances to step S4505; otherwise, the process jumps to step S4506. When the display time of the content has been changed, a message indicating that the contents list is changed may be displayed on the display unit 4303 to prompt the user to confirm as to whether or not to permit such change. Only when the user permits that change, the process may advance to step S4505. For example, when the user sends an instruction to display the next content using a remote controller, the process advances to step S4505 to end display of the currently displayed content; when the user does nothing, the process jumps to step S4506.

In step S4505, contents list change processing is executed. If the contents list includes a content next to the displayed content in step S4506, the process advances to step S4507. In step S4507, the CPU 4302 shifts a content to be displayed to the next content in the contents list, and the process returns to step S4503. On the other hand, if it is determined in step S4506 that the slideshow reaches the end of the contents list, this slideshow ends. For example, when a content 4403 is displayed in the contents list shown in FIG. 44, the CPU 4302 shifts the display contents position to a next content 4404.

Details of the contents list change processing in step S4505 will be described below with reference to the flowchart of FIG. 46. Processing corresponding to the flowchart of FIG. 46 is implemented when the CPU 4302 executes a processing program stored in the program memory 4304 shown in FIG. 43, as in FIG. 45.

In step S4601, the CPU 4302 obtains the display time of the content displayed on the display unit 4303. The obtained display time is saved in the data memory 4305.

In step S4602, the CPU 4302 compares the display time of the content with an originally scheduled display time (to be referred to as a display schedule time hereinafter). If the display time is longer than the display schedule time, the CPU 4302 advances the process to step S4603; otherwise, it ends the processing. As the display schedule time, if a predetermined value is available, that value is used; if such value is not available, a default value is used. The display schedule time may be determined for each content. Upon comparison between the display time and display schedule time, whether or not to obtain a related content may be determined if their difference value is equal to or larger than a predetermined value, or using the calculation result of these values.

In step S4603, the CPU 4302 searches an available contents group for contents information of a content which is best related to the content of interest, based on the metadata of the displayed content, thus obtaining the contents information. Note that this search processing may be processed by the CPU 4302, or may be requested to an external search processing service via an external interface. A search range of candidates of contents to be obtained may be obtained from not only all available contents but also from a search range such as a designated group or category. The search range of candidates of contents may be designated in advance or may be designated upon obtaining a content.

In step S4604, the CPU 4302 inserts this contents information at a position next to the displayed content in the contents list, thus ending the processing. Note that the number of related contents to be inserted is not limited to one, but two or three or more related contents may be inserted. Alternatively, an upper limit may be determined, and related contents as many as the number of contents equal to or smaller than the upper limit may be inserted. The insertion position of a related content is determined as a position next to the displayed content. However, a related content may be inserted after the last content.

For example, assume that the user browses the content 4404 for 10 sec longer than 3 sec as the display schedule time in the contents list of FIG. 44. In this case, as in a contents list shown in FIG. 47, a content 4701 found as a content having the same metadata as metadata "cat" of the content 4404 is inserted immediately after the content 4404.

As an example of contents used in the slideshow, images have been described. However, contents may be movies. In this case, the contents list may be simply a list of movies, or a list including movie clips for respective chapters included in one movie.

As described above, according to the ninth embodiment, when the display time of a content is changed by a user operation, and the display time of that content consequently becomes longer than a pre-set schedule time, a content related to that content is added to the contents list. That is, the data memory 4305 or the like is searched for a content by discriminating that which is related to the content displayed upon reception of a user operation of those which are not included in the contents list. The found content is added to the contents list whose display processing is underway. According to the ninth embodiment, a favorite content of the user can be added to the slideshow based on an operation history of the user, and a slideshow close to user's preference can be built without any troublesome operations.

[Tenth Embodiment]

The tenth embodiment will be described below. The arrangement of a display control apparatus according to the Tenth embodiment is the same as that of the ninth embodiment (FIG. 43). In the tenth embodiment, when a display time changed by a user operation is shorter than a pre-set schedule time, the corresponding content is deleted from a contents list in addition to addition of a content to the contents list described in the ninth embodiment.

The overall sequence of the display control processing of a slideshow onto the display unit 4303 according to the tenth embodiment is also the same as that in the ninth embodiment (FIG. 45). However, the contents list change processing in step S4505 is different from the ninth embodiment.

The data configuration or the like of the contents list according to the tenth embodiment is the same as that in the ninth embodiment (FIG. 44).

Figures 48, 49:
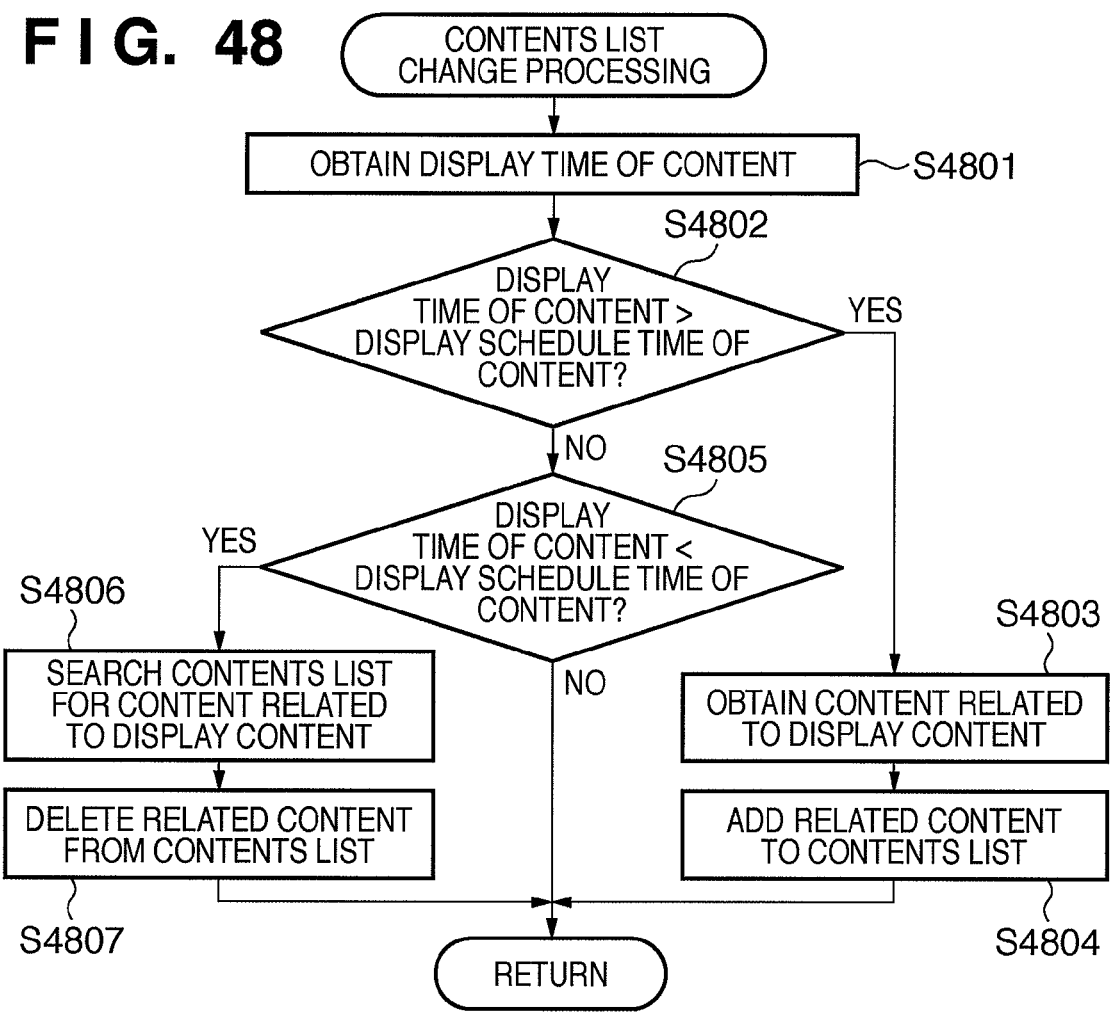
FIG. 48 is a flowchart for explaining processing in a contents display apparatus according to the tenth embodiment.
FIG. 49 is a view showing an example of the data configuration of a contents list held in a data memory of the contents display apparatus according to the 10th embodiment.

The contents list change processing according to the tenth embodiment will be described below with reference to the flowchart of FIG. 48. FIG. 48 is a flowchart showing an example of the contents list change processing according to the tenth embodiment. Processing shown in the flowchart of FIG. 48 is implemented when the CPU 4302 executes a processing program stored in the program memory 4304.

In step S4801, the CPU 4302 obtains the display time of a content displayed on the display unit 4303. That is, in the tenth embodiment, the CPU 4302 measures the display times of respective contents, and saves the obtained display times in the data memory 4305.

In step S4802, the CPU 4302 compares the display time of a content with the display schedule time. If the display time is longer than the display schedule time, the process advances to step S4803; otherwise, the process advances to step S4805. The processes in steps S4802 to S4804 are the same as those in steps S4602 to S4604 described in the ninth embodiment.

If the display time is shorter than the display schedule time in step S4805, the process advances to step S4806; otherwise, the processing ends. In step S4806, the CPU 4302 lists up contents with high relevance to the displayed content from the contents list. In step S4807, the CPU 4302 deletes these pieces of contents information from the contents list, thus ending the processing. Upon deleting contents, the contents information of the displayed content itself may be deleted from the contents list. Also, contents to be deleted may be stored in the data memory 4305 as a delete contents list, and these contents may be deleted from the corresponding contents list based on this delete contents list upon displaying the slideshow.

As the display schedule time, if a value predetermined by the user is available, that value is used; if such value is not available, a default value is used. The display schedule time may be determined for each content. Upon comparison between the display time and display schedule time, whether or not to obtain a related content may be determined if their difference value is equal to or larger than a predetermined value, or using their difference value. The display schedule time used in steps S4802 and S4805 may or may not be different. If different display schedule times are used, assuming that the display schedule time used in step S4802 is a first predetermined time, and that used in step S4805 is a second predetermined time, they have a relationship of the first predetermined time>the second predetermined time.

For example, when the user views a content 4404 for a time longer than 3 sec as the display schedule time in the contents list in FIG. 44, a content having the same metadata is inserted after the displayed content in the contents list, as described in the ninth embodiment. By contrast, when the user displays the content 4404 for a time shorter than the display schedule time, for example, only for 1 sec, a content 4405 having the same metadata as the content 4404 is deleted, and the contents list is updated to that shown in FIG. 49.

As described above, according to the tenth embodiment, the user can insert his or her favorite contents to the slideshow and can delete contents that he or she does not want to view based on operation histories. For this reason, a slideshow close to user's preference can be built without any troublesome operations.

[Eleventh Embodiment]

The eleventh embodiment of the present invention will be described below. The arrangement of a display control apparatus according to the eleventh embodiment is the same as that in the ninth embodiment (FIG. 43).

FIG. 51 is a view showing an example of a contents list saved in the data memory 4305 according to the eleventh embodiment. The data configuration of the contents list is the same as that in the ninth embodiment (FIG. 44). However, the contents list shown in FIG. 51 further has a change inhibition field 5101 that inhibits insertion and deletion of contents. This change inhibition field 5101 may be described as one contents information of the contents list, may be managed based on information appended to contents, or may by stored in the data memory 4305 independently of the contents list. Note that a field other than the change inhibition field 5101 in the contents list is called a change permission field.

The overall sequence of the slideshow display control processing according to the eleventh embodiment is the same as that in the flowchart (FIG. 45) described in the ninth embodiment. However, the contents list change processing in step S4505 is different from the ninth embodiment.

The contents list change processing according to the eleventh embodiment will be described below with reference to the flowchart of FIG. 50. FIG. 50 is a flowchart showing an example of the contents list change processing according to the eleventh embodiment. Note that processing corresponding to the flowchart of FIG. 50 is implemented when the CPU 4302 executes a processing program stored in the program memory 4304 in FIG. 43.

In FIG. 50, the processes in steps S5001, S5002, S5003, S5005, and S5006 are respectively the same as those in steps S4801, S4802, S4805, S4803, and S4804 in FIG. 48.

The CPU 4302 determines in step S5004 if the insertion position of a related content falls within the change permission field of the contents list. If it is determined that the insertion position falls within the change permission field, the process advances to step S5005; if it is determined that the insertion position falls outside the change permission field (falls within the change inhibition field), this processing ends. For example, the following description will be given using the contents list in which contents 4404 to 4405 are included in the change inhibition field 5101, as shown in FIG. 51. In case of the contents list shown in FIG. 51, even when the content 4404 is displayed for a time longer than the display schedule time, since the insertion position of that content is included in the change inhibition field 5101, a related content is not inserted.

On the other hand, if it is determined in step S5003 that the display time is shorter than the display schedule time, the process advances to step S5007; otherwise, the processing ends. In step S5007, the CPU 4302 lists up contents with high relevance to the content located at the display contents position from the contents list. In step S5008, the CPU 4302 deletes pieces of contents information which are listed up in step S5007 and fall within the change permission region from the contents list, thus ending the processing. Upon deleting a content, if the contents information of the displayed content itself falls within the change permission field, that contents information may also be deleted from the contents list. Also, contents to be deleted may be stored in the contents list or the data memory 4305, and may be deleted based on the contents list upon displaying a slideshow later.

In the eleventh embodiment, the change inhibition field is defined as a field that inhibits both insertion and deletion. However, the present invention is not limited to this. For example, the change inhibition field of the contents list may be defined as a field that inhibits only insertion of a content or a field that inhibits only deletion of a content. Furthermore, a change inhibition field for deletion and that for insertion may be independently allocated.

For example, a case will be examined below wherein the user views the content 4404 for 5 sec longer than 3 sec as the display schedule time in the contents list shown in FIG. 51. In this case, since a position after the content 4404 is included in the change inhibition field 5101, no related content is inserted, and the contents list remains unchanged. On the other hand, when the user views only for 1 sec shorter than 3 sec as the display schedule time, a content 4405 related to the content 4404 is included in the change inhibition field 5101, and is not deleted. However, a content which is included in the change permission field of the contents list and is related to that content is deleted. When the insertion position falls within the change inhibition field of the contents list, a related content may be inserted in the change permission field. For example, when the content 4404 is displayed for the display time longer than the display schedule time, a related content may be inserted at a position other than the change inhibition field 5101.

As described above, according to the eleventh embodiment, since the user can set a part where contents are not changed in the slideshow, he or she can build a slideshow closer to his or her preference.

According to the present invention, the display method of a related content to be displayed later can be changed based on a user operation to the currently displayed content while a plurality of contents is displayed. For this reason, user operations can be reduced while implementing display close to user's preference.

<Other Embodiments>

The embodiments have been explained in detail. The present invention can adopt embodiments in the form of, for example, a system, apparatus, method, program, or storage medium. More specifically, the present invention may be applied to either a system constituted by a plurality of devices, or an apparatus consisting of a single device.

Note that the present invention includes a case wherein the functions of the embodiments are achieved when a software program is directly or remotely supplied to a system or apparatus, and a computer of that system or apparatus reads out and executes the supplied program code. The program to be supplied in this case is a computer program corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a computer-readable storage medium for supplying the computer program, the following media can be used. For example, a floppy® disk, hard disk, optical disk, magneto-optical disk, MO, CD-ROM, CD-R, CD-RW, magnetic tape, nonvolatile memory card, ROM, and DVD (DVD-ROM, DVD-R) can be used.

As another program supply method, the user establishes connection to a homepage on the Internet using a browser on a client computer, and downloads the computer program of the present invention from the homepage onto a recording medium such as a hard disk. In this case, the program to be downloaded may be a compressed file including an automatic installation function. Also, the program codes that form the program of the present invention may be segmented into a plurality of files, which may be downloaded from different homepages. In other words, the present invention includes a WWW server which makes a plurality of users download program files required to implement the functional processing of the present invention by the computer.

Also, a storage medium such as a CD-ROM, which stores the encrypted program of the present invention, may be delivered to the user. In this case, the user who has cleared a predetermined condition may be allowed to download key information used to decrypt the encrypted program from a homepage via the Internet. The user executes the encrypted program using the key information to install the program on a computer.

The functions of the aforementioned embodiments can be implemented when the computer executes the readout program. Furthermore, the functions of the aforementioned embodiments may be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the storage medium is written in a memory equipped on a function expansion board or a function expansion unit, which is inserted into or connected to the computer. In this case, after the program is written in the function expansion board or unit, a CPU equipped on the function expansion board or unit executes some or all of actual processes based on an instruction of that program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-026900, filed Feb. 6, 2008, which is hereby incorporated by reference herein in its entirety.

What is claimed is:

1. A contents display apparatus comprising:
a storage unit that stores display schedule information indicating display order and display method of a plurality of contents in a slideshow so as to sequentially display the contents;
a display unit that displays the plurality of contents in the slideshow on a display while sequentially switching display of the contents according to the display order and the display method indicated in the display schedule information;
an operation unit that accepts a user operation, during the display of the contents by the display unit, instructing to change the display method of a first content that is being displayed in the slideshow by said display unit;

a first determination unit that determines a type of the change made to the display method of the first content based on the user operation accepted by the operation unit;

a second determination unit that determines, based on metadata of respective contents contained in the slideshow, a content which is related to the first content whose display method is changed by the user operation; and a change unit that changes the display method of the display schedule information for the first content based on the type of change made to the display method determined by the first determination unit, and that changes the display method of the display schedule information for the content determined as the related content by said second determination unit based on the display method of the first content changed by the user operation accepted by said operation unit, wherein said second determination unit determines a related content from the contents in the slideshow included in the display schedule information, and when the display method is changed by the user operation, said change unit changes the display schedule information by changing the display method indicated in the display schedule for the related content determined by said second determination unit in the same way as the changed display method of the first content.

2. The apparatus according to claim 1, further comprising a registering unit that registers, as change information, metadata of the first content for which said operation unit accepted the user operation, and the display method of the first content changed by the user operation, wherein said second determination unit determines the related content using the metadata indicated by the change information registered by said registering unit, and said change unit changes the display schedule associated with the related content determined by said second determination unit based on the changed display method indicated by the change information.

3. The apparatus according to claim 2, further comprising a repetition unit that controls said display unit to repetitively display the contents in the slideshow according to the display schedule information, wherein said registering unit functions in only display of a first round by said repetition unit, and said second determination unit and said change unit function in only display of a second round and subsequent rounds by said repetition unit.

4. The apparatus according to claim 2, wherein the display method includes a display time of the content in the slideshow, and said registering unit determines based on an actual display time of the first content whose display method is changed by the user operation whether or not to register change information associated with the user operation, and registers the change information associated with the user operation when it is determined that the change information is registered.

5. The apparatus according to claim 4, further comprising a unit that holds a registration rule indicating correspondence between a displayed time of a content and a display time to be registered as change information, and wherein said registering unit obtains a display time corresponding to the actual display time from the registration rule, and registers the obtained display time as the change information.

6. The apparatus according to claim 4, further comprising a unit that holds a determination rule used to determine validity of a suspension operation of display, wherein when it is determined according to the determination rule that the suspension operation is invalid, said registering unit uses, as the actual display time, a display time obtained by subtracting a suspension time by the suspension operation from a measured display time of the first content displayed when the user operation is received.

7. The apparatus according to claim 1, wherein the display method includes a display time of the content in the slideshow, and said change unit changes a display time specified in the display schedule of the related content determined by said second determination unit, based on an actual display time of the first content whose display method is changed by the user operation.

8. The apparatus according to claim 1, wherein the display method includes a display effect of the content in the slideshow, and said change unit changes a display effect specified in the display schedule of the related content determined by said second determination unit, based on a type of display effect designated in the changed display method for the first content changed by the user operation.

9. The apparatus according to claim 8, wherein said display unit concurrently displays a plurality of contents on the display in accordance with the display schedule information, said operation unit receives an instruction to select one of the plurality of contents displayed by said display unit as the first content, and an instruction of a user operation with respect to the selected content, and said second determination unit determines a content related to the first content selected by said operation unit.

10. The apparatus according to claim 8, wherein said display unit concurrently displays a plurality of contents on the display in accordance with the display schedule information, and said apparatus further comprises a display effect control unit that, when a content is displayed using a display effect changed by said change unit, determines whether or not an extension of influence of the display effect imposes an influence on another content, and to, when it is determined that the extension of influence imposes an influence, change the display method of the display effect.

11. The apparatus according to claim 10, wherein said display effect control unit restricts the extension of influence of the display effect.

12. The apparatus according to claim 10, wherein said display effect control unit changes a degree of transparency of display by the display effect.

13. The apparatus according to claim 10, wherein said display effect control unit changes a display order of layers of a display part by the display effect.

14. The apparatus according to claim 10, wherein when a content is displayed using the display effect changed by said change unit, said display effect control unit determines whether or not the extension of influence of the display effect applied to the content interferes with an extension of influence of a display effect applied to another content, and develops a new display effect to the contents when the extensions of influence interfere with each other.

15. The apparatus according to claim 1, further comprising a repetition unit that controls said display unit to repetitively display the contents in the slideshow according to the display schedule information, wherein said second determination unit and said change unit function in display of a second round and subsequent rounds by said repetition unit.

16. The apparatus according to claim 1, wherein when a display time of a content exceeds a first predetermined time by the user operation, said second determination unit determines a content related to the first content displayed when said operation unit receives the user operation from contents which are not included in the display schedule information, and
said change unit adds the content determined by said second determination unit to the display schedule information.

17. The apparatus according to claim 16, wherein said change unit asks a user for permission of change upon changing the display schedule information.

18. The apparatus according to claim 16, further comprising a designation unit that designates a search range of contents,
wherein said second determination unit determines contents within the search range designated by said designation unit.

19. The apparatus according to claim 16, wherein when a display time of a content is shorter than a second predetermined time by the user operation, said change unit deletes the content from the display schedule information.

20. The apparatus according to claim 19, further comprising a setting unit that sets inhibition of addition or deletion of a content for a part of a display order of contents indicated by the display schedule information,
wherein said change unit executes the addition or deletion only for a part of the display schedule information in which inhibition is not set by said setting unit.

21. A method of controlling a contents display apparatus which comprises a storage unit configured to store display schedule information indicating display order and display method of a plurality of contents in a slideshow so as to sequentially display the contents, comprising:
a display step of displaying the plurality of contents in the slideshow on a display
while sequentially switching display of the contents according to the display order and the display method indicated in the display schedule information; an operation step of accepting a user operation, during the display of the contents by the display unit, instructing to change the display method of a first content that is being displayed in the slideshow in the display step;
a first determination step of determining a type of the change made to the display method of the first content based on the user operation accepted by the operation step;
a second determination step of determining, based on metadata of respective contents contained in the slideshow, a content which is related to the first content whose display method is changed by the user operation accepted in the operation step; and
a change step of changing the display method of the display schedule information for the first content based on the type of change made to the display method determined by the first determination step, and changing the display method of the display schedule information for the content determined as the related content in the second determination step based on the display method of the first content changed by the user operation accepted in said operation step,
wherein said second determination step determines a related content from the contents in the slideshow included in the display schedule information, and
when the display method is changed by the user operation, said change step changes the display schedule information by changing the display method indicated in the display schedule for the related content determined by said second determination step in the same way as the changed display method of the first content.

22. A non-transitory computer-readable storage medium retrievably storing a program for making a computer execute a control method of a contents display apparatus which comprises a storage unit configured to store display schedule information indicating display order and display method of a plurality of contents in a slideshow so as to sequentially display the contents, the program comprising:
code of a display step of displaying the plurality of contents in the slideshow on a display while sequentially switching display of the contents according to the display order and the display method indicated in the display schedule information;
code of an operation step of accepting a user operation, during the display of the contents by the display step, instructing to change the display method of a first content that is being displayed in the slideshow in the display step;
code of a first determination step of determining a type of change made to the display method of the first content based on the user operation accepted by the operation step;
code of a second determination step of determining, based on metadata of respective contents in the slideshow, a content which is related to the first content whose display method is changed by the user operation accepted in the operation step; and
code of a change step of changing the display method of the display schedule information for the first content based on the type of change made to the display method determined by the first determination step, and changing the display method of the display schedule information for the content determined as the related content in the second determination step based on the display method changed by the user operation accepted in said operation step, wherein said second determination step determines a related content from the contents in the slideshow included in the display schedule information, and
when the display method is changed by the user operation, said change step changes the display schedule information by changing the display method indicated in the display schedule for the related content determined by said second determination step in the same way as the changed display method of the first content.

* * * * *